(12) United States Patent
Daining et al.

(10) Patent No.: US 10,926,268 B2
(45) Date of Patent: Feb. 23, 2021

(54) CUTTER MOUNTING SYSTEMS AND CUTTERS FOR THE SAME

(71) Applicant: Vermeer Manufacturing Company, Pella, IA (US)

(72) Inventors: Stephen Daining, Pella, IA (US); Matthew Ryan Disselkoen, Pella, IA (US); Claudio Carrafiello Verzilli, Pella, IA (US); Joseph Edward Breja, Pella, IA (US); Joshua Dean Nossaman, Pella, IA (US)

(73) Assignee: Vermeer Manufacturing Company, Pella, IA (US)

(*) Notice: Subject to any disclaimer, the term of this patent is extended or adjusted under 35 U.S.C. 154(b) by 52 days.

(21) Appl. No.: 16/270,025

(22) Filed: Feb. 7, 2019

(65) Prior Publication Data

US 2019/0240671 A1  Aug. 8, 2019

Related U.S. Application Data

(60) Provisional application No. 62/661,476, filed on Apr. 23, 2018, provisional application No. 62/627,377, filed on Feb. 7, 2018.

(51) Int. Cl.
*B02C 18/18* (2006.01)
*B27G 13/10* (2006.01)
(Continued)

(52) U.S. Cl.
CPC ............ *B02C 18/18* (2013.01); *A01G 23/067* (2013.01); *B02C 18/184* (2013.01); *B27G 13/10* (2013.01); *B02C 4/305* (2013.01); *B02C 2210/02* (2013.01)

(58) Field of Classification Search
CPC ...... A01G 23/06; A01G 23/067; B02C 18/06; B02C 18/18; B02C 18/182; B02C 18/184;
(Continued)

(56) References Cited

U.S. PATENT DOCUMENTS 3,570,566 A   3/1971 McCreery
3,831,484 A   8/1974 Gibb
(Continued)

FOREIGN PATENT DOCUMENTS

CA   2842972 A1   5/2013
EP   1693110      8/2006
(Continued)

OTHER PUBLICATIONS

Ditch Witch, "MT16 Microtrencher," website (publicly available at least as early as Nov. 16, 2018) https://www.ditchwitch.com/trenchers/micro/mt16, 11 Pages.

(Continued)

*Primary Examiner* — Matthew Katcoff
(74) *Attorney, Agent, or Firm* — Michael Best and Friedrich LLP

(57) ABSTRACT

A cutter includes a first end configured to engage an object along a dominant force vector, a second end opposite the first end, a first side, and a second side opposite the first side. The cutter further includes an outer side, an inner side, and an aperture extending from the outer side to the inner side along a fastener axis that is substantially perpendicular to the dominant force vector. The cutter also includes a cutter tip on the first end and having a first cutting edge, a second cutting edge, and a third cutting edge, the cutting edges defining therebetween a cutting face. The cutting face defines a cutting swath having a width between the first cutting edge and the second cutting edge as the cutter rotates (Continued)

with the apparatus. No portion of the first side or the second side extends outside the width of the cutting swath.

28 Claims, 41 Drawing Sheets

(51) Int. Cl.
  *A01G 23/06* (2006.01)
  *B02C 4/30* (2006.01)
(58) Field of Classification Search
  CPC .... B02C 2210/02; B27G 13/08; B27G 13/10; B27G 13/12
  See application file for complete search history.

(56) References Cited

U.S. PATENT DOCUMENTS

| | | | |
|---|---|---|---|
| 3,844,619 A | 10/1974 | Haller | |
| 3,935,887 A | 2/1976 | Van Zante et al. | |
| 4,222,298 A | 9/1980 | James | |
| 4,454,901 A | 6/1984 | Thorsness | |
| 4,667,713 A | 5/1987 | Wright | |
| 4,709,737 A | 12/1987 | Jonsson | |
| 4,750,396 A | 6/1988 | Gaddis et al. | |
| 5,042,733 A | 8/1991 | Hench | |
| 5,100,070 A | 3/1992 | Montgomery, Sr. | |
| 5,103,882 A | 4/1992 | Milbourn | |
| 5,183,089 A | 2/1993 | Norlander et al. | |
| 5,348,065 A | 9/1994 | Meyer | |
| 5,365,986 A | 11/1994 | Hooser | |
| 5,451,128 A | 9/1995 | Hattersley | |
| 5,477,754 A | 12/1995 | Herbon | |
| 5,484,111 A | 1/1996 | Dorscht et al. | |
| 5,497,815 A * | 3/1996 | Bowling | A01G 23/067 |
| | | | 144/218 |
| 5,906,231 A | 5/1999 | Rautio | |
| 5,950,942 A | 9/1999 | Brand et al. | |
| 6,014,996 A | 1/2000 | Egging et al. | |
| 6,024,143 A | 2/2000 | Ritchey | |
| 6,026,781 A | 2/2000 | Imatake et al. | |
| 6,026,871 A | 2/2000 | Chapman | |
| 6,045,072 A | 4/2000 | Zehr | |
| 6,131,838 A | 10/2000 | Balvanz et al. | |
| 6,230,770 B1 | 5/2001 | Spaargaren | |
| D447,757 S | 9/2001 | Rautio | |
| D448,780 S | 10/2001 | Rautio | |
| 6,364,227 B1 | 4/2002 | Dorscht | |
| 6,382,277 B1 | 5/2002 | Paumier et al. | |
| 6,394,378 B1 | 5/2002 | Ragnarsson | |
| 6,422,495 B1 | 7/2002 | De Boef et al. | |
| 6,464,157 B1 | 10/2002 | Balvanz et al. | |
| 6,520,440 B2 | 2/2003 | Ragnarsson | |
| 6,546,977 B1 | 4/2003 | Monyak et al. | |
| 6,550,504 B1 | 4/2003 | Leonardi et al. | |
| 6,708,743 B2 | 3/2004 | Ziehm | |
| 6,751,553 B2 | 6/2004 | Young et al. | |
| 6,843,435 B2 | 1/2005 | Verhoef et al. | |
| 6,877,535 B1 | 4/2005 | Bennington | |
| 7,011,124 B1 | 3/2006 | Morey | |
| 7,104,294 B2 | 9/2006 | Kopocs et al. | |
| 7,131,606 B2 | 11/2006 | Rogers | |
| 7,143,796 B2 | 12/2006 | Arasmith | |
| 7,213,623 B2 | 5/2007 | Shinn | |
| 7,293,729 B2 | 11/2007 | Ragnarsson | |
| D567,832 S | 4/2008 | Edwards | |
| 7,380,576 B2 | 6/2008 | Pizzuto | |
| 7,578,462 B2 | 8/2009 | Edwards | |
| 7,584,921 B1 | 9/2009 | Bennington et al. | |
| 7,694,704 B2 | 4/2010 | Gossett | |
| 7,743,803 B2 | 6/2010 | Paumier | |
| 7,815,136 B2 | 10/2010 | Arnston | |
| 7,918,252 B2 | 4/2011 | Gossett | |
| 7,938,350 B2 | 5/2011 | Doppstadt et al. | |
| 8,033,490 B1 | 10/2011 | Young et al. | |
| 8,066,213 B2 | 11/2011 | Marquardsen | |
| 8,113,453 B2 | 2/2012 | Bardos | |
| 8,231,072 B2 * | 7/2012 | Willibald | A01G 3/002 |
| | | | 241/294 |
| 8,408,258 B2 | 4/2013 | Leonardi et al. | |
| 8,540,033 B2 | 9/2013 | Stanley et al. | |
| 8,584,717 B2 | 11/2013 | Leonardi et al. | |
| 8,672,001 B2 | 3/2014 | Leonardi et al. | |
| 9,137,954 B2 | 9/2015 | Leonardi et al. | |
| D757,124 S | 5/2016 | Stanley et al. | |
| D772,951 S | 11/2016 | Stanley et al. | |
| 9,578,816 B2 | 2/2017 | Green et al. | |
| 9,686,922 B2 * | 6/2017 | Cairns | A01G 23/06 |
| D796,291 S | 9/2017 | Sewell et al. | |
| D796,292 S | 9/2017 | Sewell et al. | |
| D807,935 S | 1/2018 | Dudzinsky | |
| 9,894,848 B2 | 2/2018 | Weinberg et al. | |
| 10,051,798 B2 * | 8/2018 | Leonardi | A01G 23/067 |
| D845,360 S | 4/2019 | Kobayashi et al. | |
| D852,245 S | 6/2019 | Kobayashi et al. | |
| D880,547 S | 4/2020 | Weinberg | |
| D884,039 S | 5/2020 | Endoh et al. | |
| D884,040 S | 5/2020 | Endoh et al. | |
| D884,041 S | 5/2020 | Endoh et al. | |
| 10,737,275 B2 | 8/2020 | Johnson et al. | |
| 2005/0001084 A1 | 1/2005 | Pizzuto | |
| 2006/0102247 A1 | 5/2006 | Green | |
| 2007/0181725 A1 | 8/2007 | Edwards | |
| 2007/0193428 A1 | 8/2007 | Maclennan et al. | |
| 2008/0105334 A1 | 5/2008 | Leonardi et al. | |
| 2008/0245440 A1 | 10/2008 | Paumier | |
| 2010/0170379 A1 | 7/2010 | Maclennan et al. | |
| 2013/0161428 A1 | 6/2013 | Hongo | |
| 2014/0196818 A1 | 7/2014 | Weinberg et al. | |
| 2014/0196819 A1 | 7/2014 | Leonardi et al. | |
| 2014/0217220 A1 | 8/2014 | Weinberg | |
| 2015/0069160 A1 | 3/2015 | Roozeboom et al. | |
| 2015/0136276 A1 | 5/2015 | Green et al. | |
| 2015/0375233 A1 | 12/2015 | Daining et al. | |
| 2017/0079219 A1 | 3/2017 | Stanley et al. | |
| 2017/0087558 A1 | 3/2017 | Davis | |
| 2018/0125017 A1 | 5/2018 | Leonardi et al. | |
| 2018/0317405 A1 | 11/2018 | Leonardi et al. | |
| 2018/0352757 A1 | 12/2018 | Leonardi et al. | |
| 2020/0197947 A1 | 6/2020 | Verzilli et al. | |
| 2020/0222999 A1 | 7/2020 | Curry, Jr. | |

FOREIGN PATENT DOCUMENTS

| | | |
|---|---|---|
| EP | 1214979 | 1/2008 |
| EP | 2659768 | 11/2013 |
| EP | 2777385 | 5/2016 |
| EP | 3090824 A1 | 11/2016 |
| EP | 1833647 B1 | 7/2017 |
| WO | WO 2014110253 | 7/2014 |

OTHER PUBLICATIONS

Rayco Manufacturing Inc, Image of "RG1635D", 2003.
Bandit Industries Inc., Image of "Model 2890 Stump Grinder", 2011.
Bucktooth Grinding Co. LLC, "About Us", <http://www.bucktoothgrinding.com/about.html>, webpage publicly available at least as early as Apr. 28, 2013.
Vermeer, "SC802 Stump Cutter" Informational Brochure, 2015, 2 pages.
Greenteeth Manufacturing, "Reverse-S™ Cutting System", <https://www.greenteeth.com/reverse-cutting>, webpage publicly available at least as early as Sep. 13, 2018.
ArbLease, "Bandit 2550XP Tracked", <https://www.arblease.co.uk/machinery/bandit-2550xp-tracked/>, webpage publicly available at least as early as Sep. 13, 2018.
Leonardi, "Phantom Wheel", YouTube, <https://www.youtube.com/watch?v=BPl9nxrioy0>, May 17, 2010.
Leonardi, "M1 Blueshark Wheels and Teeth", <https://www.leonarditreecare.com/collections/m1-blueshark-wheels-and-teeth>, Apr. 12, 2012.

(56) References Cited

OTHER PUBLICATIONS

Greenteeth Manufacturing, "700 Series", <https://www.ceisupply.com/greenteeth-700-series-2>, webpage publicly available at least as early as Mar. 30, 2017.
Greenteeth Manufacturing, "Greenwheel & Quadwheel", <https:///www.greenteeth.com/greenwheel>, webpage publicly available at least as early as Sep. 13, 2018.
Alpine Magnum, "Multi Tip Replacement Teeth", <https://www.alpinemagnum.com/multi-tip.htm>, webpage publicly available at least as early as Feb. 8, 2005.
King Arthur's Tools, "Lancelot Squire About", <https://katools.com/lancelot-squire-combo-kits/>, webpage publicly available at least as early as Jun. 12, 2016.
Northern ArbSupplies, "Rotatech Praxis Quadrablade Teeth Set", <https://www.northernarbsupplies.co.uk/stump-grinder-teeth/3478-rotatech-praxis-quadrablade-teeth-set-7111604712879.html>, webpage publicly available at least as early as Sep. 13, 2018.
Patent Cooperation Treaty, International Searching Authority Invitation to Pay Additional Fees for Application No. PCT/US2019/017029 dated Jun. 24, 2019 (18 pages).
International Search Report and Written Opinion for Application No. PCT/US2019/017029 dated Sep. 17, 2019 (25 pages).
Bandit Industries, Inc., "The Beast Horizontal Grinders," parts catalog (2013) pp. 1-20.
Leonardi, "Leonardi M1 Silver Cutting System," YouTube (2010) 1 page.
Leonardi, "Leonardi M1 Gold Cutting System," YouTube (2010) 1 page.
Leonardi, "Leonardi M1 Technique Video," YouTube (2017) 1 page.
Leonardi, "M1 Wheels and Teeth," brochure (2019) 3 pages.
Quadco, "Mower & Grinder Teeth Pocket Guide" brochure/grinder application chart (2017) www.quadco.com, 2 pages.
Quadco, "Saw Tooth & Disc Pocket Guide" brochure/parts list (2017) www.quadco.com, 2 pages.
Vermeer, "Genuine Vermeer Grinder Tips," applications guide (2016) 4 pages.
Leonardi, "Phantom Wheel Stump Grinder", <https://www.leonarditreecare.com/products/phantom-wheel>, website publicly available as early as Sep. 9, 2020 (5 pages).
PowerTrac, "Other Attachments", <https://www.power-trac.com/otherattachments.htm>, website publicly available as early as Sep. 2, 2017 (12 pages).

* cited by examiner

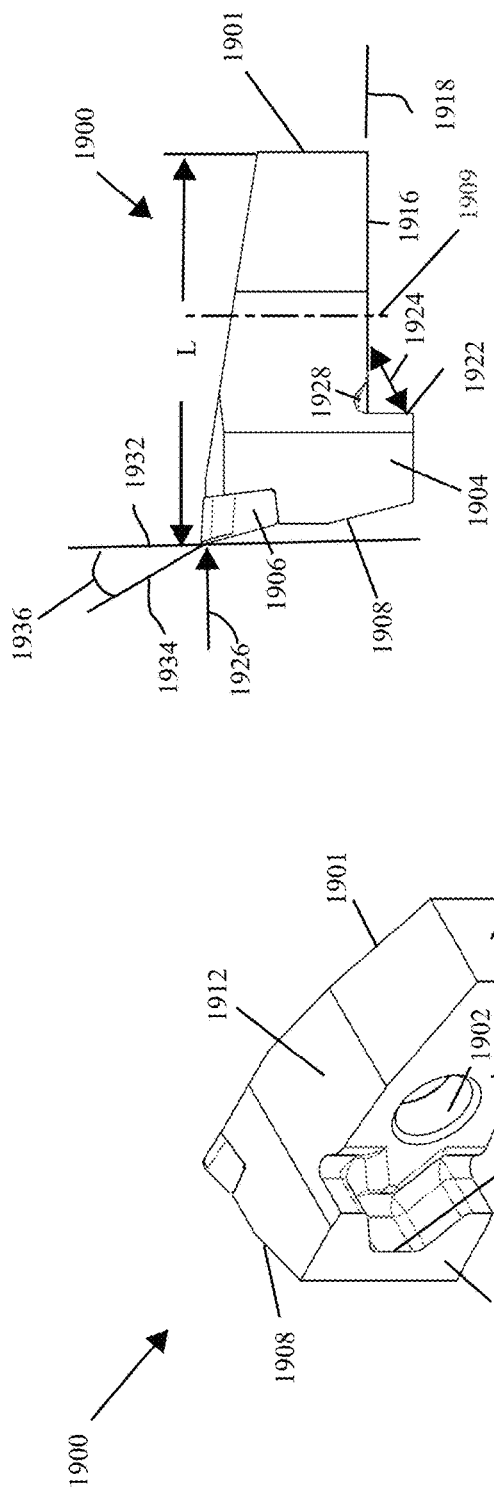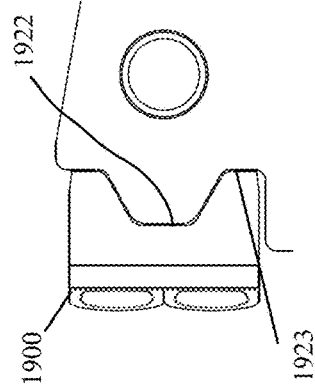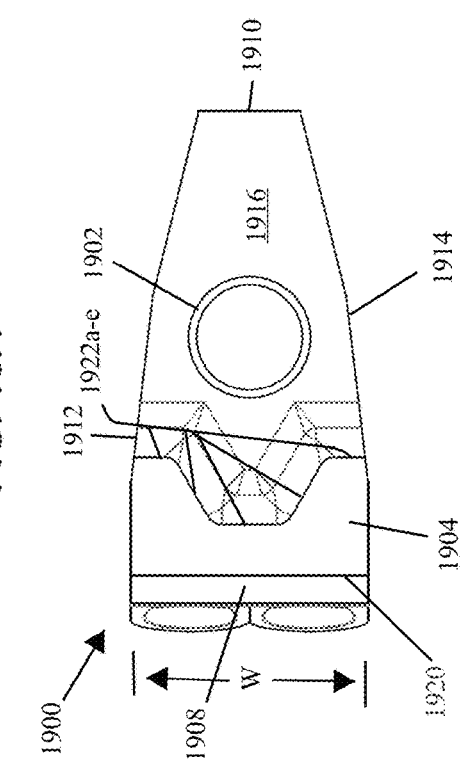

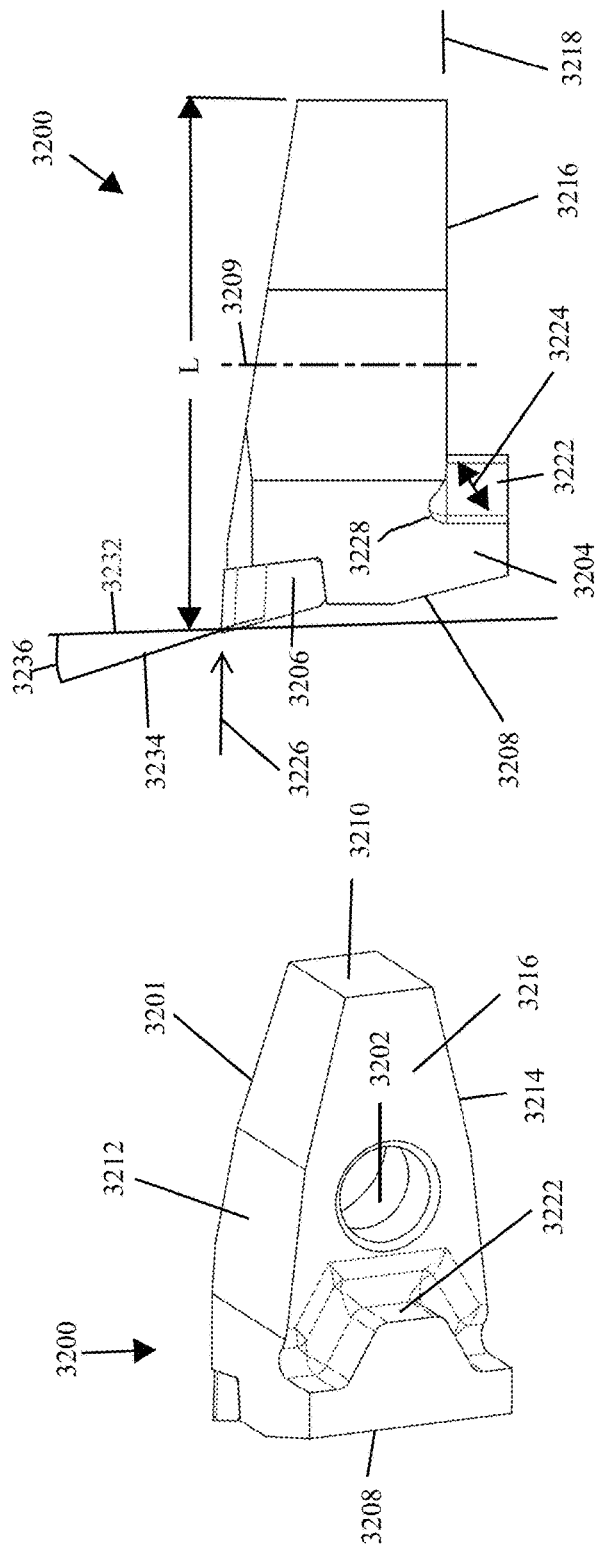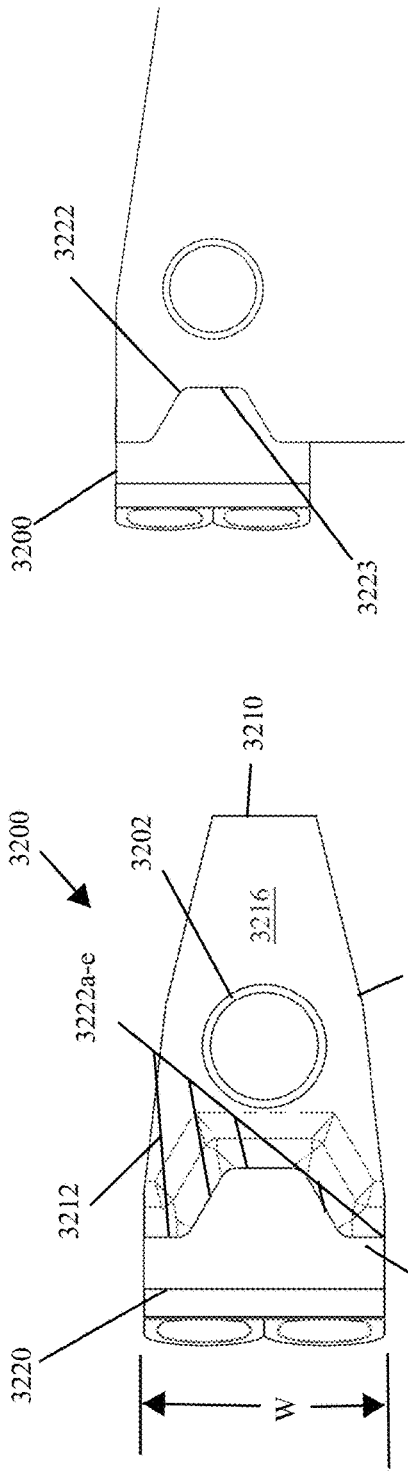
FIG. 32A  FIG. 32B  FIG. 32C  FIG. 32D

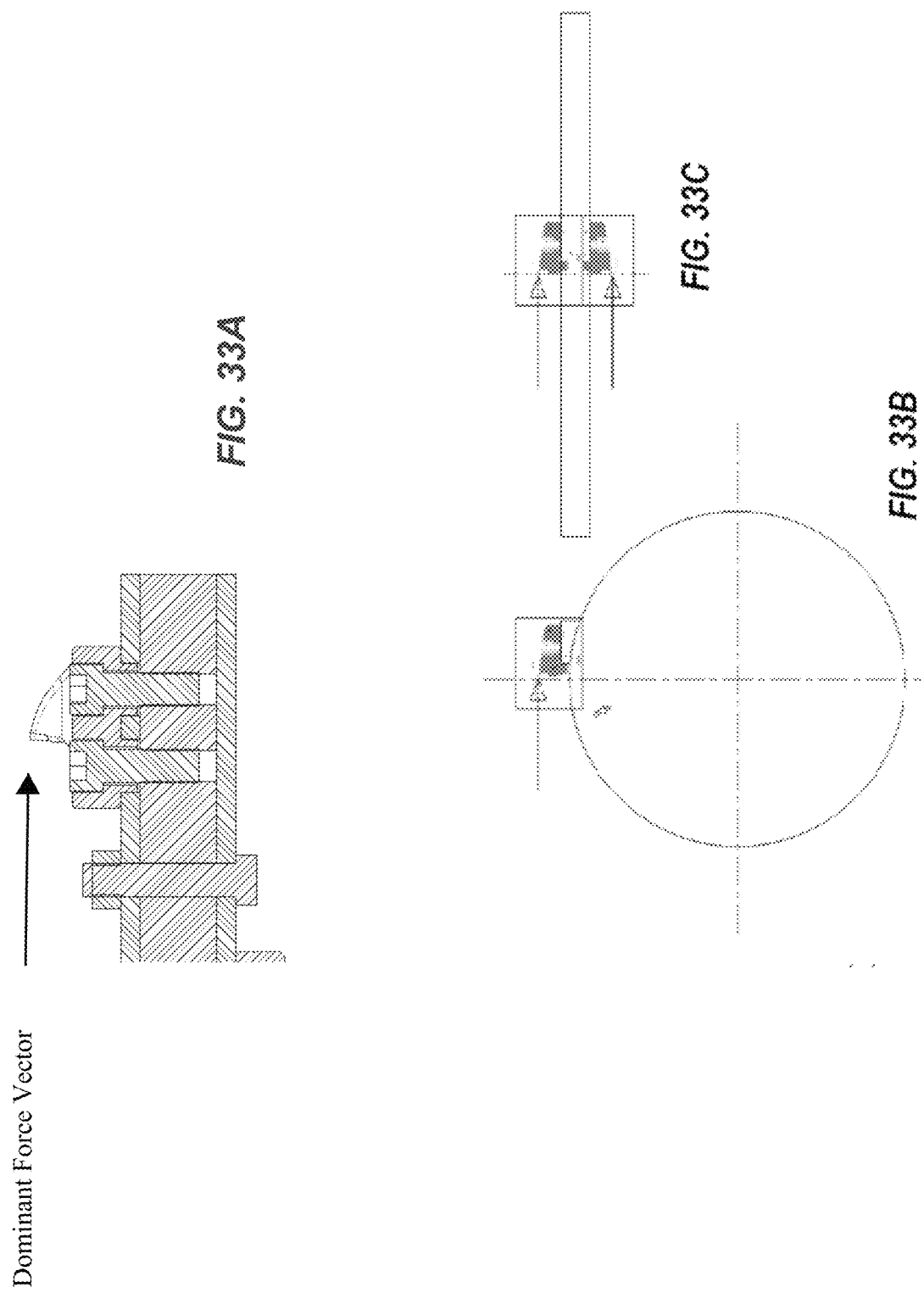

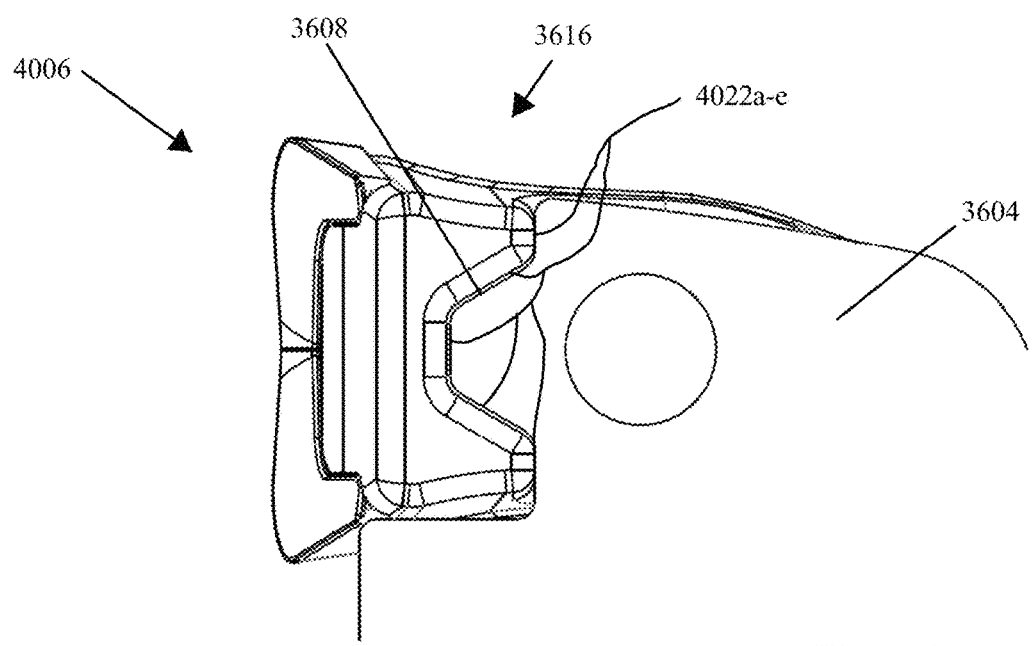
Fig. 46
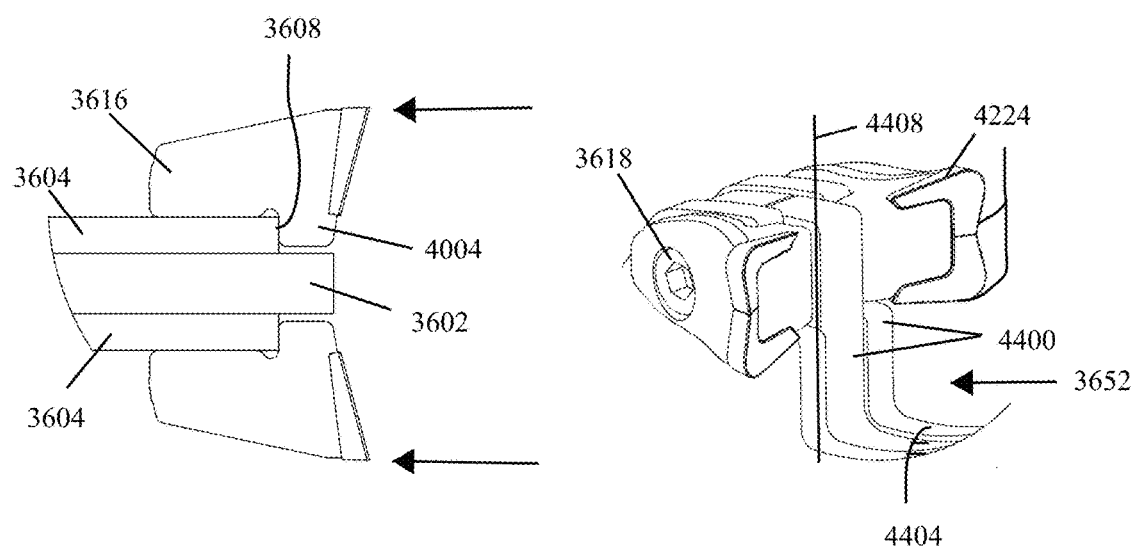
Fig. 47
Fig. 48

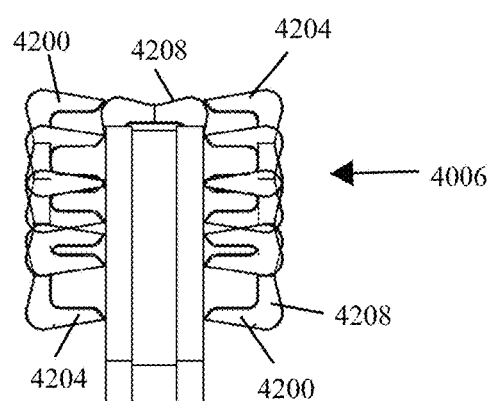
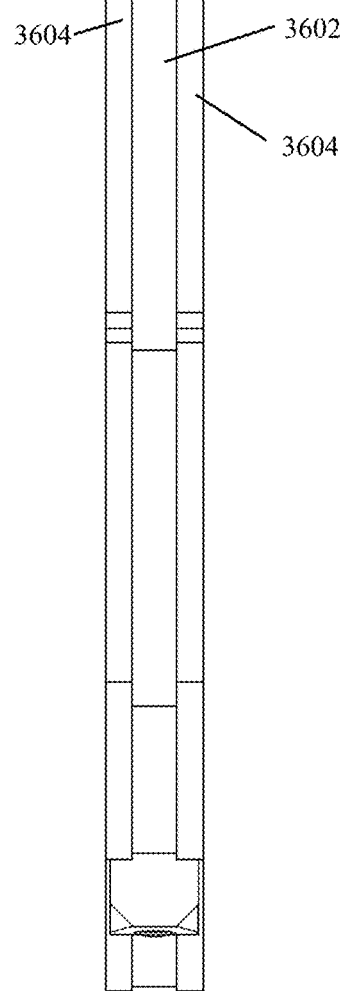
Fig. 49
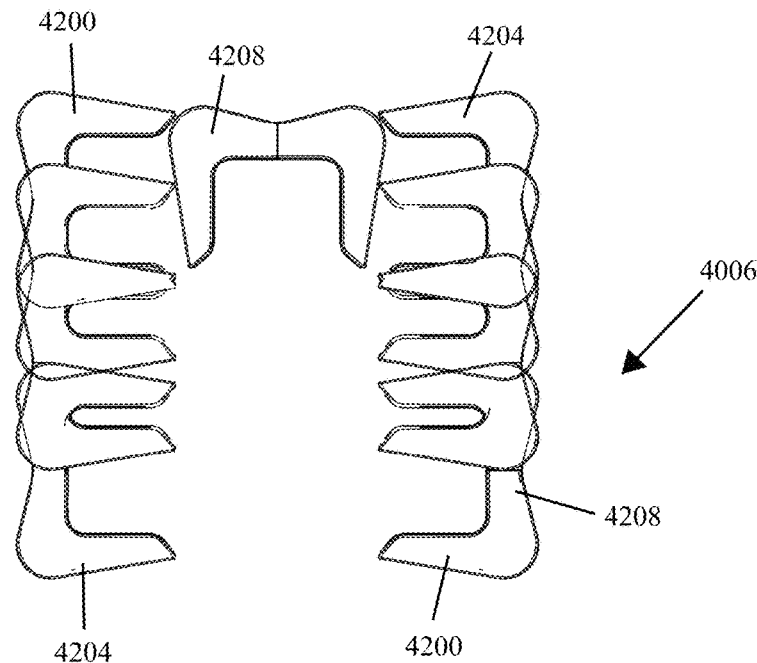
Fig. 50

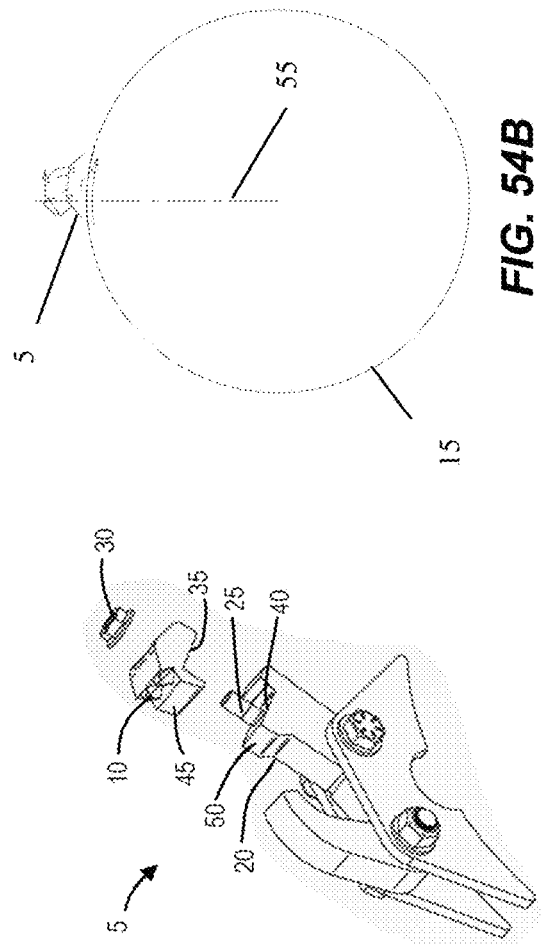
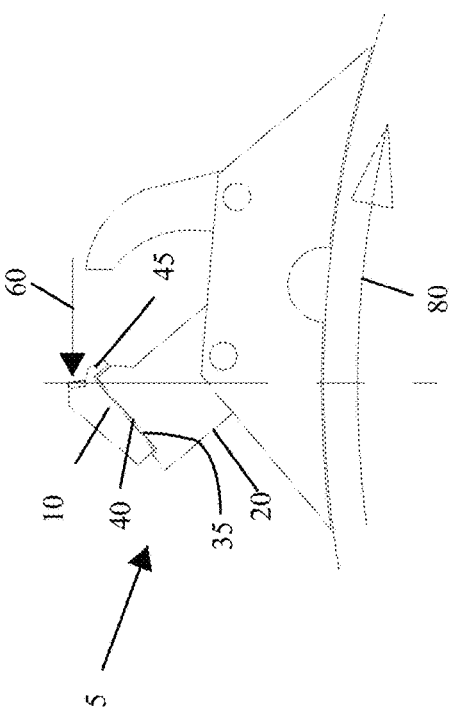
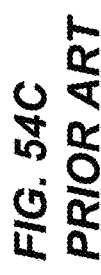
FIG. 54A PRIOR ART
FIG. 54B PRIOR ART
FIG. 54C PRIOR ART

CUTTER MOUNTING SYSTEMS AND CUTTERS FOR THE SAME

RELATED APPLICATIONS

This application claims the benefit of U.S. Provisional Patent Application No. 62/627,377 filed Feb. 7, 2018, and further claims the benefit of U.S. Provisional Patent Application No. 62/661,476 filed Apr. 23, 2018. The entire content of these provisional patent applications is hereby incorporated by reference herein.

BACKGROUND

The present disclosure relates generally to material reduction machines and processing tools (e.g., cutters) that are adapted to remove items such as tree stumps. Various methods and machines for removing or reducing the size of stumps are known. Examples of stump reduction machines are disclosed in U.S. Pat. No. 6,014,996 titled "Control System for Stump Cutters" assigned to Vermeer; U.S. Pat. No. 7,011,124 titled "Stump Grinder Having Automatic Reversing Feed Assembly" assigned to Tramor; U.S. Pat. No. 6,026,871 titled "Stump Cutter Safety System" assigned to Rayco; and U.S. Pat. No. 6,230,770 titled "Stump Chipper and Method for the Operation Thereof" assigned to Vermeer-Holland. Aspects discussed herein also apply to material reduction machines that use a drum, such as horizontal grinders, tub grinders, or mulchers like those discussed in U.S. Pat. Nos. 6,843,435; and 5,950,942.

Many material reduction machines use cutters (with 'teeth') as processing tools for material reduction. Some examples of existing cutters are Vermeer® Yellow Jackets™, Rayco® Super Teeth, and Bandit® Beast® knife style cutters. Some of these cutter tooth mounting systems place any excessive cutting load through the mounting bolts in shear (greater than what the frictional force between the cutter and the drive plate can support). The result is broken bolts and tips, but more importantly wheel bolt holes become misshapen (sometimes referred to as "egged out"). The result is a worsening joint between the cutter and cutter wheel that is more prone to repeat failures and eventually requires replacement of the cutter, cutter wheel, or both.

FIGS. 54A-D illustrate one type of Bandit® Beast® cutter assembly 5 and the arrangement of the cutter assembly 5 on a cutter drum 15. As shown in FIG. 54A, the cutter assembly 5 has a cutter 10 that is mounted onto the cutter drum 15 via a mounting bracket 20. The mounting bracket 20 is curved to conform to the outer shape of the cutter drum 15, and is generally secured to the cutter drum 15 via welding or similar attachment means. The mounting bracket 20 has a post 25 that extends generally upward (in the same plane as the drum 15), and the cutter 10 is coupled to the post 25 via alignment of a hole in the cutter 10 with the post. A nut 30 secures the cutter 10 to the mounting bracket 20. With reference to FIGS. 54C and 54D, the cutter 10 has a mounting surface 35 that is generally planar and that mates with a corresponding surface 40 on the mounting bracket 20. The cutter 10 also has an extension 45 that mates with a front edge 50 of the mounting bracket 20. FIGS. 54B-54D illustrate how the cutter assembly 5—the cutter 10 and the mounting bracket 20—is arranged on the cutter drum 15 relative to a plane 55 extending through the rotational center of the cutter drum 15. While the cutter assembly is shown at the top of the cutter drum 15, and the plane 55 is shown as a vertical plane, this is only for purposes of simplicity in describing the existing Bandit® Beast® system. It will be understood that, at the point of impact of the cutter 10 with an object (e.g., a stump), the plane 55 may be oriented other than vertical (e.g., horizontal or angled downward relative to horizontal). The dominant force vector 60 at the point of impact is tangential to the circle representing the cutter drum 15.

FIGS. 54C and 54D illustrate the Bandit® Beast® cutter assembly to more clearly show the orientation of the cutter 10 relative to the plane 55 and the dominant force vector 60 at the point of impact of the cutter 10 on an object. More specifically, a plane 65 defined by the mounting surface is non-parallel to the dominant force vector 60. The front of the cutter edge 70 on the cutter 10 is in a plane 72 with a rake angle 75 (e.g., approximately 5-15°) that is backward relative to the direction of travel (shown by arrow 80). In this orientation, the cutter 10 is susceptible to failure due to shear of the fastener post 25 or egging out of the hole in the cutter 10 because the mounting surface 40 is non-parallel with the dominant force vector 60. Stated another way, the resultant impact force acting on the cutter 10 is in a direction that is not perpendicular to the front edge 50, which generates a moment on the cutter 10 in a backward direction (relative to the direction of travel). This moment tends to cause rotation of the cutter 10 relative to the mounting bracket 20, which detrimentally increases the force on the fastener post 25 and tends to dislodge the cutter 10 from the bracket 20. Also, due to the negative rake angle 75 (i.e. backward relative to the direction of travel), the cutter 10 has to be designed more robustly directly behind the cutter edge 70 to resist failure.

Typically, existing cutter systems use robust fasteners to counteract the shear forces encountered during operation. Many existing systems include more than one fastener to secure the cutter onto a cutter wheel. In some cases, each of these fasteners can be up to 0.875 inches in diameter. Use of multiple, large fasteners undesirably increases the cost to manufacture the cutter and complicates the installation and removal of the cutters from the wheel.

SUMMARY

The present invention overcomes the disadvantages of existing systems in several ways.

In a first aspect, the invention provides a cutter configured to be mounted on a rotationally driven apparatus for material reduction of an object. The cutter includes a first end configured to first engage the object along a dominant force vector, a second end opposite the first end, a first side, and a second side opposite the first side. The cutter has a length between the first end and the second end, and a width between the first side and the second side. The cutter further includes an outer side, an inner side configured to engage the rotationally driven apparatus, and an aperture extending from the outer side to the inner side along a fastener axis that is substantially perpendicular to the dominant force vector. The aperture is configured to receive a fastener to secure the cutter to the apparatus. The cutter also includes a cutter tip on the first end and having a first cutting edge extending along the first side, a second cutting edge extending along the second side, and a third cutting edge extending along the outer side, the cutting edges defining therebetween a cutting face of the cutter tip. The cutting face is configured to define a cutting swath having a width between the first cutting edge and the second cutting edge as the cutter rotates with the apparatus. No portion of the first side or the second side extends outside the width of the cutting swath.

In a second aspect, the invention provides a cutter configured to be mounted on a rotationally driven apparatus for material reduction of an object. The cutter includes a first end including a cutting tip configured to first engage the object along a dominant force vector, a second end opposite the first end, a first side, and a second side opposite the first side. The cutter has a length between the first end and the second end, and a width between the first side and the second side. The cutter further includes an outer surface and an inner surface having portions configured to engage the rotationally driven apparatus. The inner surface includes a mounting surface portion configured to engage a first surface of the apparatus and a plurality of reaction surface portions configured to engage mating surfaces of the apparatus and disposed between the mounting surface portion and the first end. At least two of the plurality of reaction surface portions are angled relative to one another such that the plurality of reaction surface portions extend along the width from the first side to the second side in a non-planar manner. An aperture extends from the outer surface to the mounting surface portion along a fastener axis that is substantially perpendicular to the mounting surface portion and to the dominant force vector. The aperture is configured to receive a fastener to secure the cutter to the apparatus.

In another aspect, the invention provides a rotating cutting assembly including a wheel configured to be mounted on a rotationally driven apparatus for material reduction of an object and a cutter removably coupled to a side surface of the wheel. The cutter includes a first end configured to first engage the object along a dominant force vector, a second end opposite the first end, a first side, and a second side opposite the first side. The cutter has a length between the first end and the second end and a width between the first side and the second side. The cutter further includes an outer side, an inner side configured to engage the wheel, and an aperture extending from the outer side to the inner side along a fastener axis that is substantially perpendicular to the dominant force vector. The aperture is configured to receive a fastener to secure the cutter to the wheel. The cutter also includes a cutter tip on the first end and having a first cutting edge extending along the first side, a second cutting edge extending along the second side, and a third cutting edge extending along the outer side such that the cutting edges define therebetween a cutting face of the cutter tip. The cutting face is configured to define a cutting swath having a width between the first cutting edge and the second cutting edge as the cutter rotates with the apparatus. No portion of the first side or the second side extends outside the width of the cutting swath. The wheel further includes a gullet formed therein and adjacent the cutter, and wherein the gullet includes a straight segment defining a first leg of the gullet positioned adjacent the cutter tip, and an arcuate segment defining a second leg of the gullet.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

FIG. 3 is a front elevation view of the cutter wheel of FIG. 2, with rear, top, and bottom elevation views being similar.

FIG. 19A is a perspective view of another exemplary cutter including a single fastener aperture and a boss offset from the aperture.

FIG. 19B is a side view of the cutter of FIG. 19A.

FIG. 19C is a bottom view of the cutter of FIG. 19A illustrating the aperture and the boss.

FIG. 19D is a side elevation view of the cutter of FIG. 19A mounted onto a plate having a complementary recess or pocket for the boss.

FIG. 32A is a perspective view of another exemplary cutter including a single fastener aperture and a boss offset from the aperture.

FIG. 32B is a side view of the cutter of FIG. 32A.

FIG. 32C is a bottom view of the cutter of FIG. 32A illustrating the aperture and the boss.

FIG. 32D is a side elevation view of the cutter of FIG. 32A mounted onto a plate having a complementary recess or pocket for the boss.

FIG. 33A is a section view of a portion of a cutter wheel illustrating a dominant force vector acting on an exemplary cutter.

FIG. 33B is a schematic view of a cutter wheel illustrating a dominant force vector acting on an exemplary cutter.

FIG. 33C is a schematic view of another cutter wheel illustrating a dominant force vector acting on exemplary cutters.

FIG. 46 is a side elevation view of the cutter of FIG. 40 mounted onto a plate having a complementary boss-receiving feature.

FIG. 47 is partial top view of cutters mounted to the cutter wheel of FIG. 36.

FIG. 48 is a partial perspective view of two mounted cutters on the cutter wheel of of FIG. 36.

FIG. 49 is an end view of the cutter wheel of FIG. 36 schematically illustrating the cutter coverage pattern during revolution of the cutter wheel.

FIG. 50 is an enlarged end view of the cutter coverage pattern of FIG. 49.

FIG. 54A is an exploded perspective view of a prior art cutter assembly including a mounting bracket and a cutter.

FIG. 54B is a schematic view of the cutter of FIG. 54A mounted onto a cutter drum.

FIG. 54C is an enlarged schematic view of the cutter of FIG. 54A on the cutter drum.

DETAILED DESCRIPTION

The embodiments herein provide a means of distributing cutter tooth (e.g. stump cutter tooth) loading through an intermediate (wear) plate attached to a cutter wheel instead of through shear of a fastener coupling the cutter tooth to the cutter wheel. Prior designs show two fasteners of one cutter tooth sharing the cutter tooth's load which frequently creates excessive shear forces on the fasteners, causing failure or reduced life. Moreover, prior designs that use cutters embedded into recesses within the cutter wheel itself suffer from disadvantages of high manufacturing cost and additional cutter wheel wear that leads to replacement of an entire cutter wheel, which can be costly. For example, the interaction between the cutter and the cutter wheel cause the aperture in the cutter wheel to obtain wear and become misshapen, thereby requiring repair or replacement of the cutter wheel.

The present embodiments herein disclose a cutter wheel design such that cutter tooth loads are transferred to a drive plate through an intermediate mounting plate and/or a boss on the cutter tooth. All fasteners that pass through the intermediate mounting plate share the load and have minimal to no shear force exerted on the fastener itself. The intermediate mounting plate also serves as a replaceable wear plate. The embodiments described herein are significantly advantageous over cutter teeth mounted to a wheel in a co-planar fashion, like those described in the Background.

Figure 1:
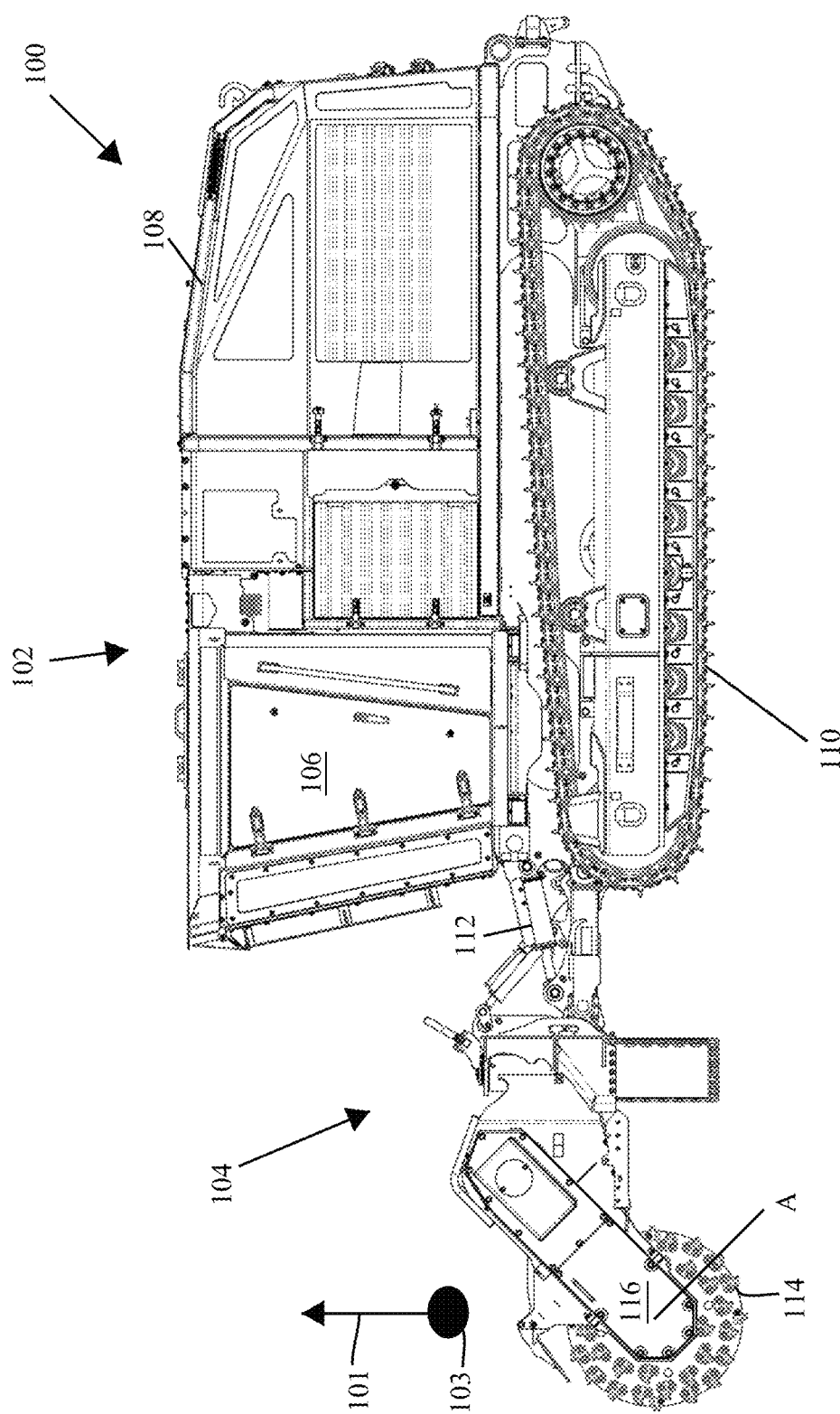
FIG. 1 illustrates an exemplary material reduction machine including a system for integrated cutter mounting and wheel wear embodying aspects of the present invention.

FIG. 1 depicts a material reduction machine 100. The material reduction machine 100 includes a mainframe 102 and a cutter system 104 attached thereto. The mainframe 102 is a vehicle including a cab 106, an engine compartment 108, and a track 110. An operator sits within the cab 106 to control operation of the material reduction machine 100. The engine compartment 108 houses an engine for powering the material reduction machine 100. The track 110 maneuvers the material reduction machine 100 across a working terrain. It should be appreciated that mainframe 102 need not be a vehicle as shown, but instead could be a walk-behind mainframe, such as that shown in FIG. 1 of U.S. patent application Ser. No. 14/147,277, filed Jan. 3, 2014 by Vermeer Manufacturing Company and entitled "Stump Cutter Disc With Recessed Tooth Pockets".

The cutter system 104 is coupled to the mainframe 102 via a sub-frame 112. The sub-frame 112 is configured to raise and lower a cutter wheel 114 relative to the mainframe 102, such as along axis 101 within FIG. 1. The sub-frame 112 is further configured to swing the cutter wheel 114 left and right relative to the mainframe 102, such as along axis 103 within FIG. 1. It should be appreciated that the axis 101 and the axis 103 need not be entirely perpendicular to one another, or perpendicular to the mainframe. In other words, the cutter wheel 114 may move closer and further away from the mainframe 102 when either raising, lowering, swinging left, or swinging right, such as in an arcuate motion. The sub-frame 112 may further support a drive system 116 that powers and rotates the cutter wheel 114. The drive system 116 may include a driveshaft at the axis of rotation A of the cutter wheel 114 and associated drive system components for rotating the driveshaft and thereby rotating the cutter wheel, and controls that are operable by the operator within the cab 106 of the material reduction machine 100.

Figure 2:
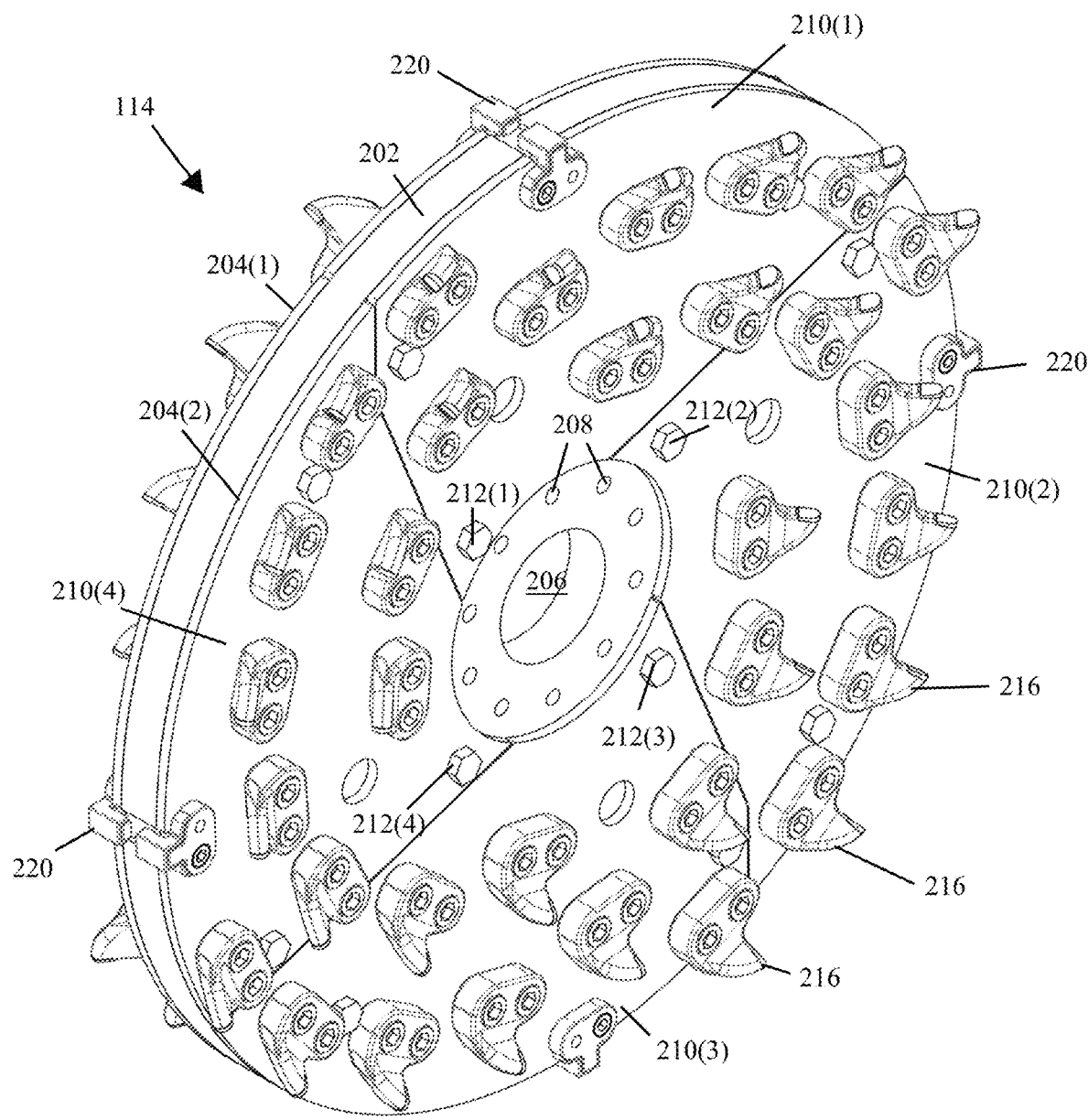
FIG. 2 is a perspective view of the cutter wheel of FIG. 1.
Figure 4:
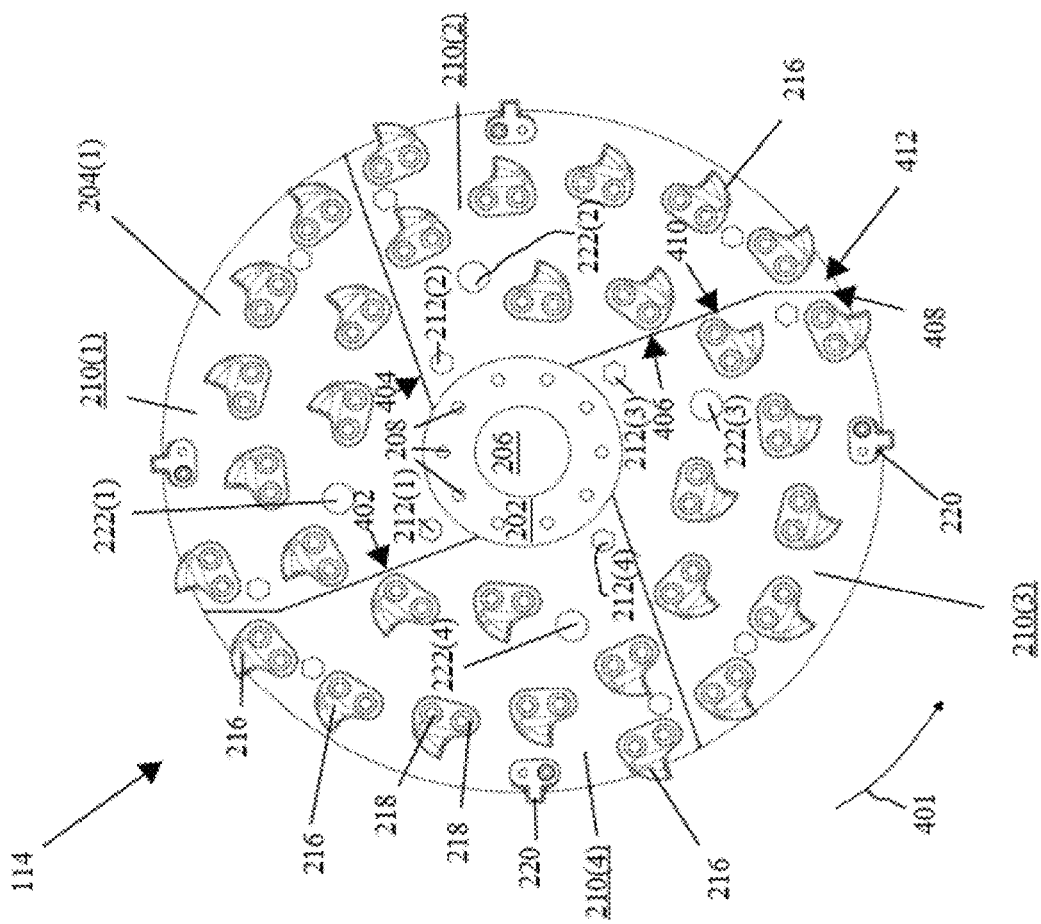
FIG. 4 is a right elevation view of the cutter wheel of FIG. 2, with a left elevation view being a mirror image thereof.
Figure 3:
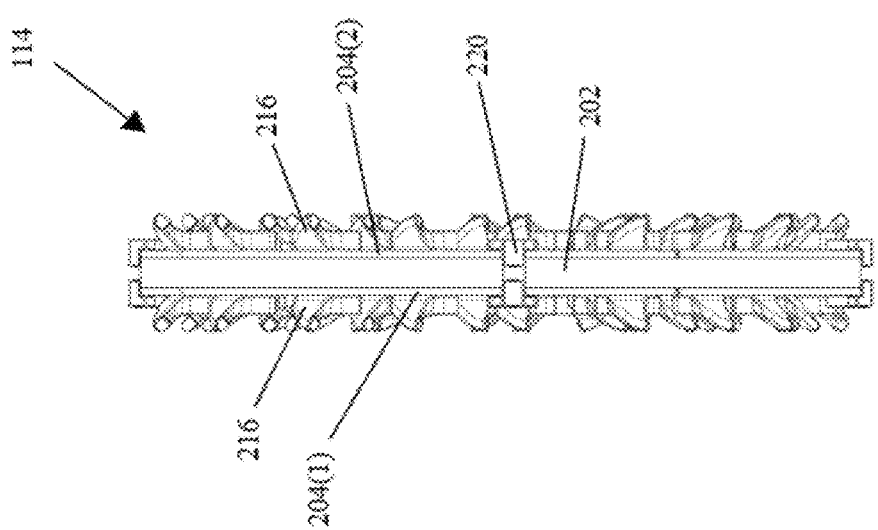

Referring to FIGS. 2-5, the cutter wheel 114 includes a drive plate 202, and at least one wear plate 204 located on each side or face of the drive plate 202. In FIGS. 2-4, a first wear plate 204(1) and a second wear plate 204(2) are shown. It should be appreciated that there may be only a single wear plate 204 located on one side of the drive plate 202.

The drive plate 202 may have a mass, or mass moment of inertia, specifically designed to provide enough potential energy to power the cutters 216, 220 (described below) through the initial engagement with the wood or material being reduced. The illustrated drive plate 202 is a single plate which is formed from a single material (such as grade 50 steel, steel having a minimum yield of 50,000 PSI, abrasion-resistant material, hard-faced material, or similar material). In alternative embodiments, the drive plate 202 may include a plurality of drive plates (each being of a single material) adhered, bonded, welded, or positioned adjacent to one another. Similarly, each wear plate 204 may include a plurality of wear plates that are adhered, bonded, welded, or positioned adjacent to one another.

The drive plate 202 is configured to couple to the drive system 116. For example, the drive plate 202 includes a driveshaft aperture 206 and a plurality of driveshaft mounting apertures 208 each of which are configured such that driving torque is transferred from the drive system 116 to the cutter wheel 114. In other embodiments, the driveshaft may be a stub shaft which only attaches to one side of the drive plate 202.

Each wear plate 204 includes an inner driveshaft mounting aperture configured to allow the drive system 116 to connect to the drive plate 202 without connecting to each wear plate 204. In other embodiments, each wear plate 204 may entirely cover the drive plate 202. Each wear plate 204 may have a diameter or outer dimension that is the same or greater than the diameter or outer dimension of the drive plate 202. The embodiments in which the wear plate 204 has an outer dimension that is larger than the outer dimension of the drive plate 202 provide the advantage that the wear plate 204 protects the circumference of the drive plate 202 from wear during operation of the material reduction machine 100. The profile of the cutter wheel 114 is not limited to a circular profile shape, such as that shown in the embodiments of FIGS. 2-5. Instead the profile of the cutter wheel 114 may be any shape desired, such as generally an oval, star, polygonal shape, helical shape, combination thereof, or other arbitrary shape. One such additional profile shape is shown in FIGS. 9-12, discussed below.

A disadvantage of current cutter technology is wear on the wheel. Wheels are generally made of a moderately wear resistant material (e.g., T1) and are often covered in hard facing. In high use, wear from land clearing operations may be so significant that frequent repairs to the wheel still need to be made. Embodiments herein, including those described below, provide the advantage that the drive plate 202 may be manufactured using a first material that has a first wear resistance, and the wear plates 204 may be manufactured using a second material that has a second wear resistance greater than the first wear resistance. In an example, the first material may be grade 50 steel, and the second material may be high carbon abrasion resistant steel. The material of the drive plate 202 may have a lower carbon content than the material of the wear plates 204. This lower carbon content of the drive plate 202 facilitates machinability of the drive plate 202, and also, in some embodiments, facilitates welding cutters or cutter mounts to the outer periphery of the drive plate 202.

Each wear plate 204 has a thickness that may be equal or unequal relative to the thickness of the drive plate 202. In some embodiments, each wear plate 204 has a thickness that is less than a thickness of the drive plate 202. These embodiments provide the advantage of easier and lower cost manufacturing. A material's wear resistance typically affects the manufacturability of items using the material. A multi-layered cutter wheel, such as that shown in FIGS. 1-4 allows for the drive plate 202 to be manufactured having an equal or greater thickness than the wear plates 204. The drive plate 202, being of a less-wear-resistant material (although the drive plate 202 may have the same wear-resistance as the wear plate 204) is more easily manufactured (because of reduced thickness and/or reduced wear resistance) and may be manufactured using less costly manufacturing techniques. The wear plates 204 are easier to manufacture because the wear plates 204 are thinner than the drive plate 202 when compared to manufacturing an entire cutter wheel of similar wear-resistant material. Therefore, the present invention provides the advantages of easier manufacturing and lower cost.

In some embodiments, each wear plate 204 can be a single plate. However, in the illustrated embodiments, one or more of the wear plates 204 may include a plurality of wear plate segments 210 that collectively form the wear plate 204. For example, wear plates 204(1), 204(2) include four wear plate segments 210(1)-210(4). It should be appreciated that there may be more or fewer wear plate segments without departing from the scope hereof. Embodiments including wear plate segments provide the advantage that a wear plate segment is lighter than a single, all-encompassing wear plate. As such, a single operator may replace the wear plate because the operator is able to lift the wear plate segment. Another advantage is that replacing a wear plate segment does not require removal of the drive plate from the shaft. In embodiments, the wear plate segments 210 that collectively form a wear plate 204 may be statically and dynamically balanced. Thus, the operator may replace an entire set of wear plates 210 (e.g. all wear plate segments 210 that collectively form a single wear plate 204) and maintain balance of the cutter wheel 114.

The illustrated wear plates 204 and/or wear plate segments 210(1)-210(4) are shown as being planar parts without bends, projections, or other features deviating from the plane. This facilitates manufacturing and assembly. Furthermore, in each of the embodiments illustrated herein, the wear plates or wear plate segments operate to cover a majority (i.e., more than half) of the surface area of the side of the drive plate. In some embodiments, at least seventy-five percent of the surface area of the side of the drive plate is covered by the wear plate or wear plate segments. In yet other embodiments, at least eighty-five percent of the surface area of the side of the drive plate is covered by the wear plate or wear plate segments. In other embodiments, at least ninety-five percent of the surface area of the side of the drive plate is covered by the wear plate or wear plate segments. In the illustrated embodiments, the wear plates or wear plate segments extend over all portions of the side of the drive plate where cutters are mounted.

Each wear plate segment 210 includes a leading edge and a trailing edge that is defined relative to the direction of rotation of the cutter wheel during operation. When mounted, the leading edge of one wear plate segment is generally aligned with the trailing edge of the adjacent wear plate segment such that the leading edge and the trailing edge of the adjacent wear plate segments define a joint. For purposes of description and the claims, the joint can interchangeably be referred to by either the trailing edge or the leading edge of the adjacent wear plate segments. The joint (e.g., the leading edge of one wear plate segment or the trailing edge of the adjacent wear plate segment) may extend radially (i.e. along an axis or plane extending through the rotational center of the cutter wheel). In some embodiments, the joint may be angled forward or backward relative to the direction of rotation. For example, as shown in FIG. 4, each wear plate segment 210 includes a leading edge 402 and a trailing edge 404 that define a joint that is angled in a direction that is backward relative to the direction of rotation of the cutter wheel 114 during operation (i.e. during rotation of the cutter wheel 114 in the direction shown by arrow 401). The leading edge 402 and trailing edge 404 are only labeled in FIG. 4 relative to wear segment 210(1) for simplicity in understanding the figure. However, it should be appreciated that each of the wear plate segments 210(1)-210(4) includes a leading and trailing edge 402, 404. The backward angle of the leading and trailing edges 402, 404 provides the advantage that material will not be driven inward by continued rotation and thus catch on the edge of each wear plate segment 210 during operation.

In certain embodiments, each of the wear plate segments 210 has the same profile (i.e. shape). However, in some embodiments, the wear plate segments 210 may have different shapes from one another that are coordinated to form the wear plate 204 and thus may accommodate unique cutter patterns. For example, as shown in FIG. 4, wear plates 210(1) and 210(3) have a first shape, and wear plates 210(2) and 210(4) have a second shape. Each of the first and second shapes is alternating within the wear plate 204. The first shape includes a leading edge 402 that has a first angled edge portion 406 and a second angled edge portion 408 that is different from and angled relative to the first angled edge portion 406. The trailing edge 404 of the second shape has a complementary first angled edge portion 410 and a second angled edge portion 412 such that the first shape mates with the second shape.

The wear plate segments 210, or the entire wear plate 204 if there are no segments thereof, may be removable from the drive plate 202 without removing the drive plate 202 from the drive system 116. This configuration provides easy maintenance, and/or replacement, of the wear plates 204 without having to take apart the entire cutter wheel 114.

In some embodiments, an alignment aperture 212 may extend through each wear plate 204 and the drive plate 202 to facilitate aligning and mounting the wear plates 204 onto the drive plate 202. During assembly of the cutter wheel 114, an alignment fastener (such as a bolt, screw, pin, etc.) may be inserted (e.g. press fit, or fastened with a nut, spring clip, etc.) within the alignment aperture 212. An alignment fastener is shown located in each of alignment apertures 212(2)-212(4). In some embodiments, the alignment fastener is maintained within the alignment aperture 212 during operation of the cutter wheel 114. In other embodiments, the alignment fastener is removed from the alignment aperture 212 during operation of the cutter wheel 114. In embodiments including multiple wear plate segments 210, each wear plate segment 210 may include an alignment aperture 212 there through (and also through the drive plate 202).

Figure 7:
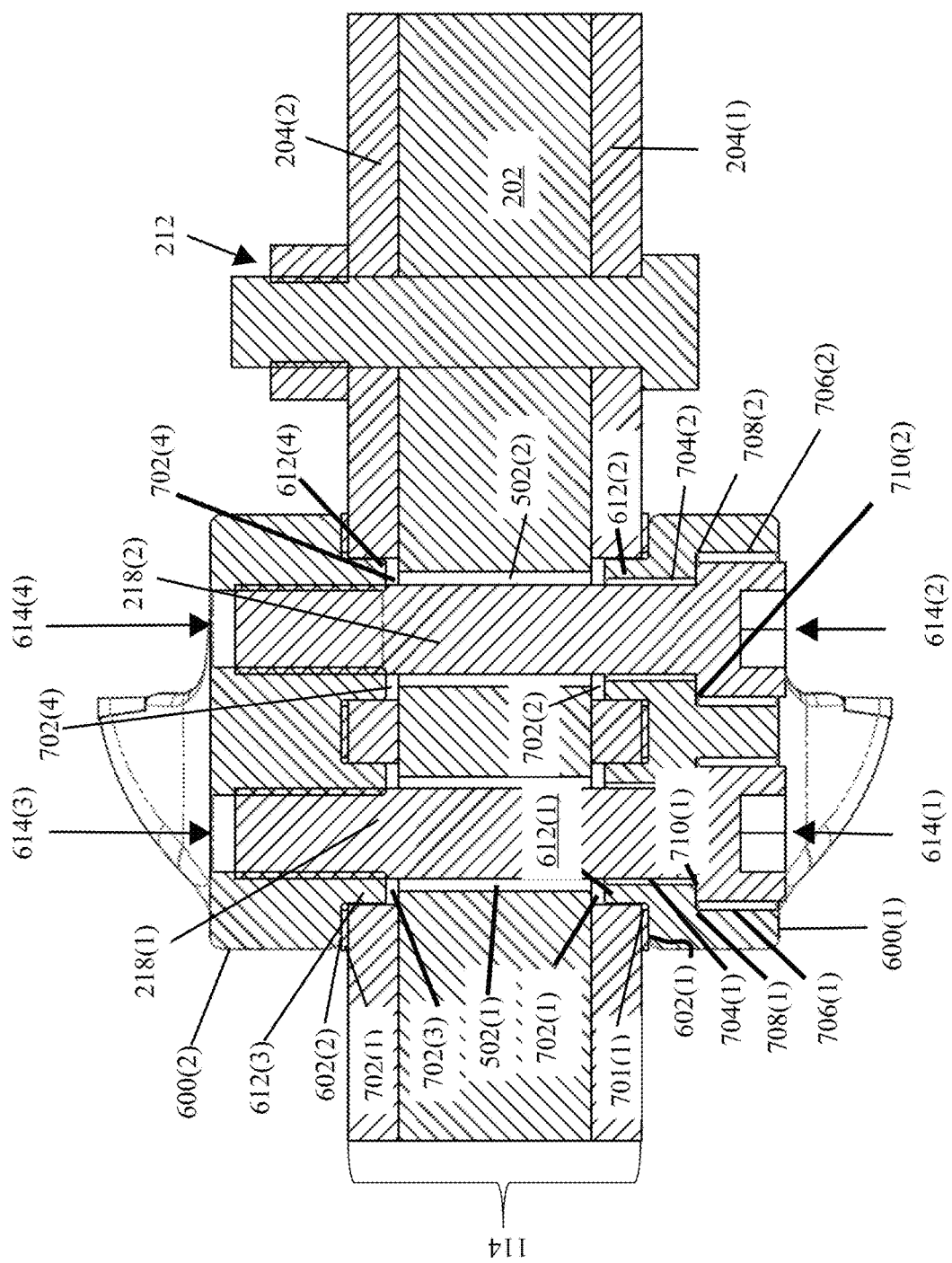
FIG. 7 is a cross-section view of two cutters consistent with what is shown in FIGS. 6A, 6B that are symmetrically mounted together on the cutter wheel of FIG. 2 that includes a drive plate and wear plates sandwiching the drive plate.
Figure 8:
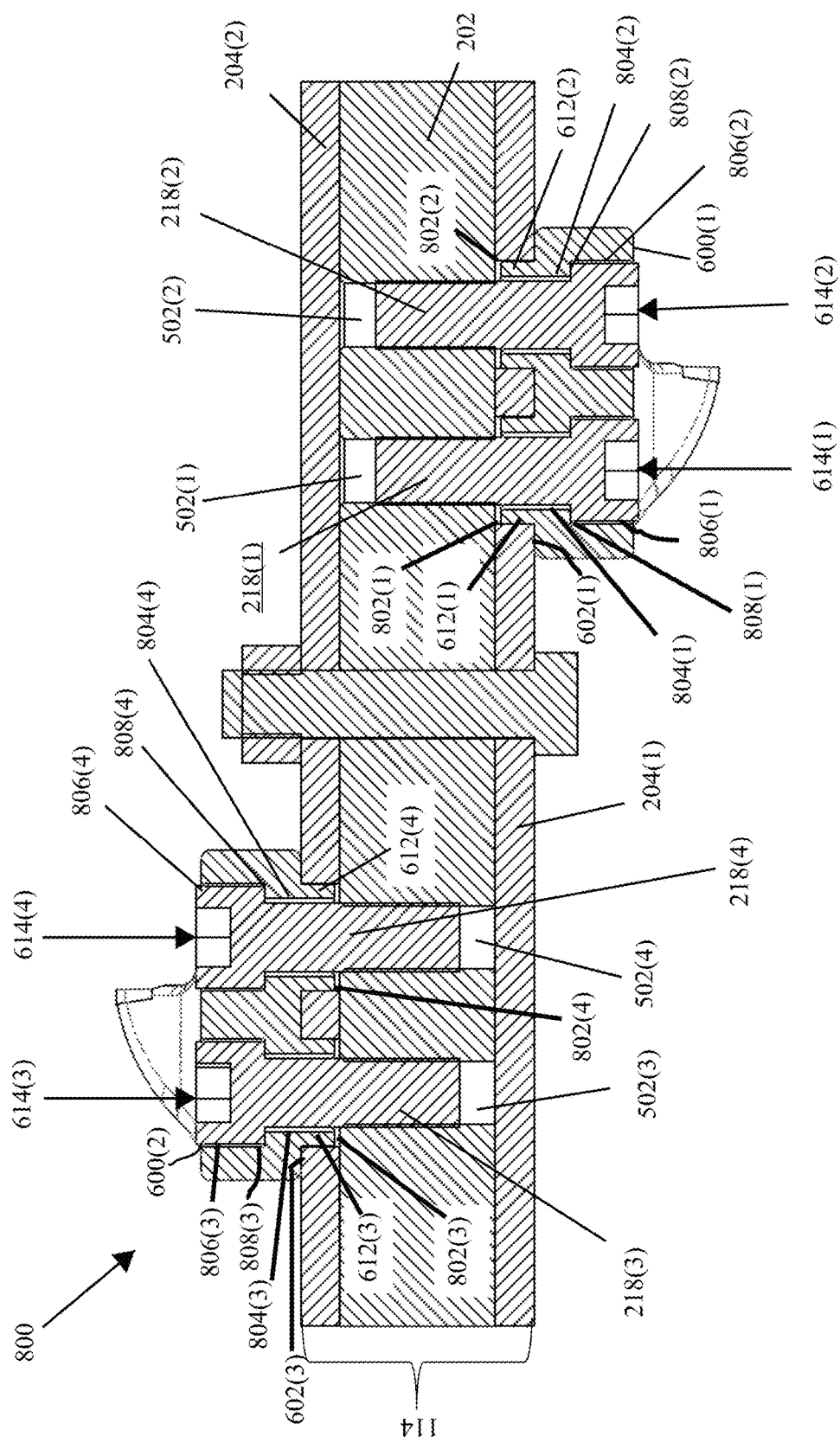
FIG. 8 is a cross-section view of two the cutters consistent with what is shown in FIGS. 6A, 6B that are mounted offset on the cutter wheel of FIG. 2 that includes the drive plate and wear plates.

A plurality of cutters 216 may be fastened or coupled to the cutter wheel 114 at a surface of the wear plate 204 that is opposite the surface facing the drive plate 202. The cutters 216 may be fastened with one or more fasteners 218. It should be appreciated that although two fasteners are shown per cutter 216 in FIG. 4, there may be more or fewer fasteners per cutter without departing from the scope of the invention. The fastener 218 may create a clamping force between the cutter 216, each wear plate 204, and the drive plate 202 such that the wear plate 204 is held in place relative to the drive plate 202 via friction between the wear plate 204 and the drive plate 202. As such, the more cutters 216 that are coupled to the cutter wheel 214, the greater the friction is between the drive plate 202 and the wear plate 204. It should be appreciated that all cutters 216 may be the same in some embodiments, or in certain embodiments, there may be a first type of cutter (e.g. cutters 216) and a second type of cutter 220. The second type of cutter 220 may be located along the circumference of the cutter wheel 114, while the first type of cutter 216 is located on the outer surfaces of the cutter wheel 114. Not all cutters 216, 220 are labeled in FIGS. 2-4 for clarity. The cutters 216, 220 may be coupled to the cutter wheel 114 via the fastener 218 engaging the drive plate 202, in some embodiments such as shown in FIG. 8. In additional or alternative embodiments such as shown in FIG. 7, the fasteners 218 couple pairs of cutters 216, 220 together such that the fastener couples one cutter, located on a first side of the cutter wheel 114, to a second cutter 216 located on a second side of the cutter wheel 114, thereby producing the clamping force to maintain the wear plate 204 in location relative to the drive plate 202.

If the friction caused by the collective fasteners 218 is not sufficient to maintain the wear plate 204 in location relative to the drive plate 202, there may be additional fasteners that fasten the wear plate 204 to the drive plate 202. These additional fasteners can be located at the alignment apertures 212. It will be appreciated that the friction between the wear plates 204 and the drive plate 202 caused by the fasteners 218 may be greater than the friction caused by the additional fasteners located at the alignment apertures 212.

As shown in FIG. 4, the cutter wheel 114 can include maintenance apertures 222(1)-222(4). Maintenance apertures 222 prevent rotation of the cutter wheel 114 during service (such as removing/installing cutters 216, wear plates 204, or wear plate segments 210) via a pin or bar (or another device component) that is inserted into the apertures 222. The tightening of fasteners on the wheel 114 generally causes the cutter wheel 114 to rotate, which may be inconvenient and increase difficulty for servicing the wheel 114. To avoid this, the cutter wheel 114 can be rotated manually so the pin/bar/device component of the sub-frame 112 can be engaged in one of the maintenance apertures 222 to prevent rotation.

Figure 5:
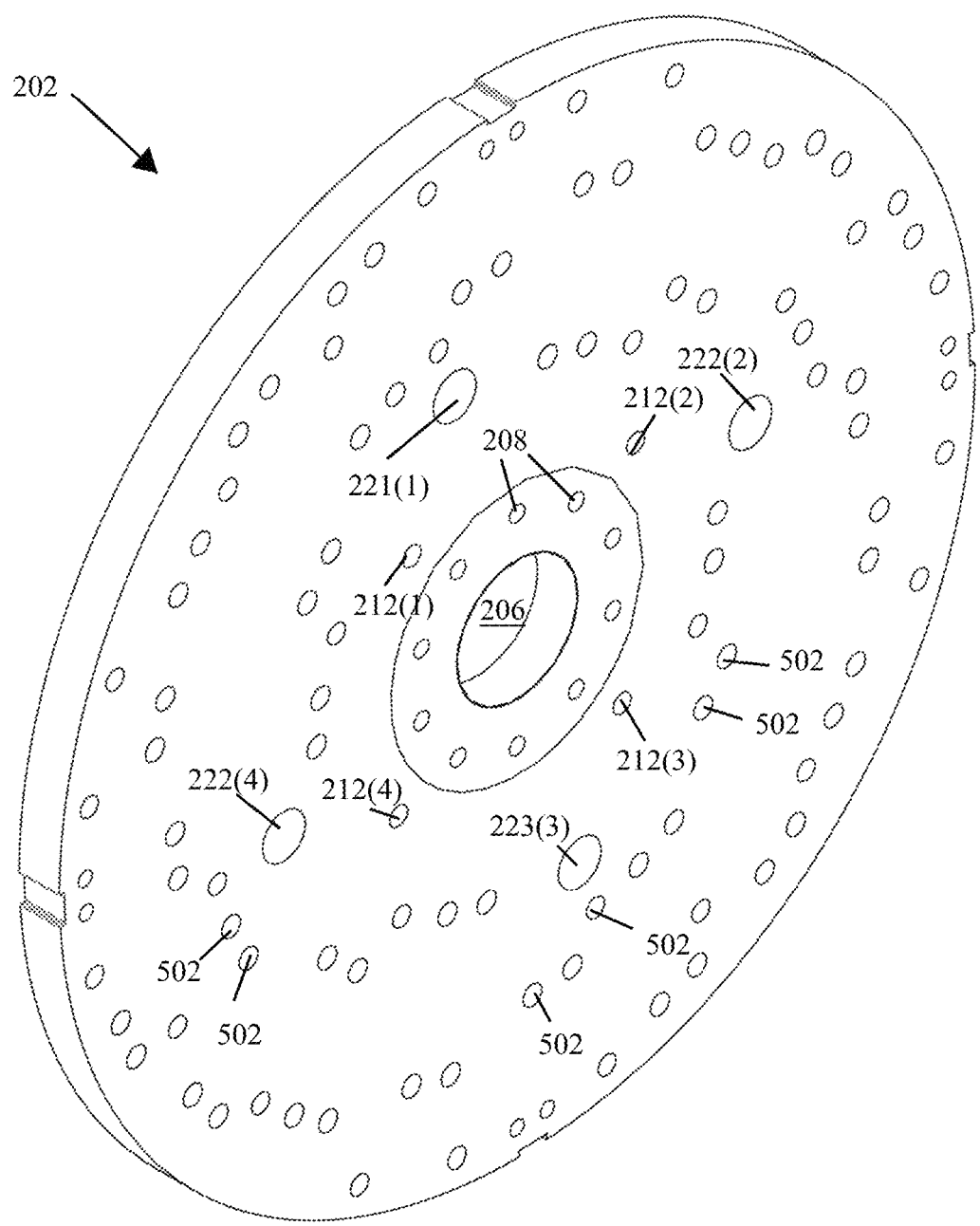
FIG. 5 shows the drive plate of FIG. 2 in further detail, in embodiments.

As shown in FIG. 5, the drive plate 202 is a single plate (i.e. it is not segmented like embodiments of the wear plates 210 discussed above). The drive plate 202 includes the maintenance apertures 222(1)-222(4) therethrough, and a plurality of mounting apertures 502. The mounting apertures 502 may extend all the way through the drive plate 202, particularly where the fasteners 218 couple pairs of cutters 216 on each side of the cutter wheel 114 together, thereby producing the above-discussed clamping force. The mounting apertures 502 may extend partially or all the way through the drive plate 202 and are threaded, particularly where the fasteners 218 couple to the drive plate 202 directly, thereby producing the above discussed clamping force. The mounting apertures 502 may be oversized relative to the fastener 218 in embodiments where the fastener couples two of the cutters 216 together such that shear force on the fastener 218 is reduced while tension force on the fastener 218 is maintained. With the mounting apertures 502 being larger than the diameter of the fasteners 218, the fasteners 218 can extend through the drive plate 202 without contacting the drive plate 202 (see FIG. 7).

Figure 6A:
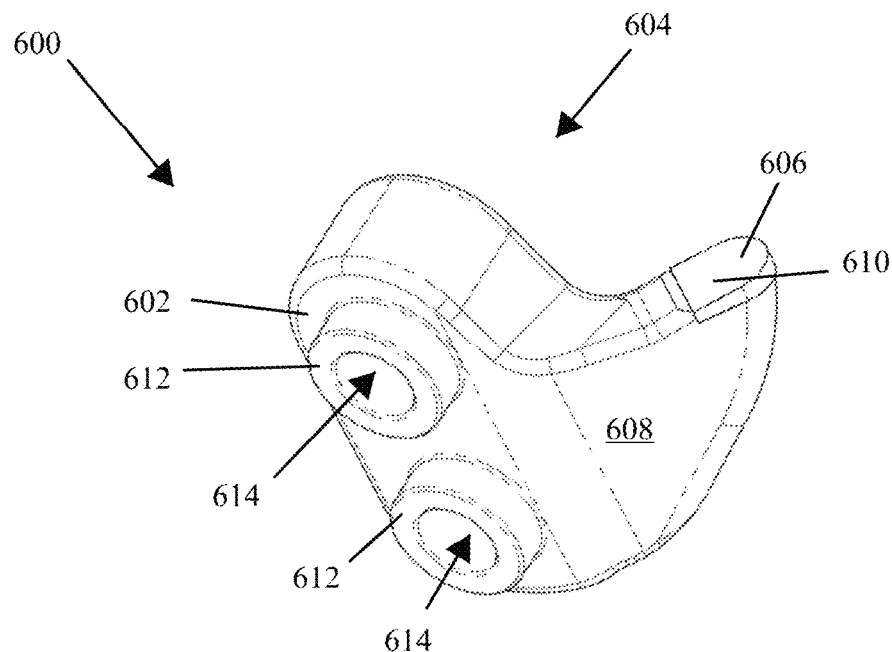
FIG. 6A is a perspective view of an exemplary cutter attached to the cutter wheel of FIG. 2.

FIG. 6A depicts a cutter 600 that is consistent with the present invention. The cutter 600 is an example of the cutter 216 of the system 100. It should be appreciated that the cutters may have alternate shapes and configurations without departing from the scope hereof. Examples of such different cutters will be described further below.

The cutter 600 includes an inner surface 602 and an outer surface 604 opposite the inner surface 602. A cutter tip 606 extends from the outer surface 604. The cutter tip 606 may include a projection 608 and a cutter wear pad 610. The cutter wear pad 610 may be separate from, integral with, or otherwise a removable attachment on the cutter projection 608 (e.g., a carbide insert). The cutter tip 606 may be angled to provide a rake angle that is zero, positive, or negative (in a radial direction and/or an axial direction relative to the wheel and the direction of travel). It should be appreciated that all cutters described herein may include a cutter tip similar to cutter tip 606.

The inner surface 602 is configured for location against the wear plate 204 of the cutter wheel 114. In some embodiments, the inner surface 602 abuts the wear plate 204 directly. In the illustrated embodiment, a washer or shim 701 (see FIG. 7) can be located between the outer surface of the wear plate 204 and the inner surface 602. The washer or shim 701 ensures even clamp load in the event that the inner surface 602 has irregularities. The washer or shim 701 may comprise a material that is softer than the cutter 600 and the wear plate 204 and is sandwiched between the two harder materials of the cutter 600 and the wear plate 204.

The cutter 600 includes two bosses 612 extending outward from the inner surface 602. Although the cutter 600 is described in detail with two bosses 612, it will be appreciated that the cutter 600 can include a single boss 612. The bosses 612 are configured to extend into a boss receiving recess on the wear plate 204. Each illustrated boss 612 is concentric around a cutter fastener-mounting aperture 614, although the bosses 612 may be offset from the fastener-mounting aperture 614. For example, the boss may be offset in a forward direction of rotation of the cutter wheel 114 when operating. In such offset embodiments, the fastener-mounting aperture 614 (and/or wear-plate mounting apertures 702, 802 discussed below) may be oversized relative to the fastener 218 such that shear force on the fastener 218 is reduced while tension force of the fastener 218 is maintained.

In some embodiments, a single boss 612 may surround multiple fastener-mounting apertures 614. The boss 612 may be cylindrical as shown, or have other shapes (e.g., square, rectangular, or polygonal; see examples illustrated in FIGS. 13-19). The boss 612 may form the profile of the inner surface 602 instead of taking the form of a protrusion extending outward from the surface 602. The fastener-mounting aperture 614 is configured to be aligned with the mounting apertures 502 in the drive plate 202 discussed relative to FIGS. 2-5.

Figure 6B:
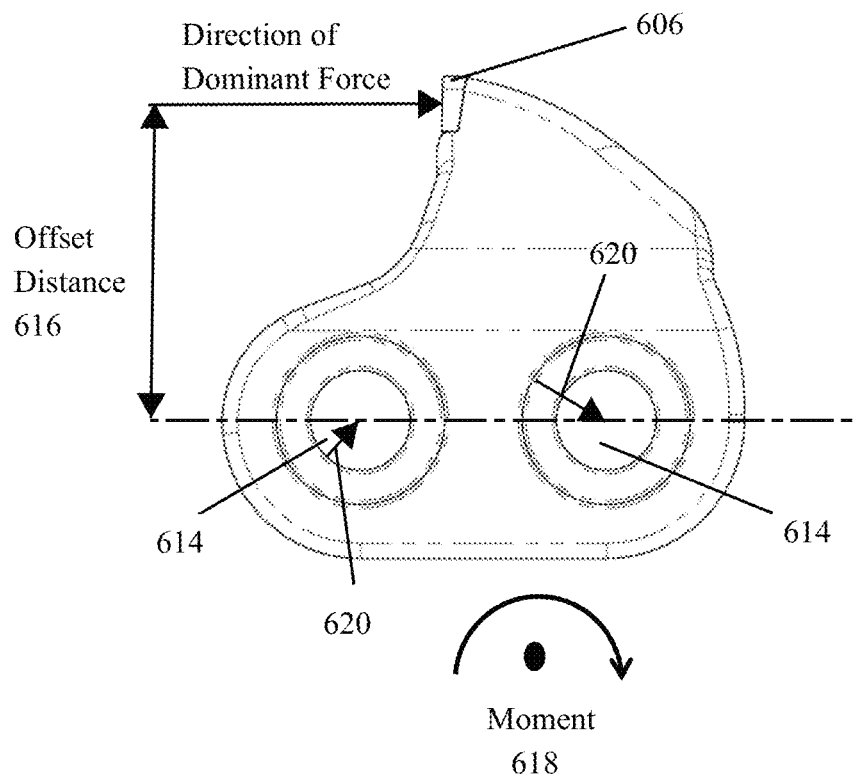
FIG. 6B is a side view of the cutter of FIG. 6A.

FIG. 6B shows the effect of the dominant direction of cutting force (also referred to as the dominant force vector) on the configuration of the cutter 600. Cutter tip 606 is offset (in more than one plane) from the fastener mounting aperture(s) 614. This offset distance 616 creates a rotational force (moment 618) about an instantaneous center, in addition to the translational force(s) and the resultant forces 620 at the fastener-mounting aperture(s) that result from the moment 618.

FIG. 7 depicts a cross section view 700 of a pair of the cutters 600 mounted together on the cutter wheel 114 of FIGS. 1-5, including the drive plate 202 and two wear plates 204. View 700 illustrates a first cutter 600(1) paired with a second cutter 600(2) on opposite sides of the cutter wheel 114. A first and second washer 701(1), 701(2) are shown located between the inner surface 602 and wear plate 204 of each cutter 600(1), 600(2), respectively. FIG. 7 also depicts an example of the alignment apertures 212 with an alignment fastener located therein.

The first cutter 600(1) has first and second fastener-mounting apertures 614(1), 614(2) that respectively align with the first and second fastener-mounting apertures 614(3), 614(4) of the second cutter 600(2). A first fastener 218(1) extends from the first cutter 600(1) to the second cutter 600(2), within the fastener-mounting apertures 614(1) and 614(3) and through the first drive plate mounting aperture 502(1), and first and third wear-plate mounting apertures 702(1), 702(3) within each of the first and second wear plates 204(1), 204(2), respectively. A second fastener 218(2) extends from the first cutter 600(1) to the second cutter 600(2), within the fastener-mounting apertures 614(2) and 614(4) and through the second drive plate mounting aperture 502(2), and the second and fourth wear-plate mounting apertures 702(2) and 702(4) within each of the first and second wear plates 204(1), 204(2), respectively.

It should be appreciated that the first wear-plate mounting apertures 702(1), 702(2) may have a first dimension or diameter $D_1$, the second wear-plate mounting apertures 702(3), 702(4) may have a second dimension or diameter $D_2$, and the drive plate mounting apertures 502(1), 502(2) may have a third dimension or diameter $D_3$. The first, second and third dimensions may be circular (i.e. the dimension is a diameter) or another shape (square, rectangular, etc.) such that the first, second and third dimensions correspond to the width of the apertures 702(1), 702(2), 702(3), 702(4), 502(1), 502(2). Dimensions $D_1$ and $D_2$ may be larger or smaller than one another, and larger or smaller than dimension $D_3$.

The third and fourth fastener-mounting apertures 614(3), 614(4) of the second cutter 600(2) are threaded to cooperate with threads of the fasteners 218(1), 218(2). Thus, the fastener-mounting apertures 614(3), 614(4) are also considered to be fastener-receiving apertures. The first and second fastener-mounting apertures 614(1), 614(2) of the first cutter 600(1) include a first sidewall 704, a second sidewall 706, and a flange 708. Accordingly, as the fasteners 218(1), 218(2) are tightened, a surface of fastener head 710 applies a force against the flange 708, and the threads of the fastener 218 act to clamp the two cutters 600(1), 600(2) together, thereby creating a clamping action that operates to maintain position of the wear plates 204 relative to the drive plate 202. As such, the tightening of one or more of the fasteners 218 causes the cutter 600(1) to clamp all components between the first cutter 600(1) and the second cutter 600(2) and (e.g. the drive plate 202, the wear plate 204, and the washer 701 (if present)). Increasing the number of cutter pairs that are used with the cutter wheel 114 increases the friction or clamping force imparted between the wear plates 204 and drive plate 202. Thus, in embodiments where pairs of cutters 600 (or other cutters discussed herein) are coupled together, one of the cutters in the pair may include threaded fastener-mounting aperture(s) or fastener-receiving apertures, and the other may include fastener-mounting aperture(s) that accommodate the fastener shape (such as the bolt head).

The thickness of each boss 612 of the first and second cutters 600(1), 600(2) can be less than or equal to a thickness of the corresponding wear plate in which the boss 612 is inserted adjacent the wear-plate mounting apertures 702. This thickness configuration prevents the bosses 612 from interfering with the clamping action of the cutters 600 as the fasteners 218 are tightened.

In some embodiments, a first clearance is defined between a sidewall of each mounting aperture 502 and the fastener 218. A second clearance is defined between the first sidewall 704(1), 704(2) and the fasteners 218(1), 218(2), respectively. A third clearance is defined between the second sidewall 706(1), 706(2) the fastener-mounting apertures 614(1), 614(2) and the fastener 218(1), 218(2). These clearances may be equal or unequal. One or more of the first, second, and third clearances (including but not limited to all three) is greater than or equal to a fourth clearance defined between the bosses 612 and the respective sidewall of the wear plate mounting aperture 702 of the wear plates 204. As such, the wear plate mounting aperture 702 forms a boss 612 receiving recess that is sized and shaped with minimal to zero clearance around the boss 612. This configuration allows the wear plates 204 to bear the majority, if not all of, the shear force caused by material contacting the cutter tip 610 such that the shear force on the fastener 218 is substantially reduced or eliminated.

FIG. 8 depicts a cross section view 800 of a pair of the cutters 600 mounted offset on the cutter wheel 114 of FIGS. 1-5. The cutters 600(1) and 600(2) are offset from one another on each side of the cutter wheel 114. The first cutter 600(1) has first and second fastener-mounting apertures 614(1), 614(2) that respectively align with the first and second drive plate mounting apertures 502(1), 502(2) of the drive plate 202 and first and second wear plate mounting apertures 802(1), 802(2) in the first wear plate 204(1). The first and second drive plate mounting apertures 502(1), 502(2) are threaded to cooperate with threads of the fasteners 218(1), 218(2).

The first wear-plate mounting apertures 802(1), 802(2) may have a first dimension $D_1$, the second wear-plate mounting apertures 802(3), 802(4) may have a second dimension $D_2$, and the drive plate mounting apertures 502(1), 502(2) may have a third dimension $D_3$. The first, second and third dimensions may be circular (e.g. the dimension is a diameter), or may be any arbitrary shape, such as square, rectangular etc. Dimensions $D_1$ and $D_2$ may be larger or smaller than one another, and larger or smaller than dimension $D_3$.

The first and second fastener-mounting apertures 614(1), 614(2) of the first cutter 600(1) respectively include a first sidewall 804, a second sidewall 806, and a flange 808. Accordingly, as the fasteners 218(1), 218(2) are tightened, a surface of the fastener head applies a force against the flange 808 to clamp the cutter 600(1) toward the drive plate 202, which generates a clamping action that operates to maintain position of the wear plate 204(1) relative to the drive plate 202. As such, tightening one or more of the fastener 218 causes the cutter 600 to clamp all components between 600 and 202 (e.g. the wear plate 204 and a washer (if present)). Increasing the quantity of cutters 600 increases the friction or clamping force caused between the wear plate 204(1) and drive plate 202.

In the illustrated embodiment, a thickness of the each boss 612(1), 612(2) of the first cutter 600(1) is less than or equal to a thickness of the wear plate 204(1) adjacent the wear-plate mounting apertures 802(1), 802(2). This thickness configuration prevents the bosses 612 from interfering with the clamping action of the cutters 600 as the fasteners 218 are tightened.

In the illustrated embodiment, a clearance between one or more of (a) the first sidewall 804 of the fastener-mounting apertures 614 and the fastener 218, and (b) the sidewall 806 of the fastener-mounting apertures 614 and the fastener 218 is greater than or equal to a clearance between the bosses 612 and the respective sidewall of the wear plate mounting aperture 802 of the wear plate 204(1). As such, the wear plate mounting aperture 802 forms a boss 612 receiving recess that is sized and shaped with minimal to no clearance around the boss 612. This configuration allows the wear plates 204(1) to bear the majority, if not all of, the shear force caused by material contacting the cutter tip 610, such that the shear force on the fastener 218 is eliminated or substantially reduced.

The second cutter 600(2) has third and fourth fastener-mounting apertures 614(3), 614(4) that respectively align with the third and fourth drive plate mounting apertures 502(3), 502(4) of the drive plate 202 and third and fourth wear plate mounting apertures 802(3), 802(4) in the second wear plate 204(2). The third and fourth drive plate mounting apertures 502(3), 502(4) are threaded to cooperate with threads of the fasteners 218(3), 218(4).

The third and fourth fastener-mounting apertures 614(3), 614(4) of the second cutter 600(2) respectively include a first sidewall 804, a second sidewall 806, and a flange 808. Accordingly, as the fasteners 218(3), 218(4) are tightened, a surface of the fastener head applies a force against the flange 808 to clamp the second cutter 600(2) against the drive plate 202 thereby creating a clamping action that operates to maintain position of the wear plate 204(2) relative to the drive plate 202. The more cutters located adjacent the wear plate 204(2), the greater the friction or clamping force caused between the wear plate 204(2) and drive plate 202.

In the illustrated embodiment, a thickness of the each boss 612(3), 612(4) of the second cutter 600(2) is less than or equal to a thickness of the wear plate 204(2) adjacent the wear-plate mounting apertures 802(3), 802(4). This thickness configuration prevents the bosses 612 from interfering with the clamping action of the cutter 600 as the fasteners 218 are tightened.

In the illustrated embodiment, a clearance between one or more of (a) the first sidewall 804 of the fastener-mounting apertures 614 and the fastener 218, and (b) the sidewall 806 of the fastener-mounting apertures 614 and the fastener 218 is greater than or equal to a clearance between the bosses 612 and the respective sidewall of the wear plate mounting aperture 802 of the wear plate 204(2). As such, the wear plate mounting aperture 802 forms a boss 612 receiving recess that is sized and shaped with minimal to no clearance around the boss 612. This configuration allows the wear plate 204(2) to bear the majority, if not all of, the shear force caused by material contacting the cutter tip 610, such that the shear force on the fastener 218 is substantially reduced or eliminated.

The embodiments described with regard to FIGS. 2-8 include bosses that are concentric to the fastener-mounting aperture of the cutter, and boss-receiving recesses that are integral with the mounting apertures of the wear plates 204. It will be appreciated that the bosses may be offset from the fastener mounting aperture 614 of the cutter 600, and the boss receiving recess may be offset from the mounting aperture (e.g. mounting apertures 702, 802) within the wear plates 204.

Figure 9:
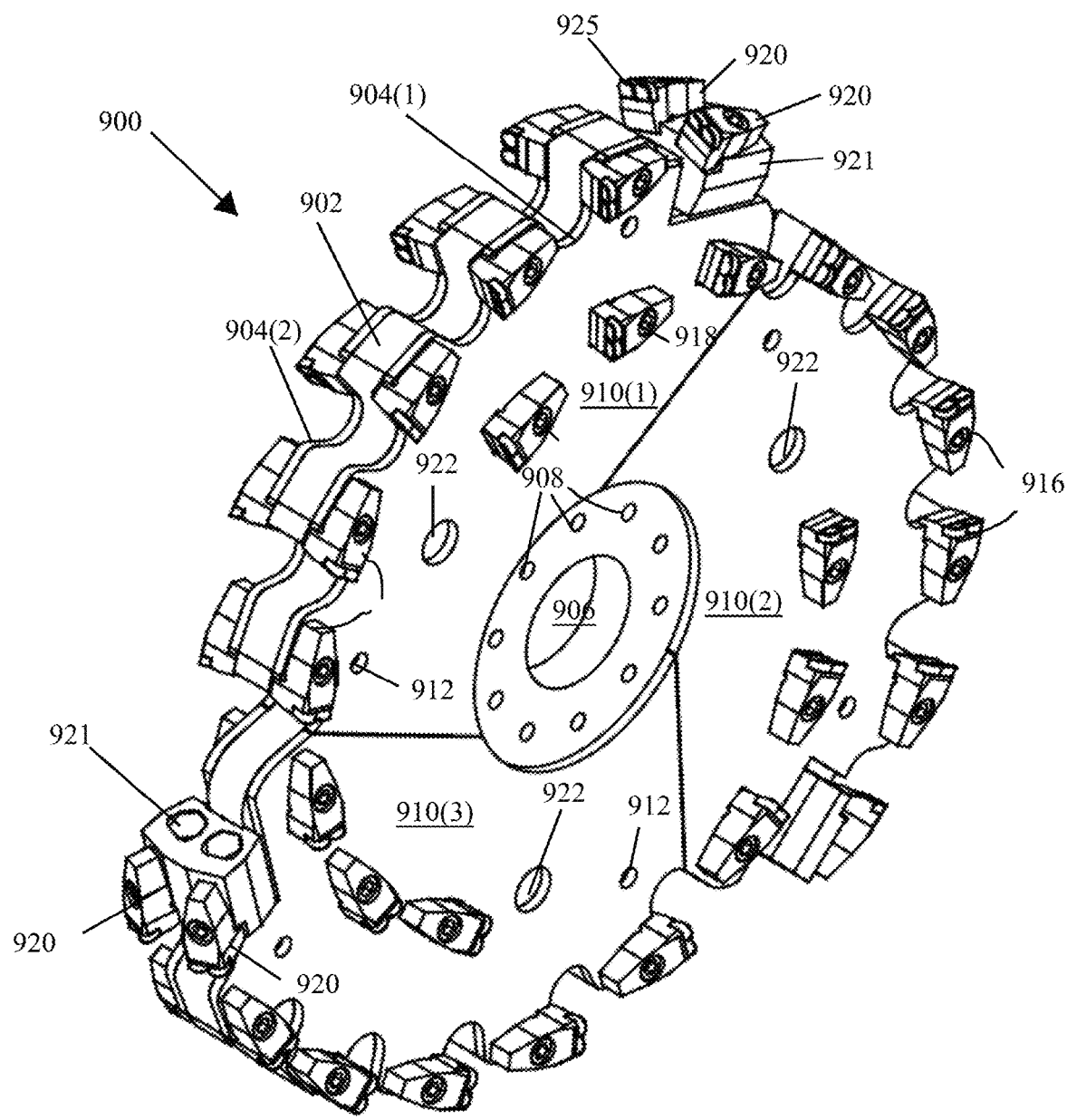
FIG. 9 is a perspective view of another exemplary cutter wheel for use with the machine of FIG. 1, including a plurality of cutters.
Figure 10:
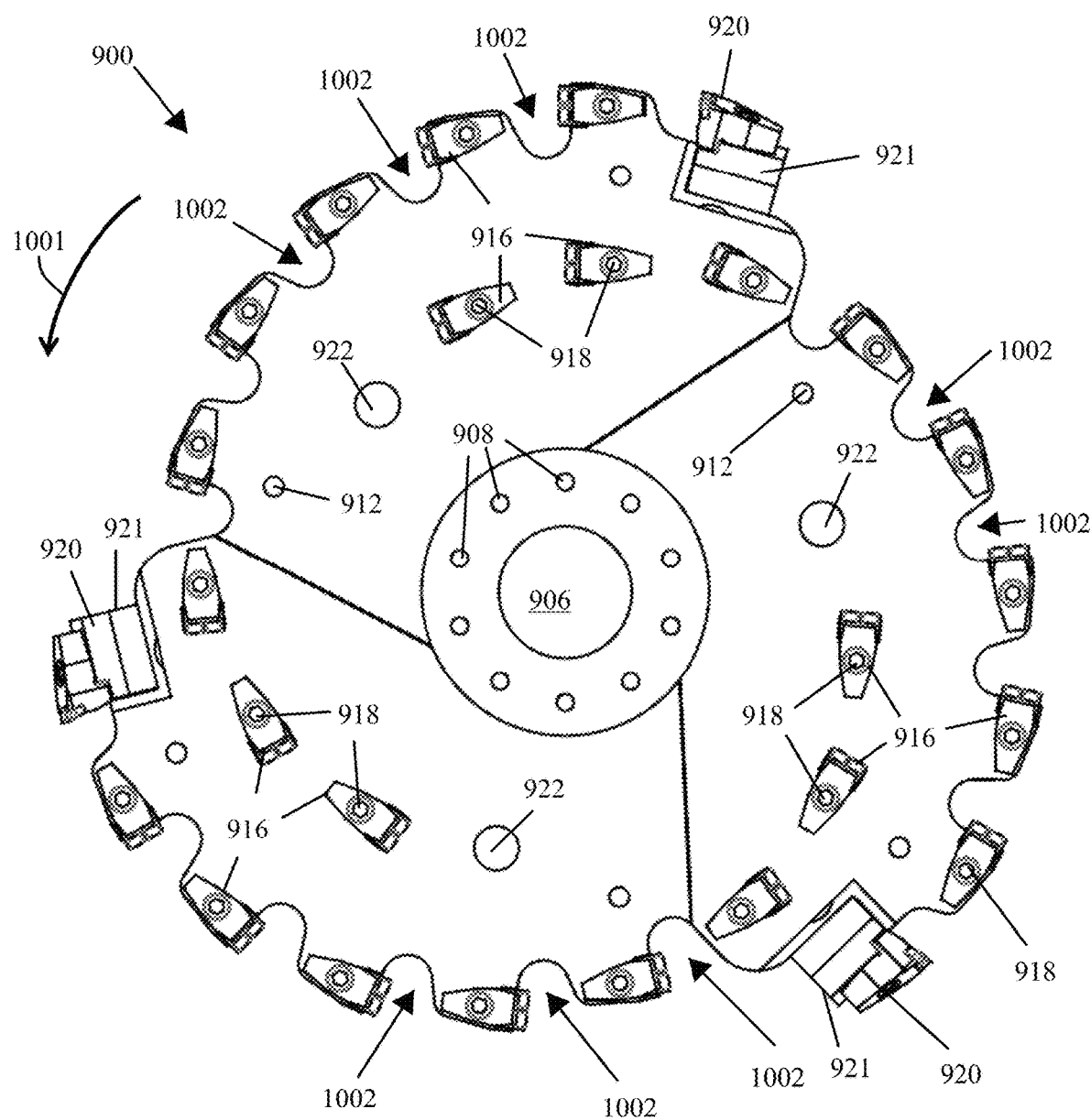
FIG. 10 is a right elevation view of the cutter wheel of FIG. 9.

FIGS. 9 and 10 illustrate another exemplary cutter wheel 900 that can be used in place of the wheel 114. The cutter wheel 900 is similar to the cutter wheel 114 described and illustrated with regard to FIGS. 2-5, and may include any of the features of cutter wheel 114. As shown, the cutter wheel 900 has a non-circular profile (shape).

With reference to FIGS. 9-12, the cutter wheel 900 includes a drive plate 902 and wear plates 904(1), 904(2) that are located on each side or face of the drive plate 902. It should be appreciated that there may be only a single wear plate 904 located on one side of the drive plate 902. The drive plate 902 may have a mass or mass moment of inertia that is specifically designed to provide enough potential energy to power cutters 916, 920 through initial engagement with the wood or material being reduced. The illustrated drive plate 902 (see FIG. 11) is a single plate that is formed from a single material (e.g., grade 50 steel, steel having a minimum yield of 50,000 PSI, abrasion-resistant material, hard-faced material, or similar material). In some embodiments, the drive plate 902 may be formed from multiple plates (e.g., each being a plate of a single material) that are adhered, bonded, welded, or positioned adjacent to one another. Similarly, each wear plate 904 may include a plurality of wear plates that are adhered, bonded, welded, or positioned adjacent to one another.

The drive plate 902 is configured to couple to a drive system (e.g. the drive system 116). The drive plate 902 includes a driveshaft aperture 906 and a plurality of driveshaft mounting apertures 908 (not all of which are labeled) so that driving torque from the drive system is transferred to the cutter wheel 900. In other embodiments, the driveshaft may be a stub shaft which only attaches to one side of the drive plate 902.

Each wear plate 904 includes an inner driveshaft mounting aperture that allows the drive system 116 to connect to the drive plate 902 without connecting to each wear plate 904. Each wear plate 904 may entirely cover the drive plate 902, or only a portion of the drive plate 902 (leaving part of the drive plate 902 exposed). In some embodiments, each wear plate 904 has a dimension that is equal to or greater than the corresponding dimension of the drive plate 902. In other words, each wear plate 904 has a profile, when viewed from one of the sides of the cutter wheel 900 that is larger than the profile of the drive plate 902. It should be appreciated, however, that the profile of each wear plate 904 may be equal to the profile of the drive plate 902 without departing from the scope hereof. These embodiments provide the advantage that the wear plate 904 protects the outer edge of the drive plate 902 from wear during operation of the material reduction machine (e.g. the material reduction machine 100).

The drive plate 902 may be manufactured using a first material that has a first wear resistance, and the wear plates 904 may be manufactured using a second material that has a second wear resistance greater than the first wear resistance. In an example, the first material may be grade 50 steel, and the second material may be high carbon abrasion resistant steel. The material of the drive plate 902 may have a lower carbon content than the material of the wear plates 904. This lower carbon content of the drive plate 902 facilitates machinability of the drive plate 902, and also, in some embodiments, facilitates welding cutters or cutter mounts to the outer periphery of the drive plate 902.

In some embodiments, each wear plate 904 has a thickness that is equal to the thickness of the drive plate 902. However, in other embodiments, each wear plate 904 has a thickness that is less than a thickness of the drive plate 902. These embodiments provide the advantage of easier and lower cost manufacturing. A material's wear resistance typically affects the manufacturability of items using the material. A multi-layered cutter wheel, such as that shown in FIGS. 9-12, allows for the drive plate 902 to be manufactured having an equal to or greater thickness than the wear plates 904. The drive plate 902, being of a less-wear-resistant material (although the drive plate 902 may the same wear-resistance as the wear plate 904) is more easily manufactured (because of reduced thickness and/or reduced wear resistance) and may be manufactured using less costly manufacturing techniques. The wear plates 904, because they are less thick than the drive plate 902 and/or as compared to manufacturing an entire cutter wheel of similar wear-resistant material, are easier to manufacture. Therefore, the present embodiments provide the advantage of easier manufacturing and lower cost.

Each wear plate 904 can be a single plate, or can include wear plate segments 910 that collectively form the wear plate 904. For example, wear plates 904(1), 904(2) include three wear plate segments 910(1)-910(3). It should be appreciated that there may be more or fewer wear plate segments without departing from the scope hereof. Embodiments including wear plate segments provide the advantage that a wear plate segment is lighter than an entire wear plate. As such, a single operator may replace the wear plate because the operator is able to lift the wear plate segment. Another advantage is that replacing a wear plate segment does not require removal of the drive plate from the shaft. In embodiments, the wear plate segments 910 that collectively form a wear plate 904 may be statically and dynamically balanced. Thus, the operator may replace an entire set of wear plates 910 (e.g. all wear plate segments 910 that collectively form a single wear plate 904) and maintain balance of the cutter wheel 900.

Each wear plate may include a leading edge and a trailing edge relative to the angle of rotation of the cutter wheel during operation. This leading edge may be parallel to the normal angle the rotation of the cutter wheel, or may be angled forward or backward relative to the rotation of the cutter wheel. In the illustrated embodiment shown in FIG. 12, each wear plate segment 910 includes a leading edge 1202 and a trailing edge 1204. Leading edge 1202 is angled backward relative to the rotation of the cutter wheel 900 during operation (i.e. during rotation of the cutter wheel 900), such as along arrow 1001 in FIG. 10. It should be appreciated that the leading edge 1202 may be modified to angle forward without departing from the scope hereof. The trailing edge 1204 is also angled backward relative to rotation of the cutter wheel 900 during operation. The leading edge 1202 and trailing edge 1204 is only labeled in FIG. 12 relative to wear segment 910(1) for simplicity of illustration, however it should be appreciated that each of the wear plate segments 910(1)-910(3) include a leading and trailing edge 1202, 1204.

In certain embodiments, each of the wear plate segments 910 has the same profile (i.e. shape). However, in some embodiments, the wear plate segments 910 may have different shapes from one another that are coordinated to form the wear plate 904.

The wear plate segments 910, or the entire wear plate 904 if there are no segments thereof, may be removable from the drive plate 902 without removing the drive plate 902 from the drive system (e.g. drive system 116). This configuration provides easy maintenance of the wear plates 904 without having to disassemble the entire cutter wheel 900.

In the illustrated embodiment, an alignment aperture 912 extends through each wear plate 904 and the drive plate 902. Alignment apertures 912 are similar to the alignment apertures 212 discussed above. Accordingly, the discussion of alignment apertures 212 applies to alignment apertures 912 as well.

A plurality of cutters 916 may be fastened or coupled to the cutter wheel 900 at an opposite surface of the wear plate 904 from the drive plate 902. The cutters 916 may be fastened with at least one fastener 918. Not all cutters 916 and fasteners 918 are labeled for simplicity of illustration. It should be appreciated that although one fastener 918 is shown per cutter 916, there may be more fasteners per cutter without departing from the scope hereof. The fastener 918 may create a clamping force between the cutter 916, each wear plate 904, and the drive plate 902 such that the wear plate 904 is held in place relative to the drive plate 902 via friction and the clamping force between the wear plate 904 and the drive plate 902. Increasing the quantity of cutters 916 that are coupled to the cutter wheel 914 increases the clamping force between the drive plate 902 and the wear plate 904. It should be appreciated that all cutters 916 may be the same, or be different types of cutters. Some cutters may be offset along the axis of the driveshaft relative to others of the cutters. For example, as shown in FIG. 9, cutters 920 are mounted to a cutter mount 921 such that the cutters 920 are offset from the cutters 916 along the axis of the driveshaft. In other embodiments, the cutters 920 may be mounted directly to the drive plate 902 without the cutter mount 921 (and/or the cutter mount 921 may be integral with the drive plate 902). Cutters 920 are outer-edge cutters in that they are mounted on the outer-edge of the cutter wheel 900. Moreover, cutters 920 are rotated along their longitudinal axis relative to the longitudinal axis of the cutters 916 such that the cutter tip 925 of the cutters 920 extends from the cutter 920 away from an edge of the cutter wheel 900, as opposed to cutters 916 where the cutter tip thereof extends from a side surface of the cutter wheel 900.

The cutters 916 may be coupled to the cutter wheel 900 via the fastener 918 engaging the drive plate 902 (similar to that shown in FIG. 8), although the fasteners 918 may instead couple pairs of cutters 916 together such that the fastener 218 couples one cutter, located on a first side of the cutter wheel 900, to a second cutter 916 located on a second side of the cutter wheel 900 (similar to that shown in FIG. 7). In some embodiments where the clamping force imparted by the fasteners 918 is not sufficient to maintain the wear plate 904 in location relative to the drive plate 902, there may be additional fasteners that fasten the wear plate 904 to the drive plate 902. In these embodiments, these additional fasteners are located at the alignment apertures 912. The friction or clamping force between the wear plates 904 and the drive plate 902 caused by the fasteners 918 may be greater than the friction or clamping force caused by the additional fasteners located at the alignment apertures 912.

The illustrated embodiment also includes maintenance apertures 922. Maintenance apertures 922 are for preventing rotation of the cutter wheel 900 during service—such as removing/installing cutters 916 and/or wear plates 904, and/or wear plate segments 910. The tightening of fasteners causes the cutter wheel 900 to rotate which may be inconvenient and increase difficultly for a serviceman. To avoid this, the cutter wheel 900 can be rotated manually so a pin/bar/device component of the sub-frame 112 can be engaged in one of the maintenance apertures 922 to prevent rotation.

Figure 11:
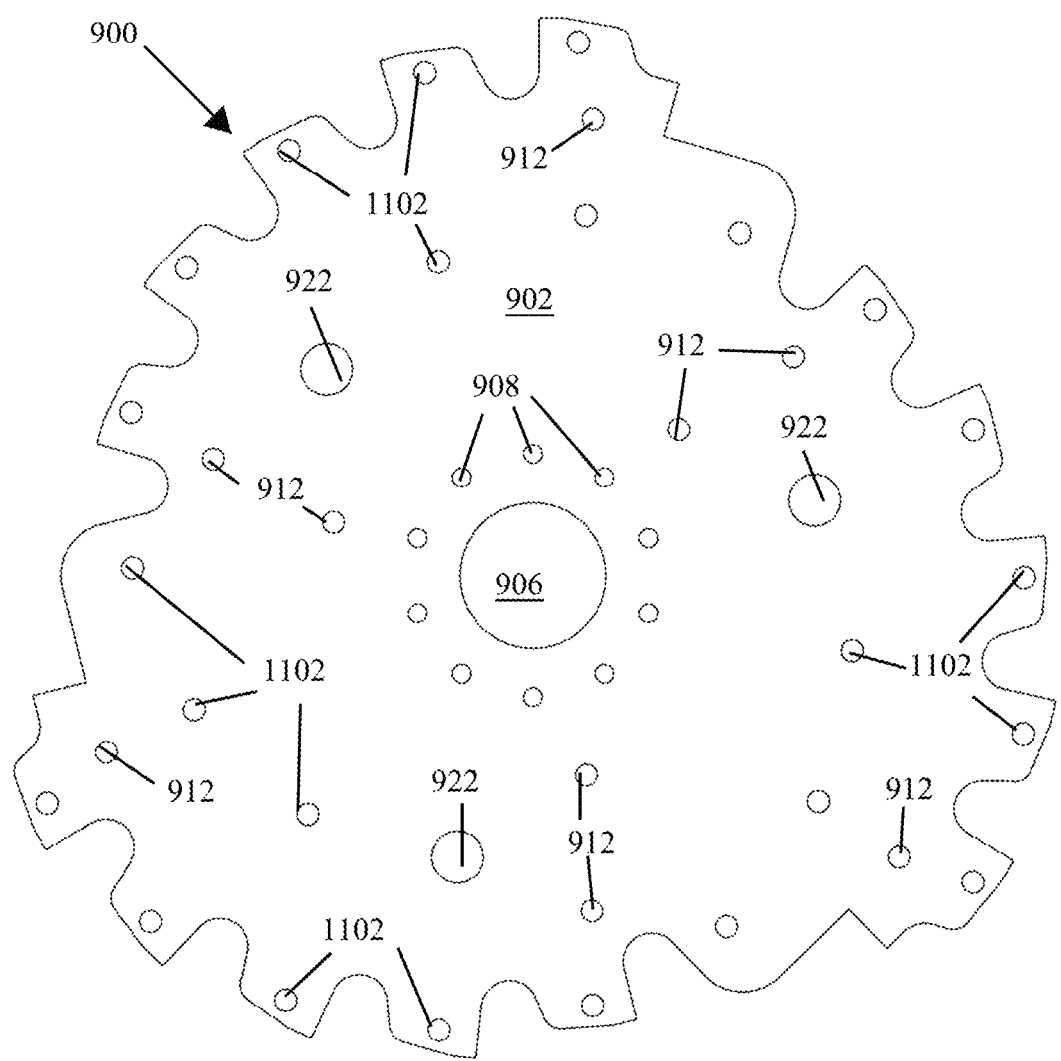
FIG. 11 is a right elevation view of a drive plate of the cutter wheel of FIG. 9.

As shown in FIG. 11, the drive plate 902 is a single plate (i.e. it is not segmented like embodiments of the wear plates 910 discussed above). The drive plate 902 includes the maintenance aperture 922 therethrough, and a plurality of mounting apertures 1102 (not all of which are labeled for clarity of illustration). In some embodiments, the mounting apertures 1102 may extend all the way through the drive plate 902, particularly where the fasteners 918 couple pairs of cutters 916 on each side of the cutter wheel 900 together such as in the manner shown in FIG. 7, thereby producing the above discussed clamping force. The mounting apertures 1102 may extend partially or all the way through the drive plate 902 and are threaded, particularly where the fasteners 918 couple to the drive plate 902 directly such as in the manner shown in FIG. 8, to produce the clamping force. The mounting apertures 1102 may be oversized relative to the fastener 918 in embodiments where the fastener couples two of the cutters 916 together such that shear force on the fastener 918 is reduced while tension force on the fastener 918 is maintained. With the mounting apertures 1102 being larger than the diameter of the fasteners 918, the fasteners 918 can extend through the drive plate 902 without contacting the drive plate 902 (such as in the manner shown in FIG. 7).

The cutter wheel 900 may include a plurality of chip evacuation notches or gullets 1002 on the perimeter of the cutter wheel 900 that extend through each of the drive plate 902 and each wear plate 904. The chip evacuation notches or gullets 1002 may also comprise apertures forwardly adjacent to the inner cutters 916 without departing from the scope hereof. The chip evacuation notches 1002 allow material that is cut by the cutters 916, 920, to evacuate through the chip evacuation notches 1002 and release on the other side of the wheel 900 as the cutter wheel 900 is traversing the material. The chip evacuation notches 1002 also reduce the recirculation of material during operation of the cutter wheel 900. The material can include material that has been cut by the cutters 916, 920. There is shown a single cutter 916 located adjacent each chip evacuation notch 1002. However, it should be appreciated that there may be more cutters 916 adjacent each chip evacuation notch 1002 without departing from the scope hereof. Moreover, although the chip evacuation notches 1002 are shown relative to the embodiment of FIGS. 9-12, it should be appreciated that any embodiment discussed herein may include the chip evacuation notch without departing from the scope hereof.

Figure 12:
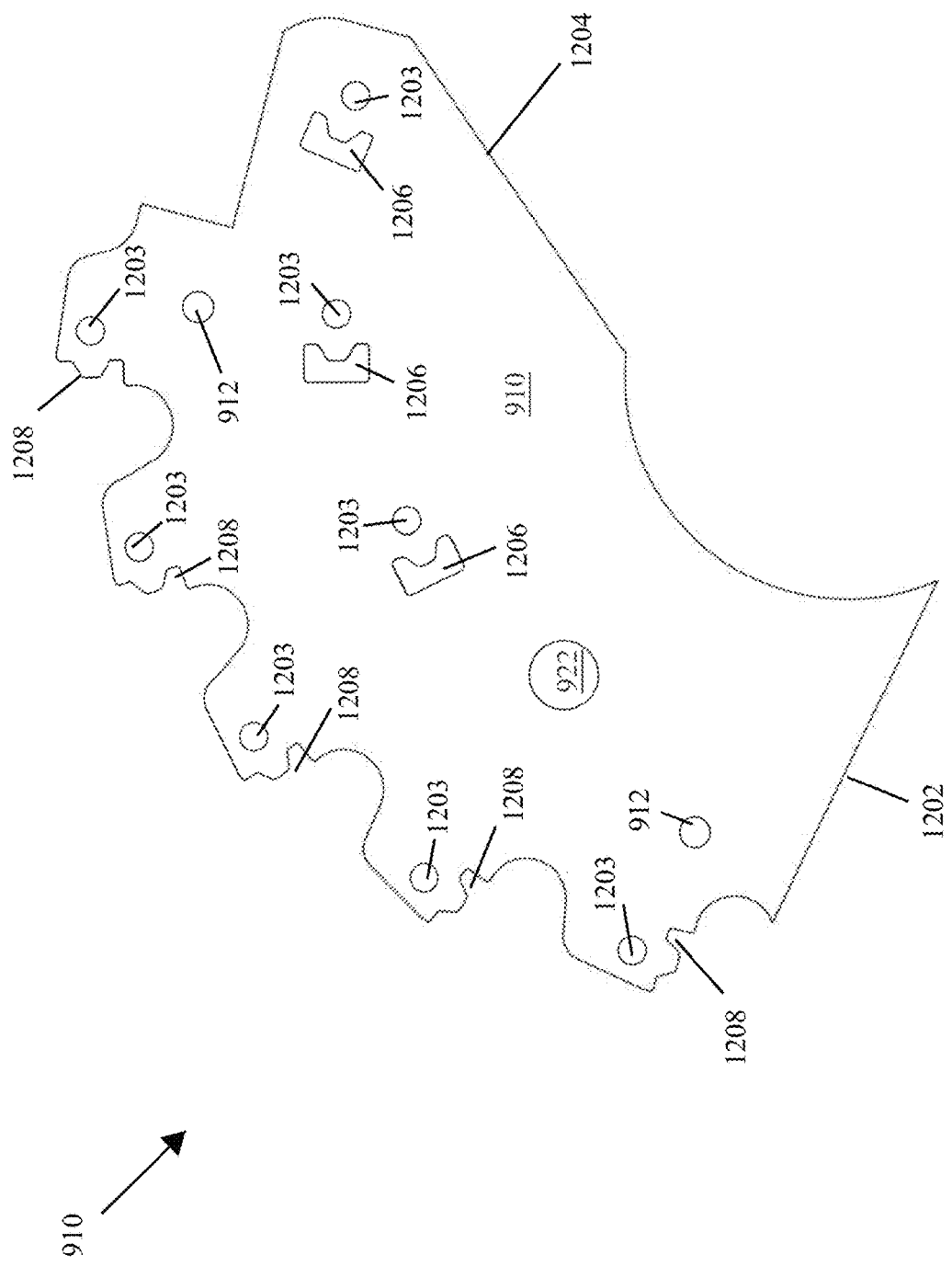
FIG. 12 is a right elevation view of one wear plate segment of the cutter wheel of FIG. 9, without the cutters attached to the cutter wheel.

As shown in FIG. 12, each wear plate 904 includes, at the location of each cutter 916, a wear plate mounting aperture 1203 and a boss receiving recess 1206 to receive a corresponding fastener and a boss on the cutter 916, respectively. In general, the quantity of apertures 1203 and recesses 1206 correspond to the quantity of fasteners being used to secure each cutter 916 to the wear plate 904 and the quantity of bosses on the cutter 916. The wear plate mounting aperture 1203 may be similar to any of the wear plate mounting apertures discussed herein, such as wear plate mounting apertures 702, 802 discussed above. In some embodiments, the wear plate mounting aperture 1203 does not include a boss receiving recess concentric or at the same location thereof.

With continued reference to FIG. 12, the boss receiving recess 1206 may be an aperture that extends entirely through, or partially through, the wear plate 904. The boss receiving recess 1206 may be entirely surrounded by material of the wear plate 904, or may be a partial aperture, shoulder, or lip in or at an edge of the wear plate 904. For example, the boss receiving recess may be a boss receiving feature 1208 that is located on a perimeter (e.g. a surface profile of the wear plate 904) of the cutter wheel 900, such as at the location of the chip evacuation notches 1002. The boss receiving recess 1206 (and the boss receiving feature 1208) includes a contact surface where clearance between the cutter boss and wear plate is minimal to no clearance. This contact surface is opposite the boss in the direction of the prevailing force applied by the cutter tooth, and provides a contact interface that is the location where minimal to no clearance between the cutter boss and wear plate is desired.

FIGS. 13-16 illustrate exemplary profiles of the contact interface between differently-shaped bosses and corresponding boss receiving recesses, as well as a prevailing force (F) when the cutter wheel is in operation. This force shown in these Figures is not representative of all forces present on the cutter. The cutter may receive forces from many directions, such as those shown in dashed arrows in FIGS. 13-16, and various transfer interfaces between a cutter profile and a corresponding receiving recess may be configured to aid in transferring forces from one or more directions. The forces that the cutter experiences include, but are not limited to, radial forces (inward and outward) relative to the axis of cutter wheel rotation. The boss receiving feature (entirely surrounded by material of the wear plate or only partially) works with the boss to counteract these forces. Accordingly, the boss may include one or more contact surfaces (e.g., one or more reaction surfaces) that interact with sidewall(s) of the boss receiving recess to prevent rotation of the cutter, as well as to transfer forces to the wear plates.

Figure 13:
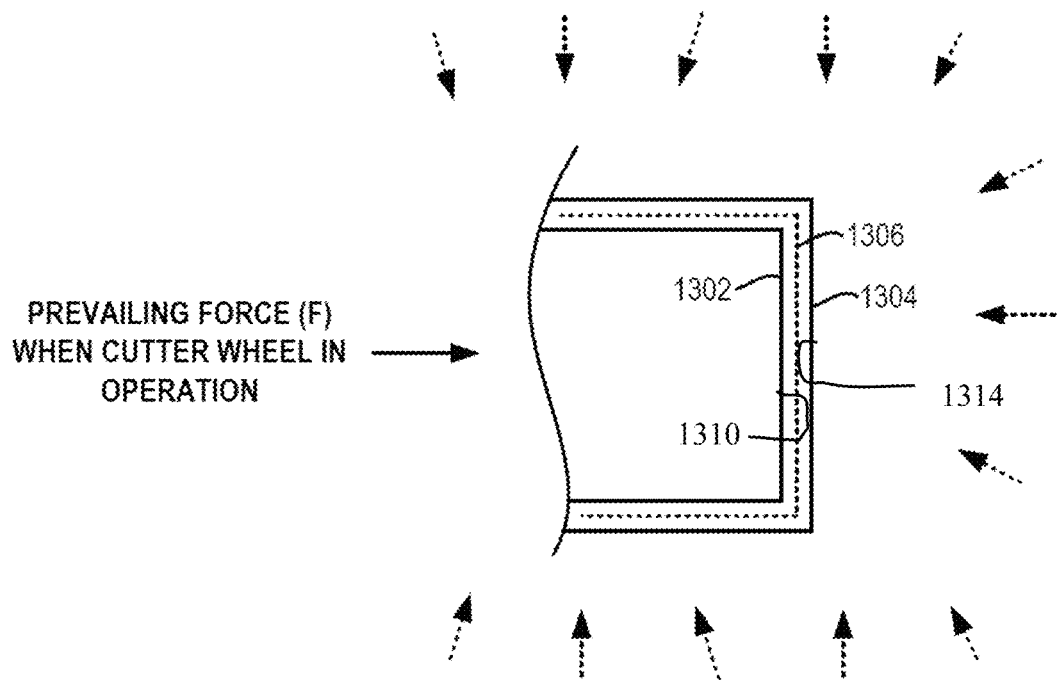
FIG. 13 is a schematic representation of a profile of a contact interface between an exemplary boss on the cutter of FIG. 9 and a complementary recess.

FIG. 13 schematically illustrates a boss 1302 that has a square (or rectangle) shape, and a boss receiving recess 1304 with a corresponding shape that receives the square (or rectangle) shape. As shown, the boss 1302 has a planar reaction surface 1310 that is configured to engage or contact a planar sidewall 1314 of the recess 1304 at a force-transfer interface 1306. It will be appreciated that the force-transfer interface is defined by the reaction surface 1310 of the boss 1302 and the sidewall 1314 of the boss receiving recess 1304, and that the reaction force is in a direction that is opposite the direction the force F. The clearance at the force-transfer interface 1306 when force F is not applied (e.g. when the cutter wheel is not in operation) is small (or zero) such that the force F is transferred to the wear plate via contact of the boss 1302 with the boss receiving recess 1304.

Figure 14:
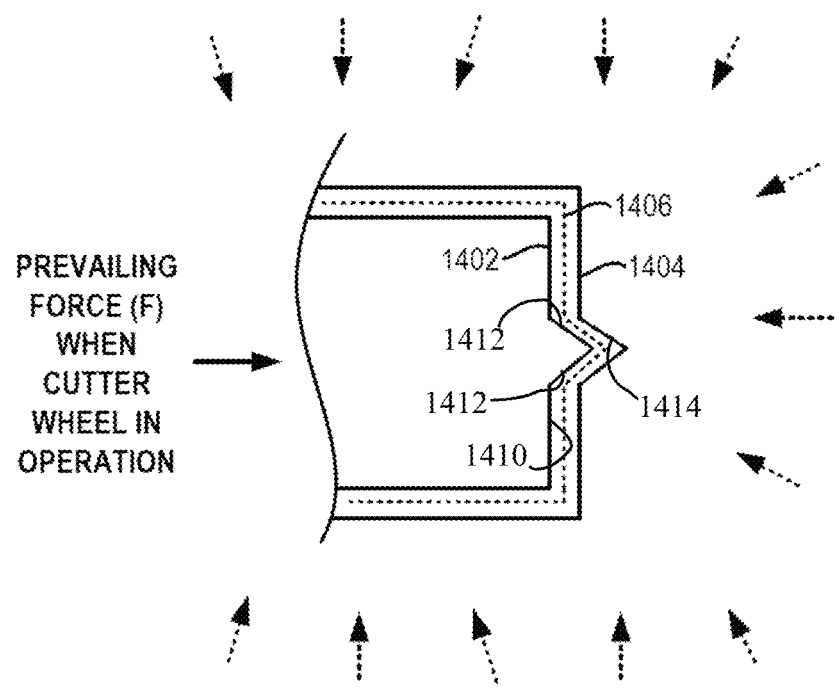
FIG. 14 is a schematic representation of another profile of a contact interface between an exemplary boss on the cutter of FIG. 9 and a complementary recess.

FIG. 14 schematically illustrates a boss 1402 that has a polygonal shape with a portion that extends in the same direction as the prevailing force on the cutter when the cutter wheel is in operation. It will be appreciated that the boss 1402 can instead or in addition have a portion that extends in a direction against the prevailing force. A boss receiving recess 1404 is shaped to receive the boss 1402. As shown, the boss 1402 has a non-planar reaction surface 1410 that has a plurality of contact surface sections 1412 (two of the four sections are labeled for purposes of clarity) that are configured to engage or contact a non-planar sidewall 1414 of the recess 1404 at a force-transfer interface 1406. It will be appreciated that the force-transfer interface 1406 is defined by the reaction surface 1410 of the boss 1402 and the sidewall 1414 of the boss receiving recess 1404, and that the reaction force is in a direction that is opposite the direction the force F. The clearance at the force-transfer interface 1406 when force F is not applied (e.g. when the cutter wheel is not in operation) is small (or zero) such that the force F is transferred to the wear plate via contact of the boss 1402 with the boss receiving recess 1404.

Figure 15:
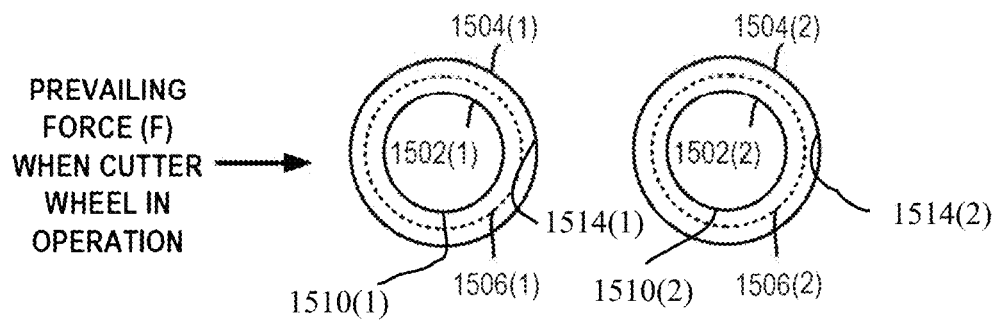
FIG. 15 is a schematic representation of another profile of a contact interface between exemplary bosses on the cutter of FIG. 9 and complementary recesses.

FIG. 15 schematically illustrates two bosses 1502(1), 1502(2) that have a cylindrical shape (i.e. circular in cross-section). The boss profile shown in FIG. 15 is an example of the cutter 600. Each boss receiving recess 1504(1), 1504(2) has a corresponding shape that receives the circular shape. As shown, each boss 1502(1), 1502(2) has a non-planar reaction surface 1510(1), 1510(2), respectively that is configured to engage or contact a sidewall 1514(1), 1514(2), respectively of the recesses 1504(1), 1504(2) at force-transfer interfaces 1506(1), 1506(2). It will be appreciated that each force-transfer interface 1506(1), 1506(2) is defined by the reaction surface 1510 of the boss 1502 and the corresponding sidewall 1514 of the boss receiving recess 1504, and that the reaction force is in a direction that is opposite the direction the force F. The clearance at the force-transfer interface 1506(1), 1506(2) when force F is not applied (e.g. when the cutter wheel is not in operation) is small (or zero) such that the force F is transferred to the wear plate via contact of the bosses 1502 with the boss receiving recess 1504.

Figure 16:
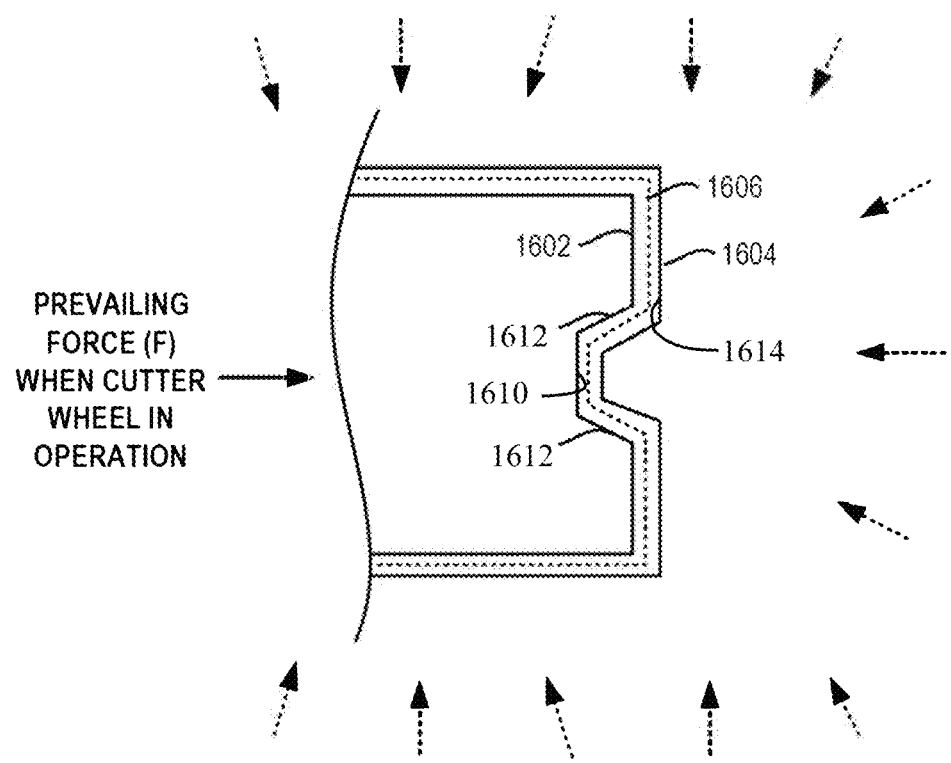
FIG. 16 is a schematic representation of another profile of a contact interface between an exemplary boss on the cutter of FIG. 9 and a complementary recess.

FIG. 16 schematically illustrates a boss 1602 that has a polygonal shape with a recessed portion that extends in a direction opposite the direction of the prevailing force on the cutter when the cutter wheel is in operation. A boss receiving recess 1604 is shaped to receive the boss 1602. As shown, the boss 1602 has a non-planar reaction surface 1610 that has a plurality of contact surface sections 1612 (two of the five sections are labeled for purposes of clarity) that are configured to engage or contact a non-planar sidewall 1614 of the recess 1604 at a force-transfer interface 1606. It will be appreciated that the force-transfer interface 1606 is defined by the reaction surface 1610 of the boss 1602 and the sidewall 1614 of the boss receiving recess 1604, and that the reaction force is in a direction that is opposite the direction the force F. The clearance at the force-transfer interface 1606 when force F is not applied (e.g. when the cutter wheel is not in operation) is small (or zero) such that the force F is transferred to the wear plate via contact of the boss 1602 with the boss receiving recess 1604.

Figure 17:
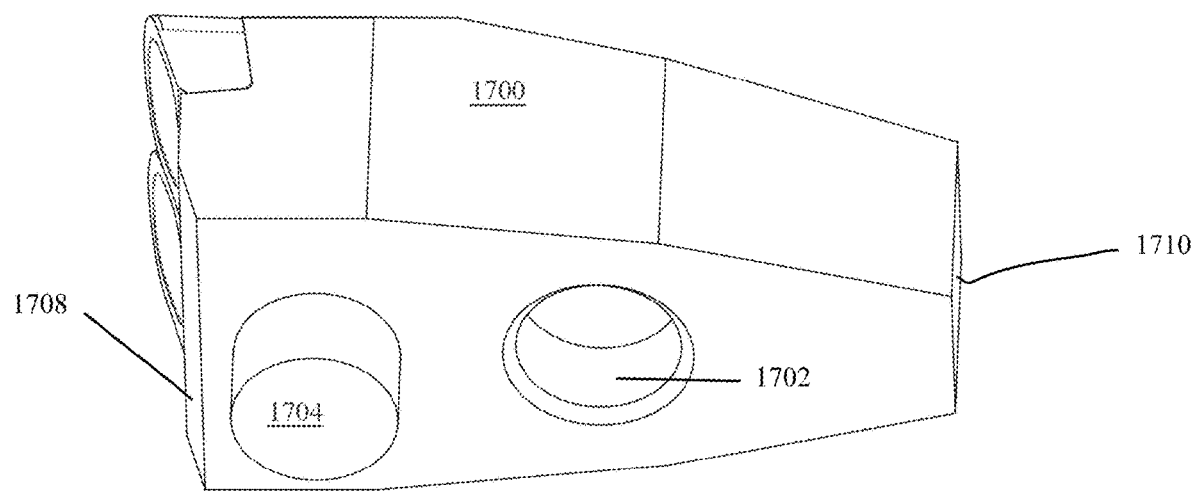
FIG. 17 is a perspective view of an exemplary cutter including a single fastener mounting aperture and a single cylindrical boss offset from the aperture.

FIG. 17 illustrates an exemplary cutter 1700 (e.g., consistent with cutters 916, 920) with a single fastener mounting aperture 1702 and a single cylindrical boss 1704 that is offset from the aperture 1702 (e.g., inline with a central longitudinal plane of the cutter 1700). The single fastener mounting aperture 1702 is similar to the fastener-mounting aperture 614. As such, the description of the fastener-mounting aperture 614 applies equally to the discussion of the fastener-mounting aperture 1702. The boss 1704 is cylindrical and therefore is similar in profile to the boss 1502(1), discussed above, and thus would mate with a boss receiving recess having a shape similar to the boss receiving recess 1504(1). Cutter 1700 includes a first or cutter end 1708 that receives the prevailing force and a second or trailing end 1710 that is opposite the first end 1708. The cutter 1700 has a body that generally tapers from the first end toward the second end in one or more planes to reduce drag on the material to be cut during operation of the cutter wheel. The force-transfer interface is the same as the force-transfer interface described relative to FIG. 15 for one of the bosses 1502(1), 1502(2).

Figure 18A:
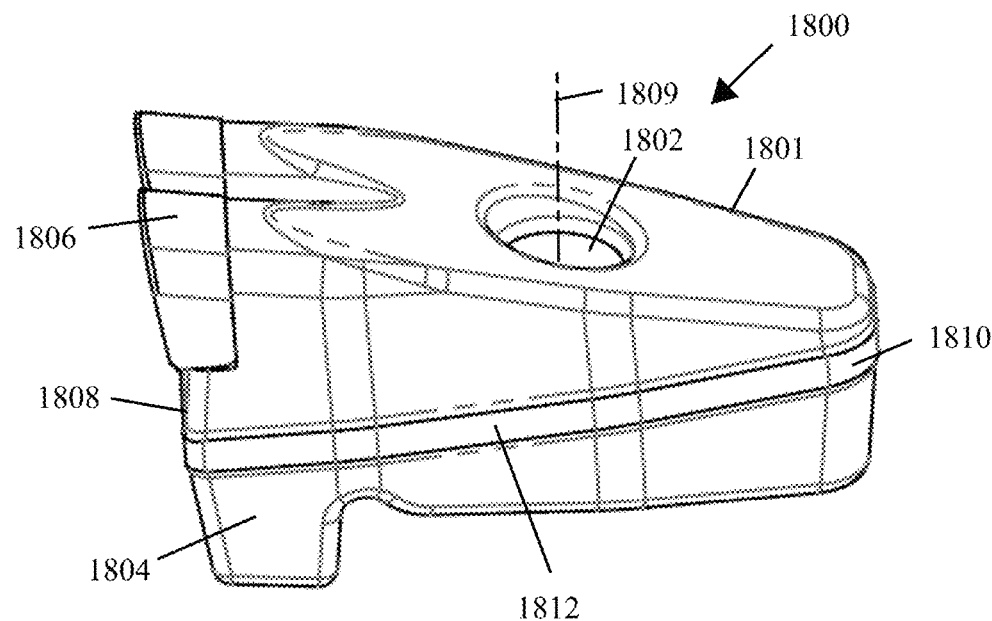
FIG. 18A is a perspective view of another exemplary cutter including a single fastener aperture and a boss offset from the aperture.
Figure 18B:
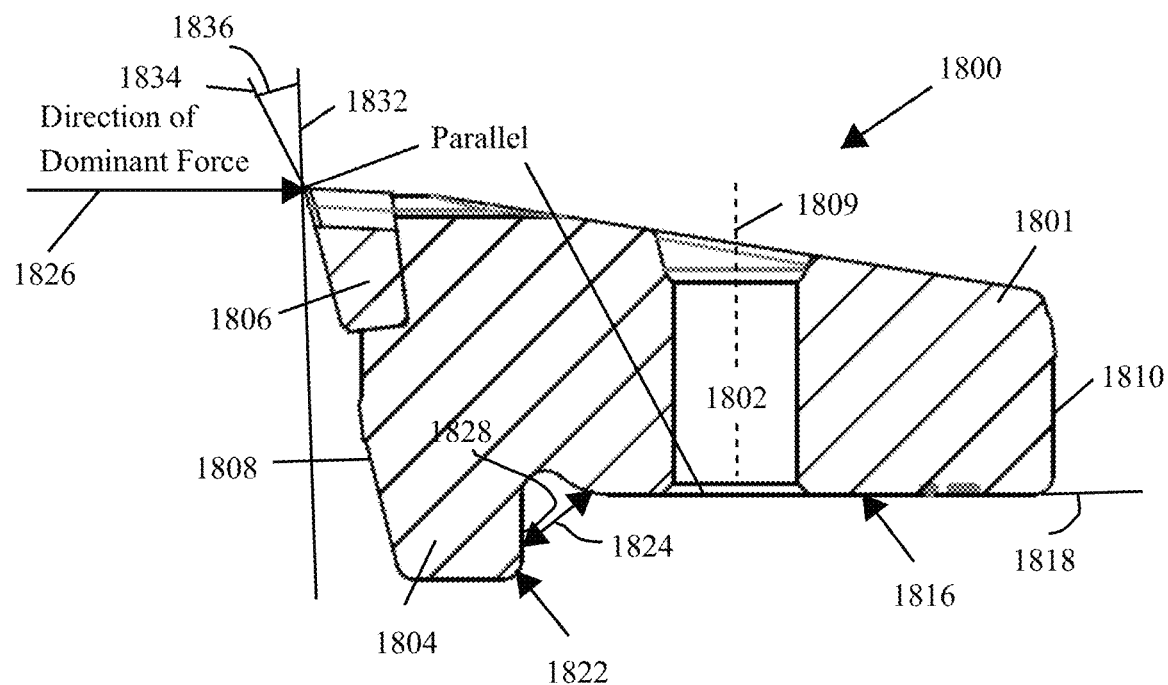
FIG. 18B is an elevation view of the cutter of FIG. 18A, illustrating the spacing between the aperture and the boss, and the profile of the cutter.
Figure 18C:
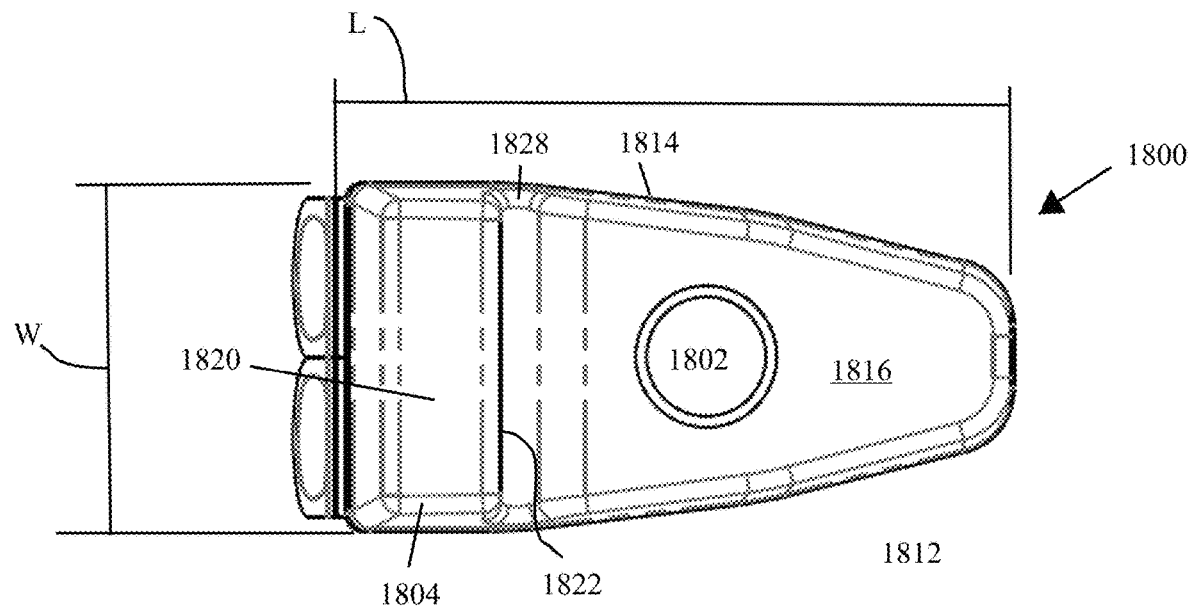
FIG. 18C is a bottom view of the cutter of FIG. 18A illustrating the aperture and the boss.

FIGS. 18A-C illustrate another exemplary cutter 1800 including a body 1801 that has a single fastener mounting aperture 1802, a single boss 1804, and cutter tip 1806. The cutter tip 1806 can include one or more carbide inserts (two are shown), or another type of cutter tip that is adequate for material reduction. The cutter body 1801 has a first or cutter end 1808 and a second or trailing end 1810 that generally tapers from the first end 1808 toward the second end 1810 in one or more planes to reduce drag on the material to be cut during operation of the cutter wheel. The cutter body 1801 also has a first side 1812 and a second side 1814 opposite the first side 1812. The cutter body 1801 has a length L between the first end 1808 and the second end 1810, and a width W between the first side 1812 and the second side 1814. With reference to FIG. 18C, the width W of the cutter body 1801 generally varies from the first end 1808 toward the second end 1810. For purposes of the claims, the width W is defined as the maximum distance measured laterally across the cutter body 1801 between the first side 1812 and the second side 1814. The cutter body 1801 further has a mounting surface 1816 that is located on the bottom of the body 1801 (when viewed in FIG. 18B). The mounting surface 1816 (which is part of the overall inner surface of the cutter 1800) generally defines a plane 1818. The mounting aperture 1802 is disposed between the first end 1808 and the second end 1810 and is further disposed between the first side 1812 and the second side 1814.

The boss 1804 has a rectangular profile and is generally located closer to the first end 1808 than the second end 1810. As shown, the boss 1804 is located adjacent or on the first end 1808 and is offset from the mounting aperture 1802 such that the fastener axis 1809 does not intersect the boss 1804. For example, the fastener axis 1809, as illustrated, is perpendicular to the plane 1818. The boss 1804 extends outward from the plane 1818 and has a first surface 1820 (FIG. 18C) on the first end 1808 and a second surface 1822 that is generally opposite the first surface 1820 and that faces the second end 1810. The boss 1804 has a first dimension that is measured along the length L and a second dimension that is measured along the width W. The second dimension is larger than the first dimension such that the boss 1804 is wider (along width W) than the boss 1804 is long (along the length L). In general, the boss 1804 has a second dimension that is at least 50% of the width W, although the second dimension can be smaller than 50% of the width W (e.g., at least 25% of the width W).

Figure 18D:
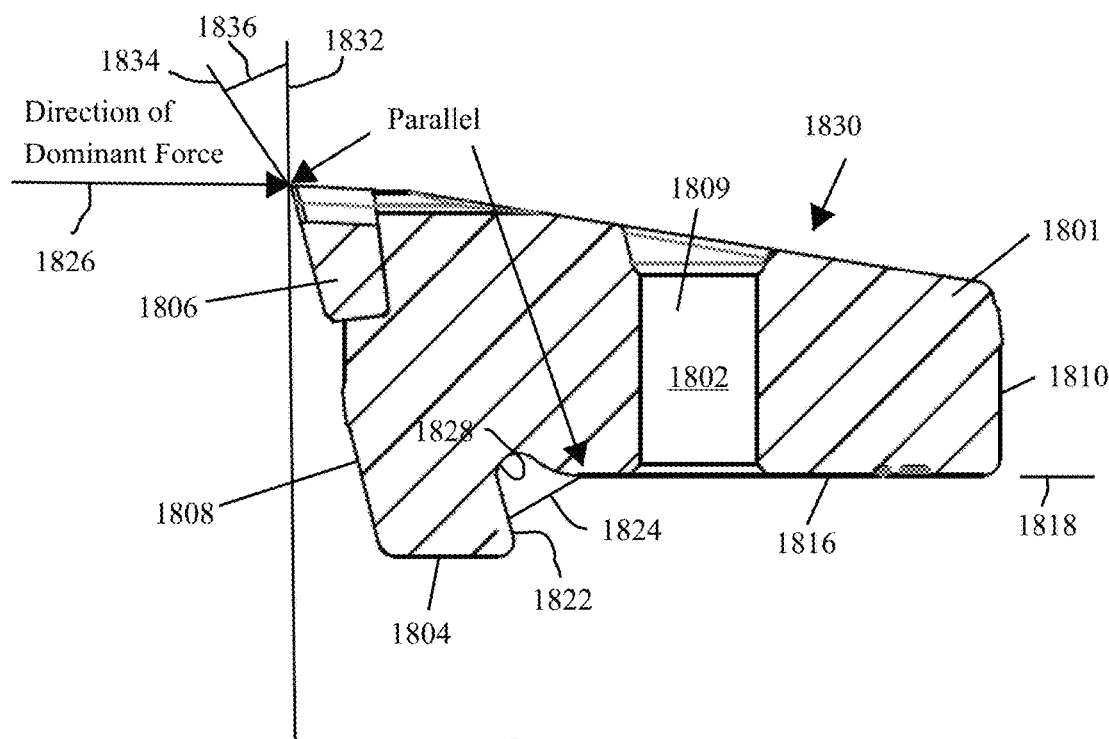
FIG. 18D is a perspective view of another exemplary cutter that is similar to the cutter of FIG. 18A and including a single fastener aperture and a boss offset from the aperture.

The second surface 1822 defines a planar reaction surface that is elongated along the width and that is configured to engage a sidewall of the corresponding recess in a wear plate or drive plate. Consistent with what is described with regard to FIG. 13, the force-transfer interface is defined by the reaction surface 1822 of the boss 1804 and the sidewall of the boss receiving recess. The second surface 1822 is angled at a first angle 1824 relative to the plane 1818 defined by the mounting surface 1816. The first angle 1824 is equal to, or within a tolerance level of (e.g. within 5 degrees), the angle of the sidewall of the respective boss receiving recess. As shown in FIG. 18B, the first angle is 90 degrees (i.e. perpendicular to the plane 1818). The illustrated mounting surface 1816 is oriented parallel to the prevailing direction of dominant force (shown by dominant force vector 1826) that acts on the cutter 1800 during operation. The dominant force vector 1826 is opposite the direction of travel of the cutter. It will be appreciated that the mounting surface 1816 may not be completely parallel to the dominant force vector during operation but will be substantially parallel within tolerances (e.g., 5 degrees). At least a portion of the second surface 1822 (e.g., the entirety of the surface 1822 as shown in FIGS. 18B and 18D) defines a plane that is oriented vertically when the cutter 1800 first engages an object via the cutter edge during operation. As shown in FIG. 18B, the dominant force vector 1826 is perpendicular to the second surface 1822.

The cutter 1800 also includes an optional relief notch 1828 at the vertex of the contact surface 1822 and the mounting surface 1816. The relief notch 1828 prevents undesirable loading when the intersection between the contact surface 1822 and mounting surface 1816 is imperfect. The relief notch 1828 also enables full contact between the boss contact surface 1822 and the mating sidewall surface of the boss receiving recess without any edge treatment (e.g. chamfer or fillet) required at the intersection of the mounting and sidewall surfaces of the boss receiving recess. This allows the mounting and sidewall surfaces of the boss receiving recess to have a square corner, greatly simplifying the manufacture of the boss receiving recess.

FIG. 18D illustrates a cutter 1830 that is nearly identical to the cutter 1800. Features of the cutter 1830 that are the same as the cutter 1800 have the same reference numerals. The only difference between the cutter 1830 and the cutter 1800 is that the second surface 1822 (i.e. the reaction surface) has an angle relative to the plane 1818 that is less than 90 degrees (i.e. an acute angle relative to the mounting surface 1816). The angle of the surface 1822 can assist with resisting tensile forces that may be experienced by the fastener during operation. It should be appreciated that any of the cutters described herein may have an acute angle configuration, even if not expressly described.

Referring to FIGS. 18B and 18D, the cutter tip 1806 first engages the object along the dominant force vector 1826, which is tangential to the generally circular rotation of the wheel and thus perpendicular to a plane 1832 extending through the cutter tip 1806. The cutter tip 1806 is positioned on the first end 1808 and has a cutter edge that lies in a cutting plane 1834. The cutting plane 1834 is acutely angled relative to the dominant force vector 1826. Stated another way, at a point of impact of the cutter edge with material to be reduced, the cutting plane 1834 is angled forward in the direction of travel of the cutter (i.e. the cutter has a positive rake angle 1836). However, in other embodiments, the rake angle could be negative or zero.

FIGS. 19A-D illustrate another exemplary cutter 1900 including a body 1901 that has a single fastener mounting aperture 1902, a single boss 1904, and a cutter tip 1906. The cutter tip 1906 can include one or more carbide inserts (two are shown), or another type of cutter tip. The cutter body 1901 has a first or cutter end 1908 and a second or trailing end 1910 that generally tapers from the first end 1908 toward the second end 1910 in one or more planes to reduce drag on the material to be cut during operation of the cutter wheel. The cutter body 1901 also has a first side 1912 and a second side 1914 opposite the first side 1912. The cutter body 1901 has a length L between the first end 1908 and the second end 1910 (FIG. 19B), and a width W between the first side 1912 and the second side 1914 (FIG. 19C). The width W of the cutter body 1901 generally varies from the first end 1908 toward the second end 1910. For purposes of the claims, the width W is defined as the maximum distance measured laterally across the cutter body 1901 between the first side 1912 and the second side 1914. The cutter body 1901 further has a mounting surface 1916 that is located on the bottom of the body 1901 (when viewed in FIG. 19B). The mounting surface 1916 (which is part of the overall inner surface of the cutter 1900) generally defines a plane 1918. The mounting aperture 1902 is disposed between the first end 1908 and the second end 1910 and is further disposed between the first side 1912 and the second side 1914.

The boss 1904 has a polygonal profile and is generally located closer to the first end 1908 than the second end 1910. As shown, the boss 1904 is located adjacent or on the first end 1908 and is offset from the mounting aperture 1902 such that the fastener axis 1909 does not intersect the boss 1904. For example, the fastener axis 1909, as illustrated, is perpendicular to the plane 1918. The boss 1904 extends outward from the plane 1918 and has a first surface 1920 (FIG. 19C) on the first end 1908 and a second surface 1922 that is generally opposite the first surface 1920 and that faces the second end 1910. The boss 1904 has a first dimension that is measured along the length L and a second dimension that is measured along the width W. The second dimension is larger than the first dimension such that the boss 1904 is wider (along width W) than the boss 1904 is long (along the length (L). In general, the boss 1904 has a second dimension that is at least 50% of the width W, although the second dimension can be smaller than 50% of the width W (e.g., at least 25% of the width W).

The second surface 1922 is non-planar and elongated along the width, and has a plurality of reaction surface sections 1922a-e that are configured to engage a sidewall 1923 of the corresponding recess on the mounting structure (e.g., in a mounting bracket, a wear plate, or drive plate (see FIG. 19D)). Elongated along the width means that the non-planar portions or sections of the second surface 1922 result in an increased overall contact or engagement length as compared to a planar second surface that would extend directly across the entire width. As illustrated, the second surface 1922 is recessed toward the first end 1908 (i.e. the reaction surface sections cooperate to define a 'pocket') and nests onto a corresponding 'bump' defined by the sidewall 1923. Consistent with what is described with regard to FIG. 16, the force-transfer interface is defined by the reaction surface sections 1922a-e of the boss 1904 and the sidewall 1923 of the boss receiving recess. That is, in response to a force acting on the cutter 1900, one or more of the reaction surface sections 1922a-e are configured to contact the sidewall 1923 of the recess to transfer the force to the plate. The complementary non-planar surfaces 1922, 1923 of the cutter 1900 and the mounting structure facilitate effective transfer of the forces acting on the cutter even with minor differences in manufacturing tolerances between the surfaces, and even when the force is not completely parallel to the mounting surface 1916. Stated another way, the non-planar surfaces of the cutter 1900 and the mounting structure cooperate to minimize any moment imparted on the cutter 1900 during operation that may tend to dislodge the cutter 1900 from the mounting structure.

Referring to FIG. 19B, the second surface 1922 is angled at a first angle 1924 relative to the plane 1918 defined by the mounting surface 1916. The first angle 1924 is equal to, or within a tolerance level of (e.g. within 5 degrees), the angle of the sidewall of the respective boss receiving recess. As shown, the first angle is approximately 90 degrees (i.e. perpendicular to the plane 1918), although the angle can be above or below 90 degrees. The illustrated mounting surface 1916 is oriented parallel to the prevailing direction of dominant force (shown by dominant force vector 1926) that acts on the cutter 1900 during operation. The reaction surface sections 1922a-e define planes that are oriented vertically when the cutter 1900 first engages an object via the cutter edge during operation. As shown in FIG. 19B, the dominant force vector 1926 is perpendicular to some, but not all, of the reaction surface sections 1922a-e.

The cutter 1900 also includes an optional relief notch 1928 at the vertex of the contact surface 1922 and the mounting surface 1916. The relief notch 1928 prevents undesirable loading when the intersection between the contact surface 1922 and mounting surface 1916 is imperfect. The relief notch 1928 also enables full contact between the boss contact surface 1922 and the mating sidewall surface 1923 of the boss receiving recess without any edge treatment (e.g. chamfer or fillet) required at the intersection of the mounting and sidewall surfaces of the boss receiving recess. This allows the mounting and sidewall surfaces of the boss receiving recess to have a square corner, greatly simplifying the manufacture of the boss receiving recess.

Referring to FIG. 19B, the cutter tip 1906 first engages the object along the dominant force vector 1926, which is tangential to the generally circular rotation of the wheel and thus perpendicular to a plane 1932 extending through the cutter tip 1906. The cutter tip 1906 is positioned on the first end 1908 and has a cutter edge that lies in a cutting plane 1934. The cutting plane 1934 is acutely angled relative to the dominant force vector 1926. Stated another way, at a point of impact of the cutter edge with material to be reduced, the cutting plane 1934 is angled forward in the direction of travel of the cutter (i.e. the cutter has a positive rake angle 1936).

FIGS. 32A-D illustrate another exemplary cutter 3200 including a body 3201 that has a single fastener mounting aperture 3202, a single boss 3204, and cutter tip 3206. The cutter tip 3206 can include one or more carbide inserts (two are shown), or another type of cutter tip. The cutter body 3201 has a first or cutter end 3208 and a second or trailing end 3210 that generally tapers from the first end 3208 toward the second end 3210 in one or more planes to reduce drag on the material to be cut during operation of the cutter wheel. The cutter body 3201 also has a first side 3212 and a second side 3214 opposite the first side 3212. The cutter body 3201 has a length L between the first end 3208 and the second end 3210 (FIG. 32B), and a width W between the first side 3212 and the second side 3214 (FIG. 32C). The width W of the cutter body 3201 generally varies from the first end 3208 toward the second end 3210. For purposes of the claims, the width W is defined as the maximum distance measured laterally across the cutter body 3201 between the first side 3212 and the second side 3214. The cutter body 3201 further has a mounting surface 3216 that is located on the bottom of the body 3201 (when viewed in FIG. 32B). The mounting surface 3216 (which is part of the overall inner surface of the cutter 3200) generally defines a plane 3218. The mounting aperture 3202 is disposed between the first end 3208 and the second end 3210 and is further disposed between the first side 3212 and the second side 3214.

The boss 3204 has a polygonal profile and is generally located closer to the first end 3208 than the second end 3210. As shown, the boss 3204 is located adjacent or on the first end 3208 and is offset from the mounting aperture 3202 such that the fastener axis 3209 does not intersect the boss 3204. For example, the fastener axis 3209, as illustrated, is perpendicular to the plane 3218. The boss 3204 extends outward from the plane 3218 and has a first surface 3220 (FIG. 32C) on the first end 3208 and a second surface 3222 that is generally opposite the first surface 3220 and that faces the second end 3210. The boss 3204 has a first dimension that is measured along the length L and a second dimension that is measured along the width W. The second dimension is larger than the first dimension such that the boss 3204 is wider (along width W) than the boss 3204 is long (along the length (L). In general, the boss 3204 has a second dimension that is at least 50% of the width W, although the second dimension can be smaller than 50% of the width W (e.g., at least 25% of the width W).

The second surface 3222 is non-planar and elongated along the width, and has a plurality of reaction surface sections 3222a-e that are configured to engage a sidewall 3223 of the corresponding recess on the mounting structure (e.g., in a mounting bracket, a wear plate, or drive plate (see FIG. 32D)). As illustrated, the second surface 3222 projects toward the aperture 3202 (i.e. the reaction surface sections cooperate to define a 'bump') and nests onto a corresponding 'pocket' defined by the sidewall 3223. Consistent with what is described with regard to FIG. 13, the force-transfer interface is defined by the reaction surface sections 3222a-e of the boss 3204 and the sidewall 3223 of the boss receiving recess. That is, in response to a force acting on the cutter 3200, one or more of the reaction surface sections 3222a-e are configured to contact the sidewall 3223 of the recess to transfer the force to the plate. The complementary non-planar surfaces 3222, 3223 of the cutter 3200 and the mounting structure facilitate effective transfer of the forces acting on the cutter even with minor differences in manufacturing tolerances between the surfaces, and even when the force is not completely parallel to the mounting surface 3216. Stated another way, the non-planar surfaces 3222, 3223 of the cutter 3200 and the mounting structure cooperate to minimize any moment imparted on the cutter 3200 during operation that may tend to dislodge the cutter 3200 from the mounting structure.

Referring to FIG. 32B, the second surface 3222 is angled at a first angle 3224 relative to the plane 3218 defined by the mounting surface 3216. The first angle 3224 is equal to, or within a tolerance level of (e.g. within 5 degrees), the angle of the sidewall of the respective boss receiving recess. As shown, the first angle is approximately 90 degrees (i.e. perpendicular to the plane 3218), although the angle can be above or below 90 degrees. The illustrated mounting surface 3216 is oriented parallel to the prevailing direction of dominant force (shown by dominant force vector 3226) that acts on the cutter 3200 during operation. The reaction surface sections 3222a-e define planes that are oriented vertically when the cutter 3200 first engages an object via the cutter edge during operation. As shown in FIG. 32B, the dominant force vector 3226 is perpendicular to some, but not all, of the reaction surface sections 3222a-e.

The cutter 3200 also includes an optional relief notch 3228 at the vertex of the contact surface 3222 and the mounting surface 3216. The relief notch 3228 prevents undesirable loading when the intersection between the contact surface 3222 and mounting surface 3216 is imperfect. The relief notch 3228 also enables full contact between the boss contact surface 3222 and the mating sidewall surface 3223 of the boss receiving recess without any edge treatment (e.g. chamfer or fillet) required at the intersection of the mounting and sidewall surfaces of the boss receiving recess. This allows the mounting and sidewall surfaces of the boss receiving recess to have a square corner, greatly simplifying the manufacture of the boss receiving recess.

Referring to FIG. 32B, the cutter tip 3206 first engages the object along the dominant force vector 3226, which is tangential to the generally circular rotation of the wheel and thus perpendicular to a plane 3232 extending through the cutter tip 3206. The cutter tip 3206 is positioned on the first end 3208 and has a cutter edge that lies in a cutting plane 3234. The cutting plane 3234 is acutely angled relative to the dominant force vector 3226. Stated another way, at a point of impact of the cutter edge with material to be reduced, the cutting plane 3234 is angled forward in the direction of travel of the cutter (i.e. the cutter has a positive rake angle 3236).

FIGS. 33A-33C illustrate dominant force vectors for different arrangements of cutters described herein on cutter wheels, drums, or rotors (e.g., the wheels described relative to FIGS. 8, 10).

The exemplary bosses and corresponding recesses described relative to and illustrated in FIGS. 13, 14, 16, 18A-D, 19A-D, and 32A-D each have a surface-contact force-transfer interface that is defined by one or more surfaces of these features, whereas the exemplary bosses and corresponding recesses described relative to and illustrated in FIGS. 15 and 17 each define a line-contact force-transfer interface. That is, the surface-contact force-transfer interface acts primarily along the entire reaction surface and the recess wall, while the line-contact force-transfer interface acts primarily on a single point-contact between the boss and the recess. In general, it is preferred that the reaction surface(s) and the corresponding surface defined by the boss receiving recess are normal (perpendicular) to the direction of travel of the cutter during operation.

It will be appreciated that the boss may have other types of non-planar reaction surfaces while remaining within the scope of the present invention. For example, the boss may have any quantity of reaction surface sections (e.g., one, two, three, four, five (as shown in FIGS. 19A-D and 32A-D), more than five). The boss may have a partially or fully curved reaction surface, or the boss may have a reaction surface that is angled such that the reaction surface is closer to the first end on one side of the cutter than on the other side. Other shapes for the reaction surface are possible and considered herein. The above described cutters, bosses, and boss receiving recesses are not limiting in scope and the boss could have any shape without departing from the present invention.

The cutters described with regard to various embodiments of the present invention have a reaction surface and complementary surface in the boss receiving recess that are generally perpendicular to the direction of travel of the cutter when mounted on a wheel. This arrangement surprisingly allows for a single, small fastener (e.g., no larger than 0.75 inches, or a fastener aperture that is no more than ⅓ of the width W) to be used to attach the cutter to a cutter wheel. Before the present invention, for large stump cutter machines (e.g., 300 HP), it was generally believed that at least one large fastener (e.g., sized at 0.875 inches or larger), and likely multiple fasteners were needed to adequately resist the loads that are applied to the cutter during operation. The fastener mounting apertures described relative to the Figures (e.g., FIGS. 18A-D, FIGS. 19A-D, and FIGS. 32A-D) surprisingly can be sized to receive a fastener with a 0.75 inch diameter shaft or smaller while still adequately resisting shear. It is believed that this is due to the surface-contact force-transfer interface between the boss and the wheel. Initially, it was expected that, with a relatively small fastener (and correspondingly sized aperture), additional bosses may be needed to maintain the position or orientation of the cutter on the wheel (e.g., to resist any moment acting on the cutter). However, after testing, it was determined that a fastener sized with a 0.75 inch shaft proved adequate for maintaining the position of a cutter with a boss that has a reaction surface consistent with the embodiments described herein. In fact, for some cutters, the fastener can be as small as 0.375 inches. Also, unlike existing cutter wheels with cutters that are attached to cutter wheels with approximately 98,000 lb-f clamp load (with two ⅞" bolts torqued to 500 ft*lbf), cutters including the bosses described herein can be attached to cutter wheels with approximately 40,000 lb-f clamp load (with a single ¾" bolt torqued to 350 ft*lbf). A single fastener and lower torque requirements is beneficial for minimizing the time it takes to replace a cutter, as well as the ability to use a smaller torque wrench while doing so. The same discussion above applies equally to smaller cutter sizes according to the invention, used on smaller stump cutter machines (e.g., below 100 HP), such that fastener sizes can be smaller than those previously used with prior art cutters on those smaller machines.

Figure 20:
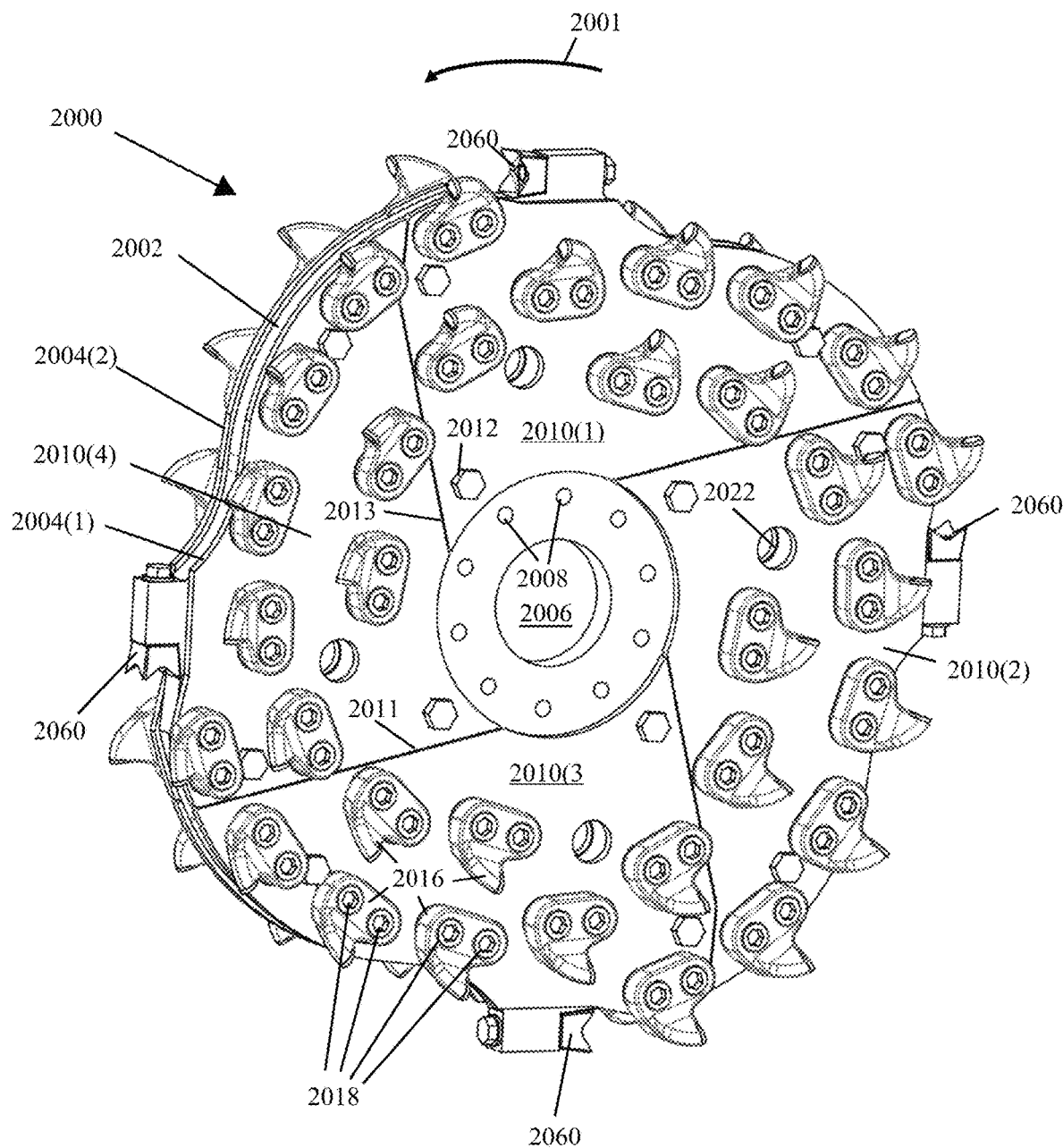
FIG. 20 is a perspective view of another exemplary cutter wheel including a drive plate, wear plates with wear plate segments, cutter teeth, and a plurality of drive plate wear prevention cutters.
Figure 21:
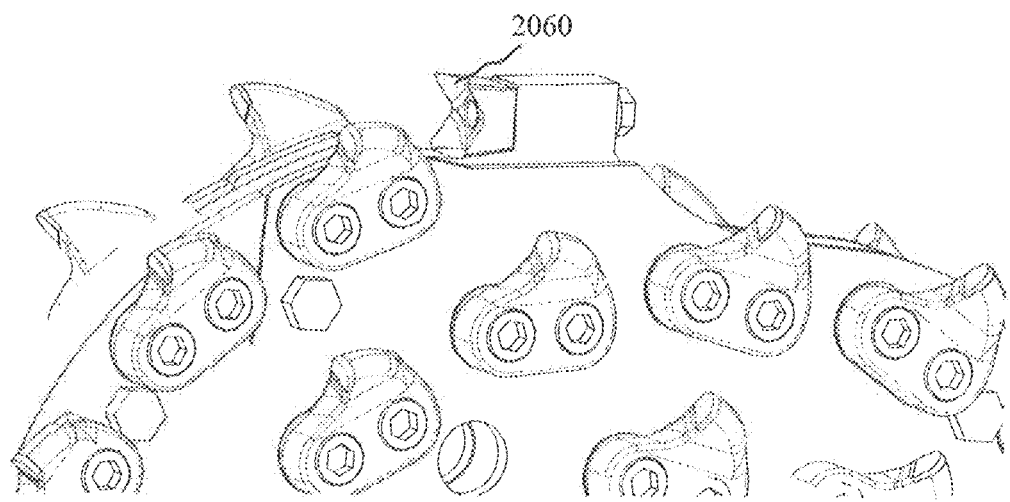
FIG. 21 is a perspective view of an enlarged portion of the cutter wheel of FIG. 20 illustrating one of the drive plate wear prevention cutters.
Figure 22:
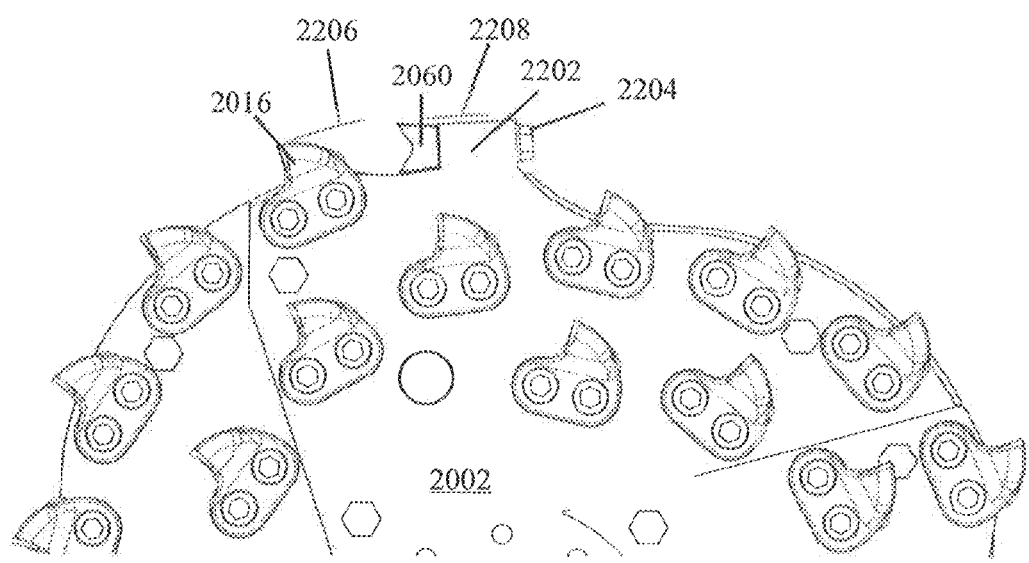
FIG. 22 is a side elevation view of a portion of the cutter wheel of FIG. 20.

The cutter wheels described with regard to FIGS. 1-12 may include additional or other features that provide wear prevention associated with the cutter wheel 114. For example, FIG. 20 depicts a cutter wheel 2000 including a plurality of drive plate wear prevention cutters 2060, sometimes referred to as plunge cutters. FIG. 21 depicts a close-up view of one of the drive plate wear prevention cutter 2060. FIG. 22 depicts a profile view of the cutter wheel 2000 showing the profile of the drive plate 2002 including a mounting feature 2202 for mounting the drive plate wear prevention cutter 2060. FIGS. 20-22 are best viewed together with the following description.

The cutter wheel 2000 is similar to the cutter wheel 114, discussed above with respects to FIGS. 2-5, the cutter wheel 900, discussed relative to FIGS. 9-12, and may include any of the above discussed features of cutter wheel 114 or 900. Similar parts have been given similar part numbers of the 2000 series. The same description set forth above for the cutter wheels 114, and 900 apply equally to the cutter wheel 2000 and will not be repeated herein.

One or more of a plurality of drive plate wear prevention cutters or plunge cutters 2060 may be mounted to an outer profile of the drive plate 2002. The plurality of drive plate wear prevention cutters 2060 operate to prevent wear on the drive plate 2002 by reducing any material that would come in contact with the outer profile of the drive plate 2002. FIGS. 20-22 show four drive plate wear prevention cutters 2060 equally spaced around the profile of the drive plate 2002, such that there is a single drive plate wear prevention cutter 2060 adjacent each wear plate segment 2010. However, in embodiments, there may be more or fewer drive plate wear prevention cutters 2060 without departing from the scope hereof.

As shown in FIG. 22, the mounting feature 2202 is integral to the drive plate 2002. In other embodiments, the mounting feature 2202 may be welded or attached to the drive plate 2002. In some embodiments the mounting feature 2202 may be bolted to the wear plates 2004. The drive plate wear prevention cutters 2060 may be mounted to the mounting feature 2202 via a fastener 2204. Moreover, the distance from the center of the cutter wheel 2000 to the outer tip of the outer-most cutter 2016 (shown as line 2206 in FIG. 22) is greater than the distance from the center of the cutter wheel 2000 to the outer tip of the drive plate wear prevention cutters 2060 (shown as line 2208 in FIG. 22). This provides the advantage that the drive plate wear prevention cutters 2060 are not subjected to significant forces during operation because the cutters 2016 function as the primary material reduction features on the cutter wheel 2000.

Figure 23:
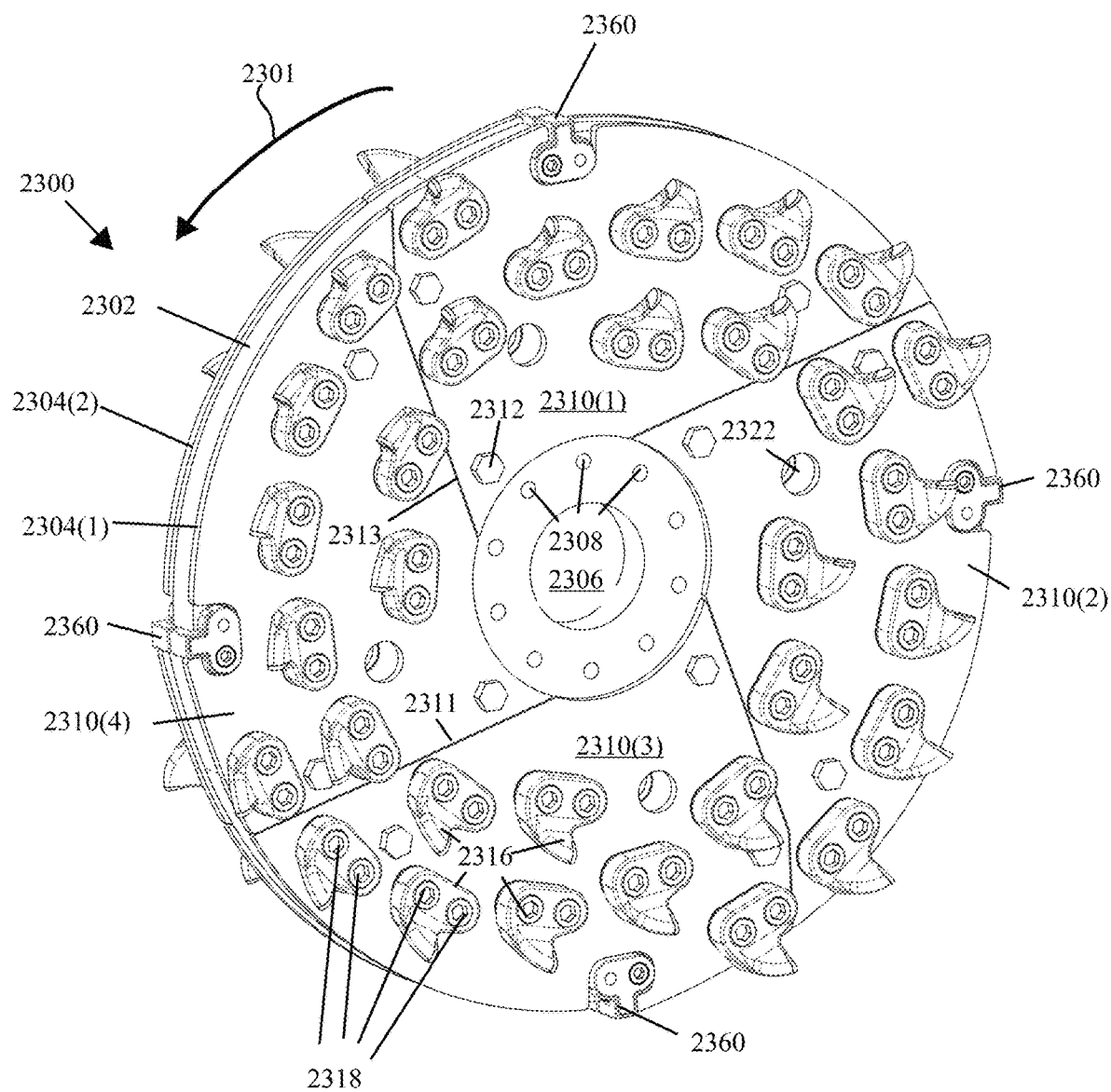
FIG. 23 is a perspective view of another exemplary cutter wheel including a drive plate, wear plates with wear plate segments, cutter teeth, and a plurality of drive plate wear prevention cutters.
Figure 24:
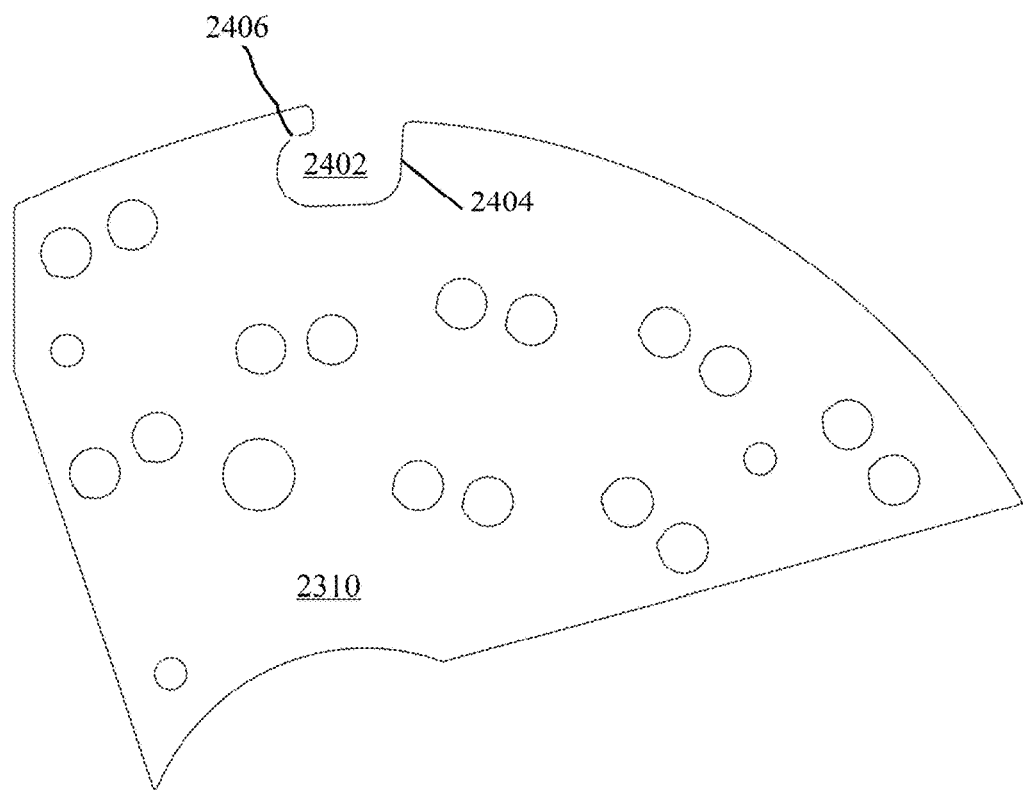
FIG. 24 is a right elevation view of one of the wear plate segments of FIG. 23, including a mounting feature for receiving the drive plate wear prevention cutters.
Figure 25:
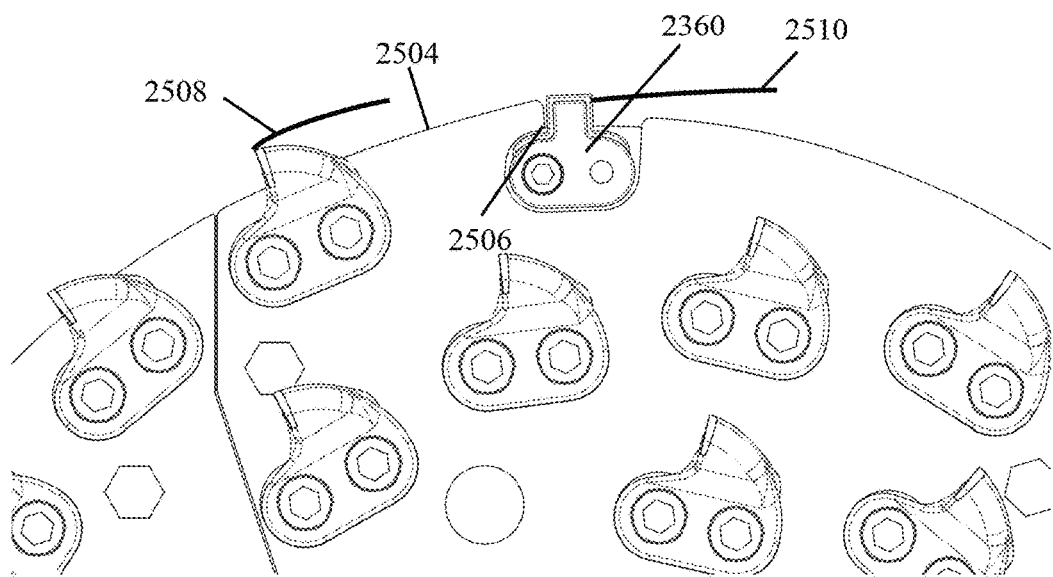
FIG. 25 is a partial side elevation view of the cutter wheel of FIG. 23.

FIG. 23 depicts a cutter wheel 2300 including a plurality of drive plate wear prevention cutters 2360. FIG. 24 depicts a right elevation view of one of the wear plates segments 2310, including a mounting feature 2402 for receiving the drive plate wear prevention cutters 2360. FIG. 25 depicts a profile view of the cutter wheel 2300 including an outer edge that ramps toward the tip of the drive plate wear prevention cutter 2360. FIGS. 23-25 are best viewed together with the following description.

The cutter wheel 2300 is similar to the cutter wheel 114, discussed above with respects to FIGS. 2-5, the cutter wheel 900, discussed relative to FIGS. 9-12, and the cutter wheel 2000 discussed above relative to FIGS. 20-22, and may include any of the above discussed features of cutter wheel 114, 900, or 2000. Similar parts have been given similar part numbers of the 2300 series. The same description set forth above for the cutter wheels 114, 900, and 2000 apply equally to the cutter wheel 2300 and will not be repeated herein.

One or more drive plate wear prevention cutters or plunge cutters 2360 may be mounted at an outer profile of the drive plate 2302. The plurality of drive plate wear prevention cutters 2360 operate to prevent wear on the drive plate 2302 by reducing any material that would come in contact with the outer profile of the drive plate 2302. FIGS. 23-25 show four drive plate wear prevention cutters 2360 equally spaced around the profile of the drive plate 2302, such that there is a single drive plate wear prevention cutters 2360 adjacent each wear plate segment 2310. However, in embodiments, there may be more or fewer drive plate wear prevention cutters 2360 without departing from the scope hereof.

The drive plate wear prevention cutters 2360 differ from the drive plate wear prevention cutters 2060, discussed above, in that they are not mounted at a mounting feature (e.g. mounting feature 2202) on the drive plate, but instead are mounted in similar manner to cutters 2316 in that they are within a mounting feature 2402 (e.g. a notch, or recess) on the outer profile of the wear plate 2304 (or a segment thereof). Furthermore, the drive plate wear prevention cutters 2360 include two cutters that mount at each side of the drive plate 2302, and include a portion that traverses the outer edge of the drive plate 2302 to protect the outer edge from wear during operation.

As shown in FIG. 24, the mounting feature 2402 is a notch, recess, or partial aperture within the wear plate 2304 (or a segment 2310 thereof). The drive plate wear prevention cutters 2360 may be mounted within the mounting feature 2402 in a similar manner to the cutters 2316 being mounted in a boss receiving recess providing a contact interface between the drive plate wear prevention cutters 2360 and a trailing edge 2404 and/or an upper edge 2406. In other words, the trailing edge 2404 and/or the upper edge 2406 of the mounting feature 2402 may be configured to provide a contact interface that transfers predominant force affected on the drive plate wear prevention cutters 2360 to the wear plate 2304, as opposed to the drive plate 2302.

As shown in FIG. 25, one or both of the wear plate 2304, and the drive plate 2302 may include an outer edge 2504 respectively, that ramps toward an outer tip of the drive plate wear prevention cutter 2360. This reduces the predominant force affected on the leading edge 2506 of the drive plate wear prevention cutter 2360. Accordingly, the ramp prevents material from wedging on the underside of the crossover portion of the wear prevention cutter 2360 between the wear prevention cutter 2360 and the drive plate 2302. Thus, breaking of the crossover portion of the drive plate wear prevention cutter 2360 is prevented.

Moreover, the distance from the center of the cutter wheel 2300 to the outer tip of the outer-most cutter 2316 (shown as line 2508 in FIG. 25) is greater than the distance from the center of the cutter wheel 2300 to the outer tip of the drive plate wear prevention cutters 2360 (shown as line 2510 in FIG. 25). This provides the advantage that the drive plate wear prevention cutters 2360 are not subjected to significant forces during operation because the cutters 2316 function as the primary material reduction features on the cutter wheel 2300.

The above described features provide many advantages over conventional material reducing cutter wheels. For example, by creating the boss to engage a boss receiving recess configuration, discussed above, within the wear plate (e.g. wear plates 204), the shear force load path is through the engagement of the boss and the boss receiving recess (which may be in the wear plate, or even in the drive plate in some embodiments) as opposed to on the fastener itself. As such, the fastener is less likely to break due to said shear force. In some embodiments, the boss and boss receiving recess may cooperate to prevent rotation of the cutter when operating the cutter wheel (which is particularly advantageous if a single fastener per cutter is used). Moreover, the wear plates discussed herein are less costly to manufacture as compared to manufacturing a single cutter wheel. The wear plates are replaceable thereby increasing the lifespan of the drive plate of the presently described cutter wheel. Worn sockets within the wear plates may be easily replaced by replacing the entire wear plate, or a wear plate segment thereof. Conventional cutter wheels may be hard-faced which requires post balancing. By using wear plates as discussed herein, balancing may be eliminated, or more easily performed by manipulating the given wear plate or altering a segment thereof.

Figure 26:
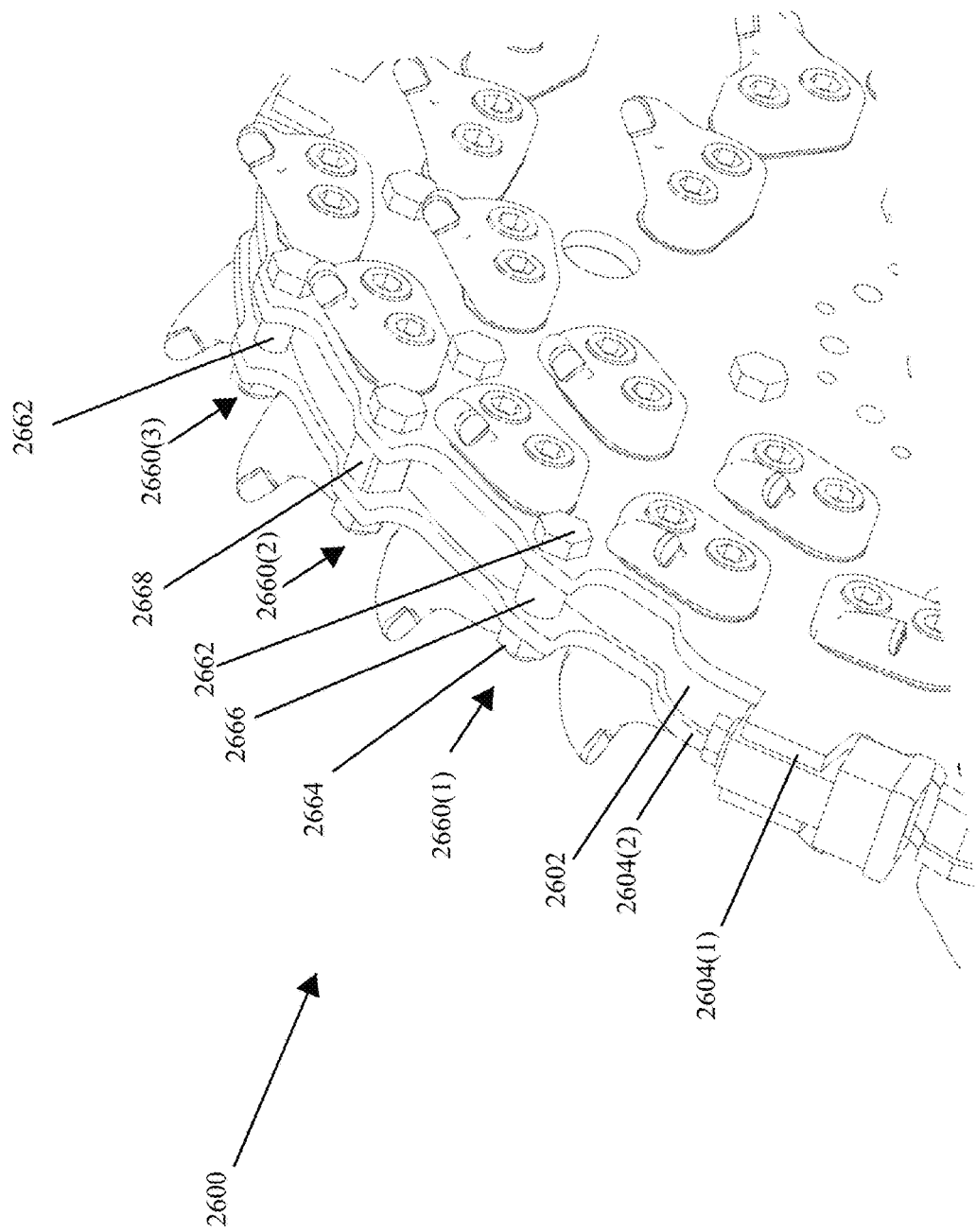
FIG. 26 is a perspective view of a portion of another exemplary cutter wheel including a wear prevention feature that may be used in any cutter wheel illustrated in FIGS. 1-25.
Figure 27:
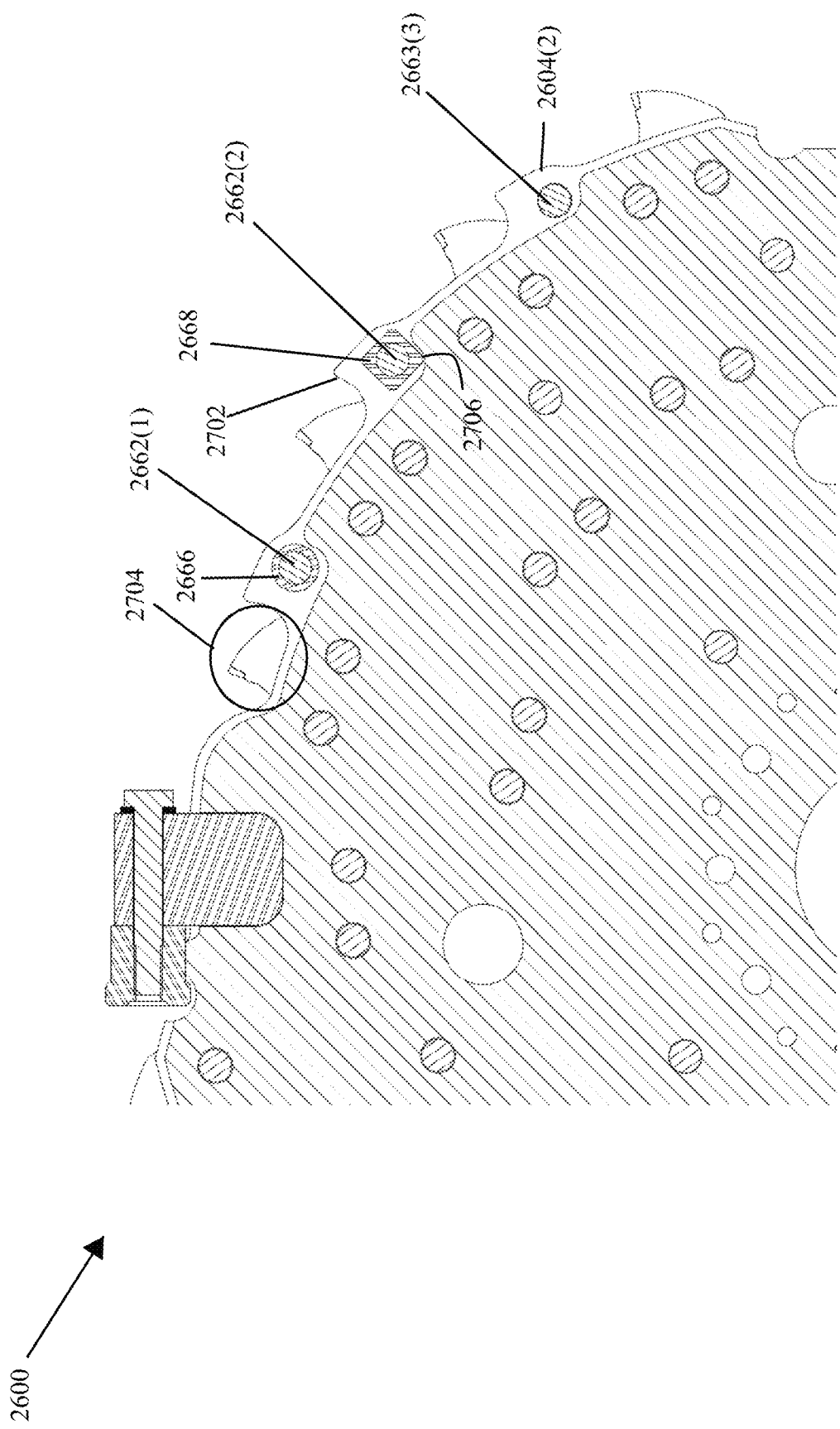
FIG. 27 is a side view of the cutter wheel of FIG. 26 with one of the wear plates removed to expose the drive plate.
Figure 28:
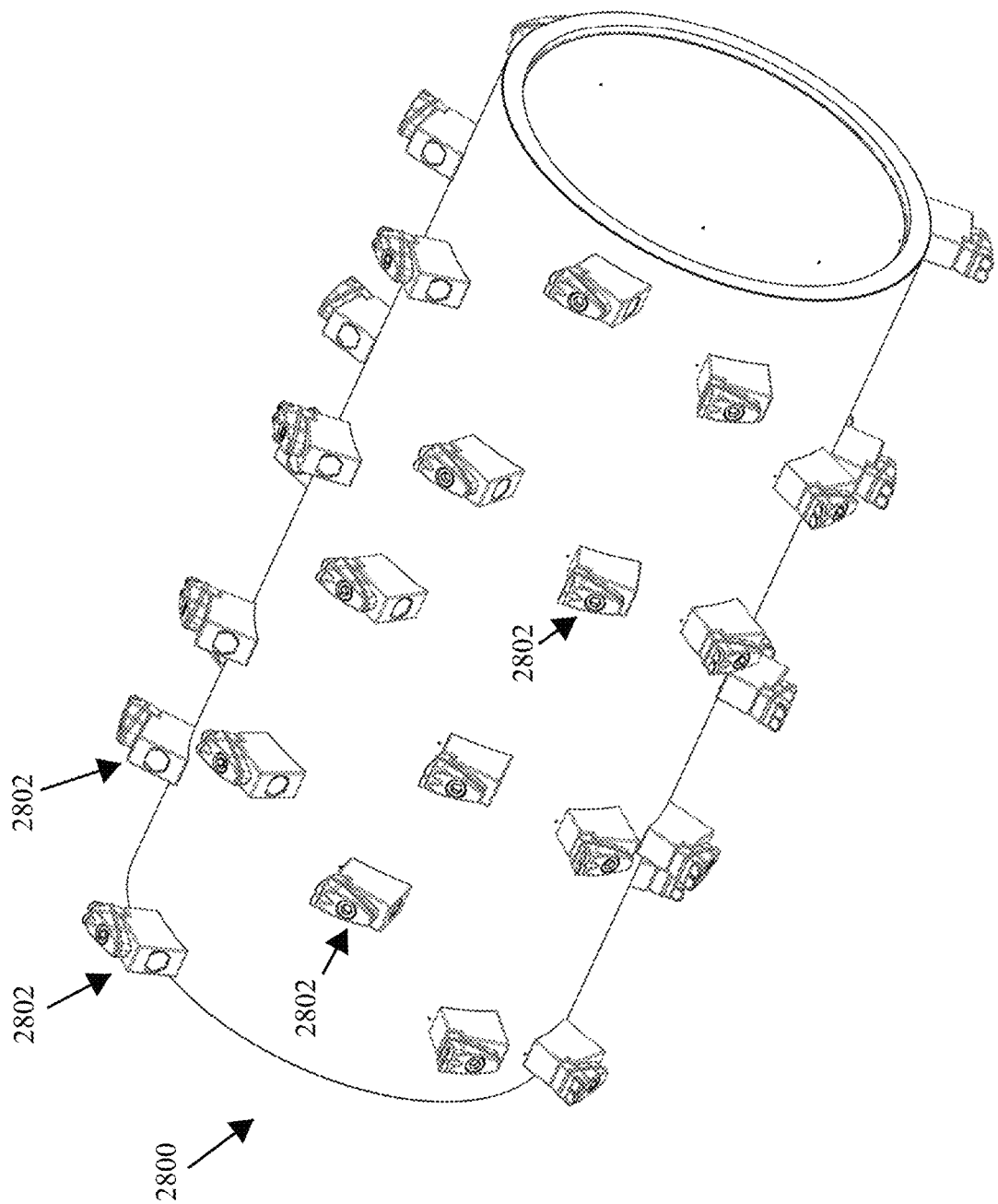
FIG. 28 is a perspective view of an exemplary rotating drum for material reduction, including a plurality of cutter assemblies mounted on the drum.

FIG. 26 depicts a perspective view of a cutter wheel 2600 including a wear prevention feature 2660 that may be used in any of the above described cutter wheels, in embodiments. FIG. 27 depicts a cross section of the cutter wheel 2600.

A wear prevention feature 2660 may be bolted or attached between the two wear plates 2604 to protect the drive plate 2602 from wear. In general, wear occurs on radially outward, leading edge features of the drive plate 2602. FIG. 26 shows a wear prevention feature 2660 in the form of a bolt 2662 passing through aligned holes in both the first and second wear plates 2604. It is secured with a nut 2664 on the opposite side. As shown in FIG. 27, the shank of bolt 2662, has a radial path greater than the radial path of the trailing feature of the drive plate 2602. This allows the shank of the bolt 2662 to wear, while the drive plate 2602 is protected. While significant wear will occur on the bolt 2662, the bolt and the nut 2664 are relatively inexpensive, common and easy to replace. Proud portions 2702 (FIG. 27) of the wear plates 2604 will see significant wear, but since the proud portions 2702 are of a wear resistant material and are also replaceable, some wear is acceptable. The proud portions 2702 of the wear plate 2604 may be shaped to scoop material out of the way or even cut material and prevent material from sliding and causing increased rate of wear. Likewise, the profile of the drive plate 2602 is stepped, as shown in FIG. 27, to encourage material to be ejected rather than slide along and increase the rate of wear. The patterns of the features of the wear prevention features 2660 are designed such that when they wear, the wheel retains balance. The positions of the wear prevention features 2660, the profile of the wear plates 2604 and the drive plate 2602 are designed to enhance a chip evacuation path 2704 axially around the cutter.

The wear of the bolt 2662 shank may be enhanced with a roller 2666 or an indexable sleeve 2668. The roller 2662 is narrower than the drive plate 2602 and is free to rotate about the bolt 2662 axis. This allows wear to occur on all the around the entire circumference of roller 2666 instead of one side of the bolt 2662. The roller 2666 may be of a hardened material to increase wear resistance. The indexable sleeve 2668 is prevented from rotating by a feature 2706 (FIG. 27) of the drive plate 2602. The feature 2706 may be one of the steps on the outer profile of the drive plate 2602. If one side of the indexable sleeve 2668 wears, the bolt 2662 may be removed, the indexable sleeve 2668 rotated to a new side and the bolt 2662 reinserted. Both the roller 2666 and indexable sleeve 2668 is designed so that it has a radial path greater than the radial path of the trailing feature (e.g. feature 2706) of the drive plate (FIG. 27).

Referring now to FIGS. 28-31, rotating drum 2800 may be used in brush chipper machines, tub grinders, or mulchers for example. Drum 2800 may generally represent a rotor used on a mulcher head without departing from the scope hereof. A plurality of cutter assemblies 2802 are mounted to the rotating drum 2800. The rotating drum 2800 may be a cylindrical drum that is coupled to a drive system of the grinding machine. The plurality of cutter assemblies 2802 may be mounted in a helical configuration (shown in FIG. 28) about the outer surface of the drum, or in any other configuration desired.

Figures 29, 30:
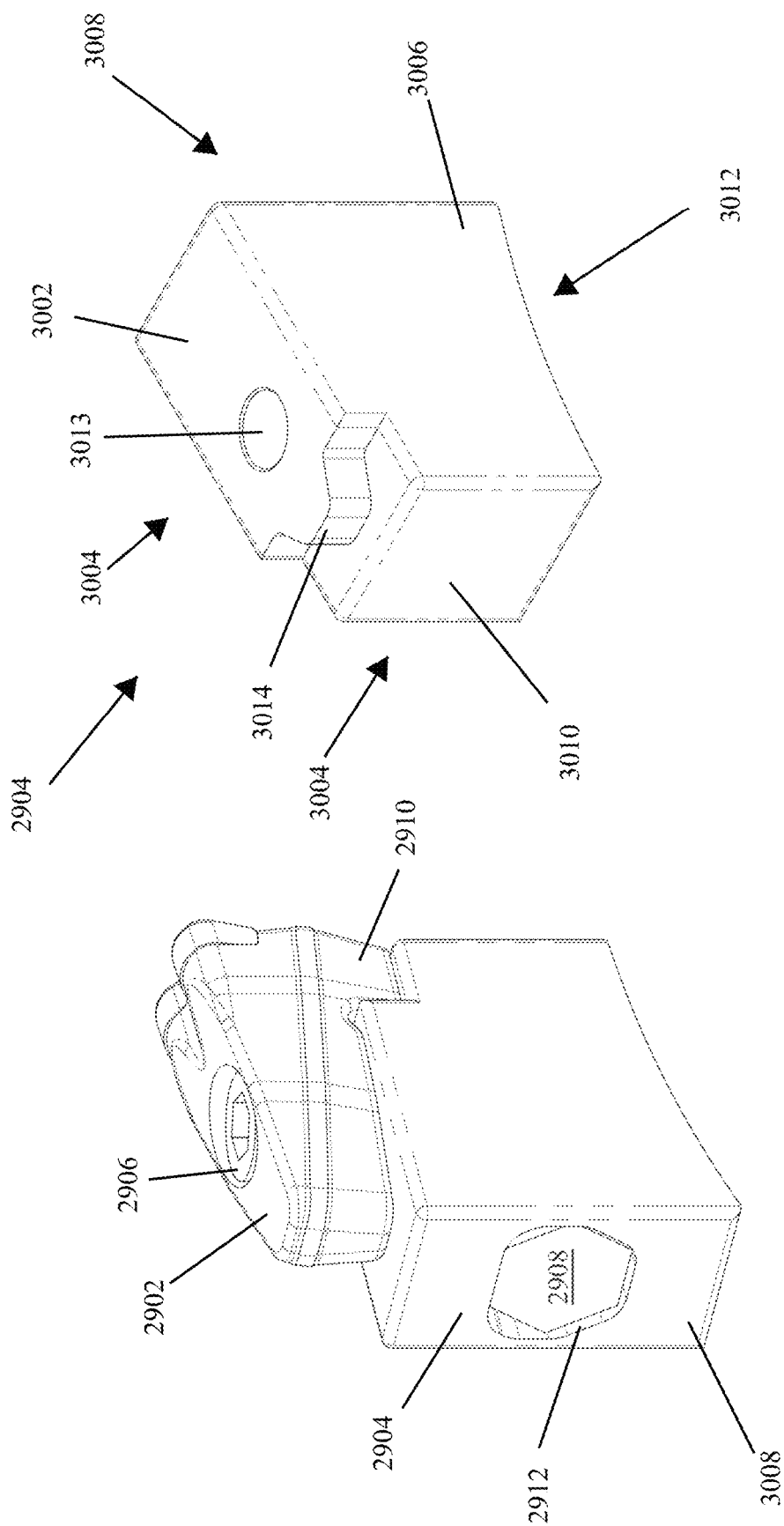
FIG. 29 is a perspective view of one cutter assembly of FIG. 28, including a cutter mount, a cutter, a fastener, and a cutter fastener insert.
FIG. 30 is a perspective view of the cutter mount of FIG. 29.

Referring to FIG. 29, the plurality of cutter assemblies 2802 include a cutter 2902 mounted to a cutter mount 2904. The cutter 2902 is mounted via a single fastener 2906 that is coupled to a cutter fastener insert 2908. The cutter 2902 and cutter fastener insert 2908 may have varying, corresponding shapes consistent with the bosses described herein. It should be appreciated that there may be more than a single fastener 2906, and the cutter fastener 2906 may attach directly to the cutter mount 2094 instead of to the cutter fastener insert 2908.

The cutter 2902 may be any of the cutters described herein. In the particular embodiment shown in FIGS. 29-31, the cutter 2902 includes an "M" shaped boss 2910.

The cutter mount 2904 may be similar to the cutter mount 921 discussed above. The cutter mount 2904 may thus have any of the features discussed above relative to cutter mount 921, and the cutter mount 921 may thus have any of the features discussed below relative to the cutter mount 2904. The cutter mount 2904 may be welded, adhered, bolted, nailed, screwed, riveted, or otherwise attached to the rotating drum 2800.

Referring to FIG. 30, the cutter mount 2904 may include a top surface 3002, two side surfaces 3004, 3006, a rear surface 3008, and a front surface 3010, and a bottom surface 3012. The top surface 3002 may include a fastener aperture 3013 that may be threaded or not threaded. The fastener aperture 3013 may be threaded when the fastener 2906 couples directly to the cutter mount 2904, and unthreaded when the fastener 2906 couples to the cutter fastener insert 2908. The top surface 3002 may further include a boss receiving feature 3014 that is complementary to the boss 2910 of the cutter 2902. The boss receiving feature 3014 is shown in FIG. 30 as a sidewall cut into the top surface 3002 that matches the boss 2910 (e.g., similar to or the same as the bosses described with regard to FIGS. 18A-D, 19A-D, or 32A-D). The angle of the sidewall relative to the top surface

3002 may be equal to the angle of the boss 2910 relative to the inner surface of the cutter 2902 (e.g., the surface that abuts the cutter mount 2904 when the cutter 2902 is mounted thereto. In the embodiment shown in FIGS. 28-31, the boss receiving feature 3014 does not extend along the sides of the boss 2910. As such, the non-planar boss receiving feature 3014 cooperates with the non-planar boss 2910 to prevent rotation of the cutter 2902 relative to the cutter mount 2904. The bottom surface 3012 may be curved to match the curvature of the drum 2800.

In some embodiments, the fastener insert 2908 may also be a hex nut. The fastener aperture 2912 may correspondingly be rectangular or hexagonal to match the profile of the nut, and be in the rear, front, or side surfaces 3010, 3008, 3004-3006, respectively. The front surface 3010 is shown as orthogonal or perpendicular to the side surfaces 3004, 3006. It should be appreciated that any of these surfaces may be angled (such as tapered) to prevent drag during operation.

Figure 31:
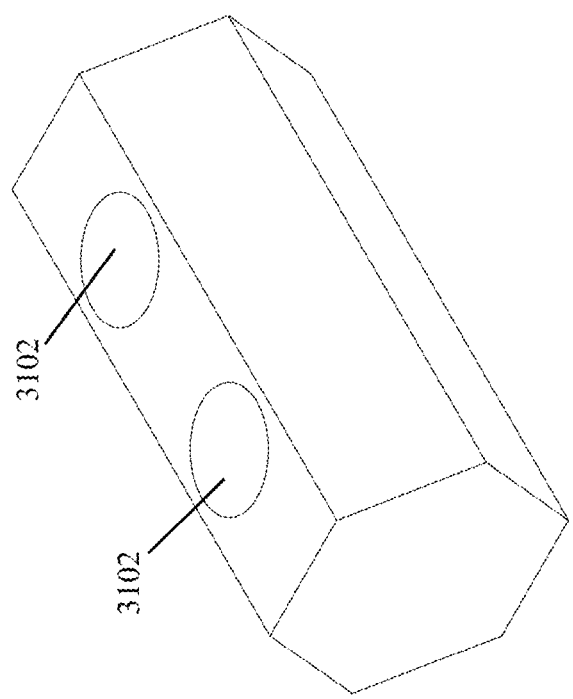
FIG. 31 is a perspective view the cutter fastener insert of FIG. 29.

As shown in FIG. 29, the rear surface 3008 may have an aperture 2912 into which the cutter fastener insert 2908 is positioned. It should be appreciated that the aperture 2912 may be on the side or front surfaces alternatively (or additionally) without departing from the scope hereof. The aperture 2912 may be hexagonal to match the shape of the cutter fastener insert 2908. As shown in FIG. 31, the cutter fastener insert 2908 may include one or more fastener apertures 3102. Two fastener apertures 3102 are shown in FIG. 31, however there may be more or fewer without departing from the scope hereof. The two fastener aperture embodiment shown in FIG. 31 provides the advantage that the insert 2908 may be removed and reversed should one of the fastener apertures 3102 become damaged during operation.

Figure 34:
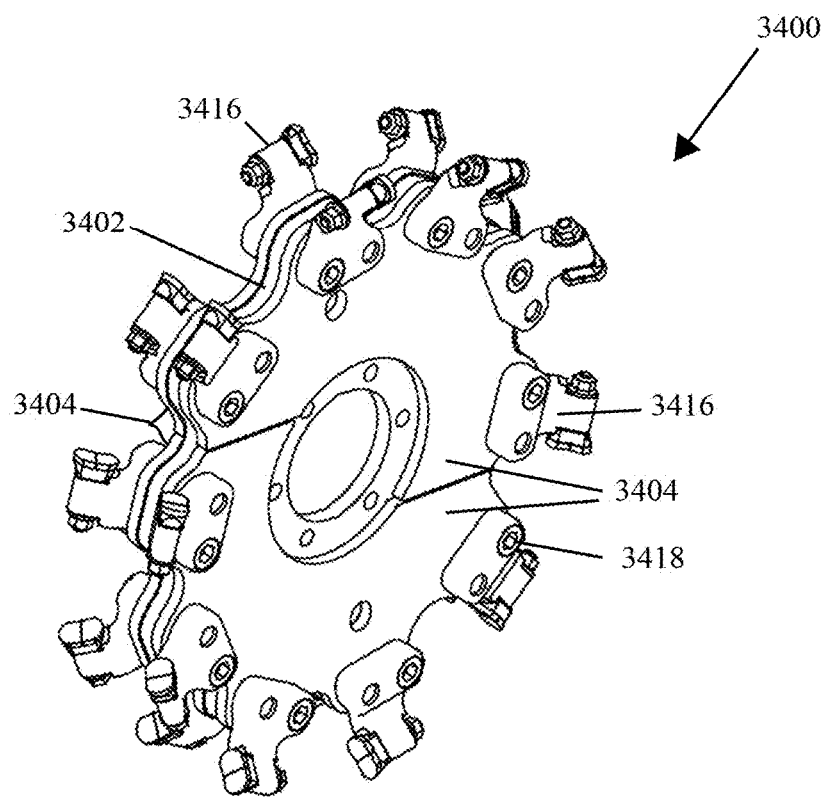
FIG. 34 is a perspective view of another exemplary cutter wheel.
Figure 35:
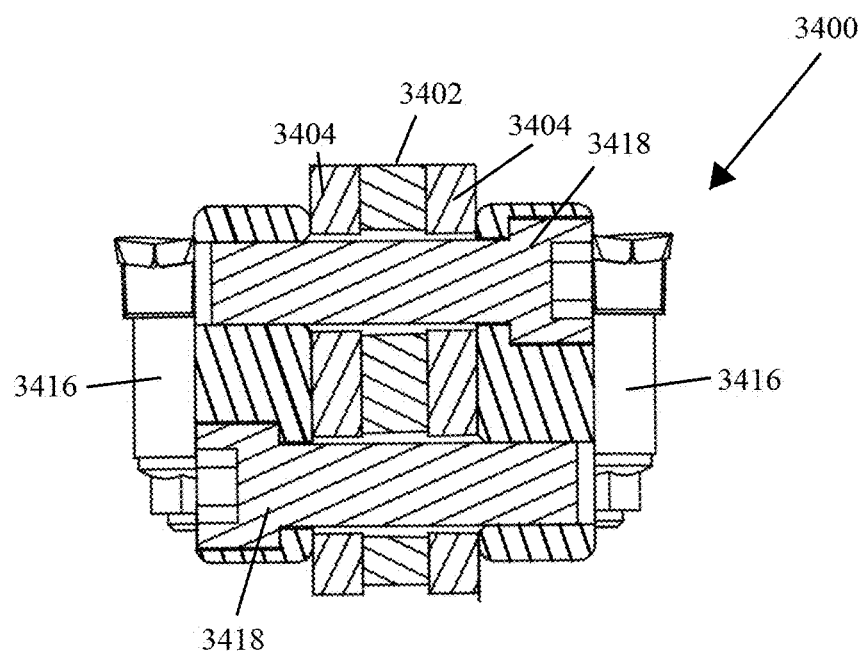
FIG. 35 is a partial section view taken through an aligned pair of cutters on the wheel of FIG. 34.
Figure 36:
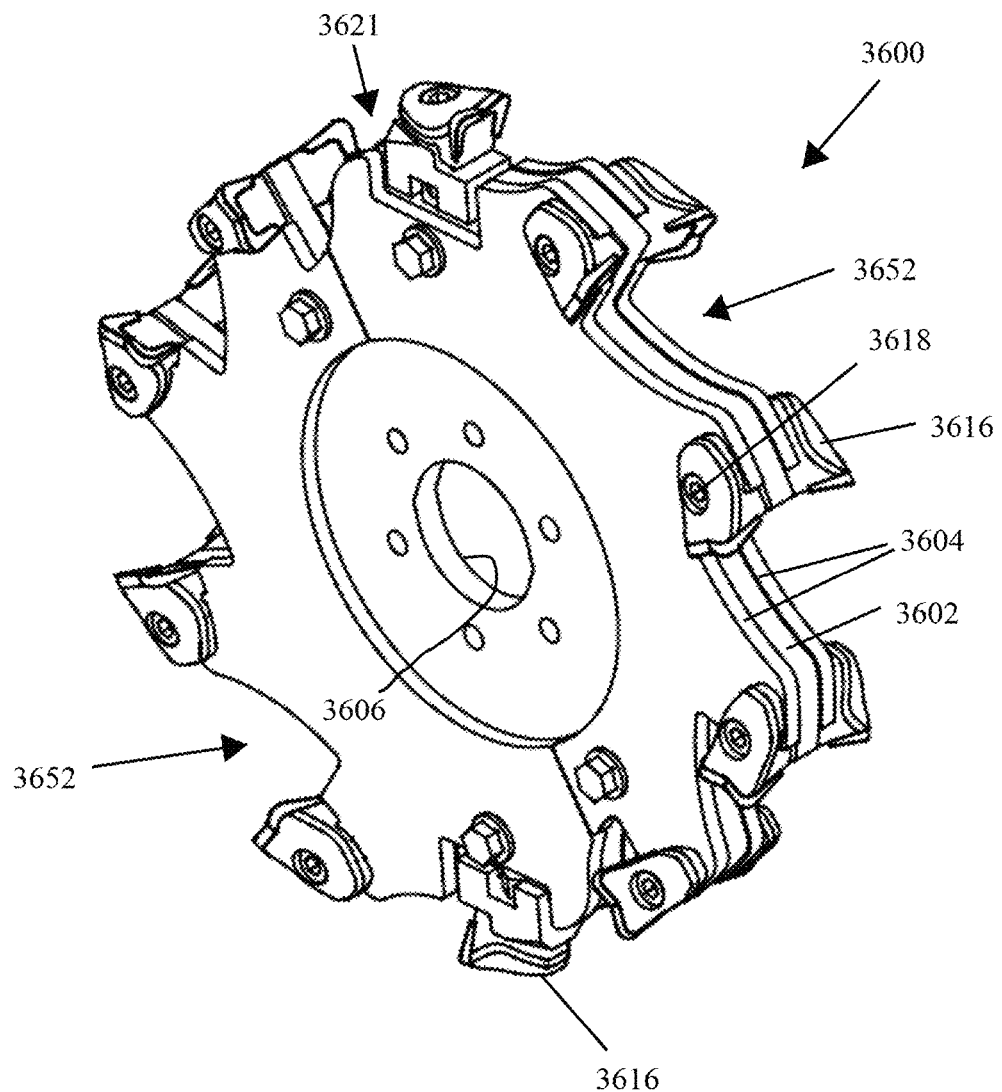
FIG. 36 is a perspective view of another exemplary cutter wheel

Those of skill in the art will understand that the concept of a laminated cutter wheel (i.e., with a drive plate and one or more wear plates) is useful even with existing-style cutters. FIGS. 34 and 35 illustrate a cutter wheel 3400 having cutters 3416 that are Vermeer® Yellow Jackets™ cutters. The cutter wheel 3400 includes a drive plate 3402 and wear plates 3404, with the features and characteristics as described above. In the illustrated arrangement, the cutters 3416 do not include any bosses or reaction surfaces that engage any boss-receiving apertures or features of the wear plates 3404. Instead, as shown in FIG. 35, the cutters 3416 are secured using the two fasteners 3418. The compression created between the opposed cutters 3416 creates the friction that secures the wear plates 3404 relative to the drive plate 3402. The cutter wheel 3400, like all of the laminated cutter wheels described herein, is re-buildable, with replaceable wear plates 3404 and cutters 3416, thereby lengthening the life expectancy of the drive plate 3402 as compared to existing, non-laminated cutter wheel assemblies. If portions of the cutter wheel 3400 become worn or damaged, those portions can be easily replaced to re-build the cutter wheel 3400.

FIGS. 36-39 illustrate yet another cutter wheel 3600 embodying the invention. The cutter wheel 3600 is illustrated as being a laminated cutter wheel and is similar in many respects to the cutter wheel 114, discussed above with respects to FIGS. 2-5, the cutter wheel 900, discussed relative to FIGS. 9-12, the cutter wheel 2000 discussed above relative to FIGS. 20-22, and the cutter wheel 2300 discussed above relative to FIGS. 23-25, and may include any of the above discussed features of cutter wheel 114, 900, 2000, or 2300. Similar parts have been given similar part numbers of the 3600 series. The same description set forth above for the cutter wheels 114, 900, 2000, and 2300 can apply equally to the cutter wheel 3600 and will not be repeated herein.

The cutter wheel 3600 is illustrated with a drive plate 3602 and a plurality of wear plates 3604 (e.g., two on each face of the drive plate 3602). Alignment apertures 3612 and respective alignment fasteners are utilized to assist in securing the wear plates 3604 to the drive plate 3602. The illustrated cutters 3616 are all identical to one another (with the exception of the interior of the fastener apertures 4002—e.g., threaded versus counter-bored), but are positioned in aligned pairs on the faces of the wear plates 3604, and also as plunge cutters positioned at the outer periphery of the cutter wheel 3600/drive plate 3602.

Significantly, the cutters 3616 (as well as the cutters 1700, 1800, and 1900 discussed above) can be re-positioned to different locations on the cutter wheel 3600 when portions of the cutter tips wear. Typically, depending upon the placement of the cutter 3616 on the cutter wheel 3600, one cutting edge of the cutter tip will experience the bulk of the wear. On the plunge cutters, it would be the upper or crown portion of the cutter tip. On the side-mounted cutters, it would be one of the cutting edges extending along one side of the cutter. Therefore, after a period of use, an aligned pair of side-mounted cutters 3616 can be "reversed" to the opposite faces of the cutter wheel 3600 so that an opposite cutting edge of each cutter tip is utilized. Or an aligned pair of side-mounted cutters 3616 could be repositioned to two plunge cutters. The plunge cutters could be moved to an aligned pair of side-mounted cutters 3616. This adds to the usable life of the cutters 3616. Unlike some cutters in which the mounting fastener is integrated with the cutter, the separate fasteners 3618 allow the fasteners to be re-used when the cutters 3616 are changed or moved.

Figure 37:
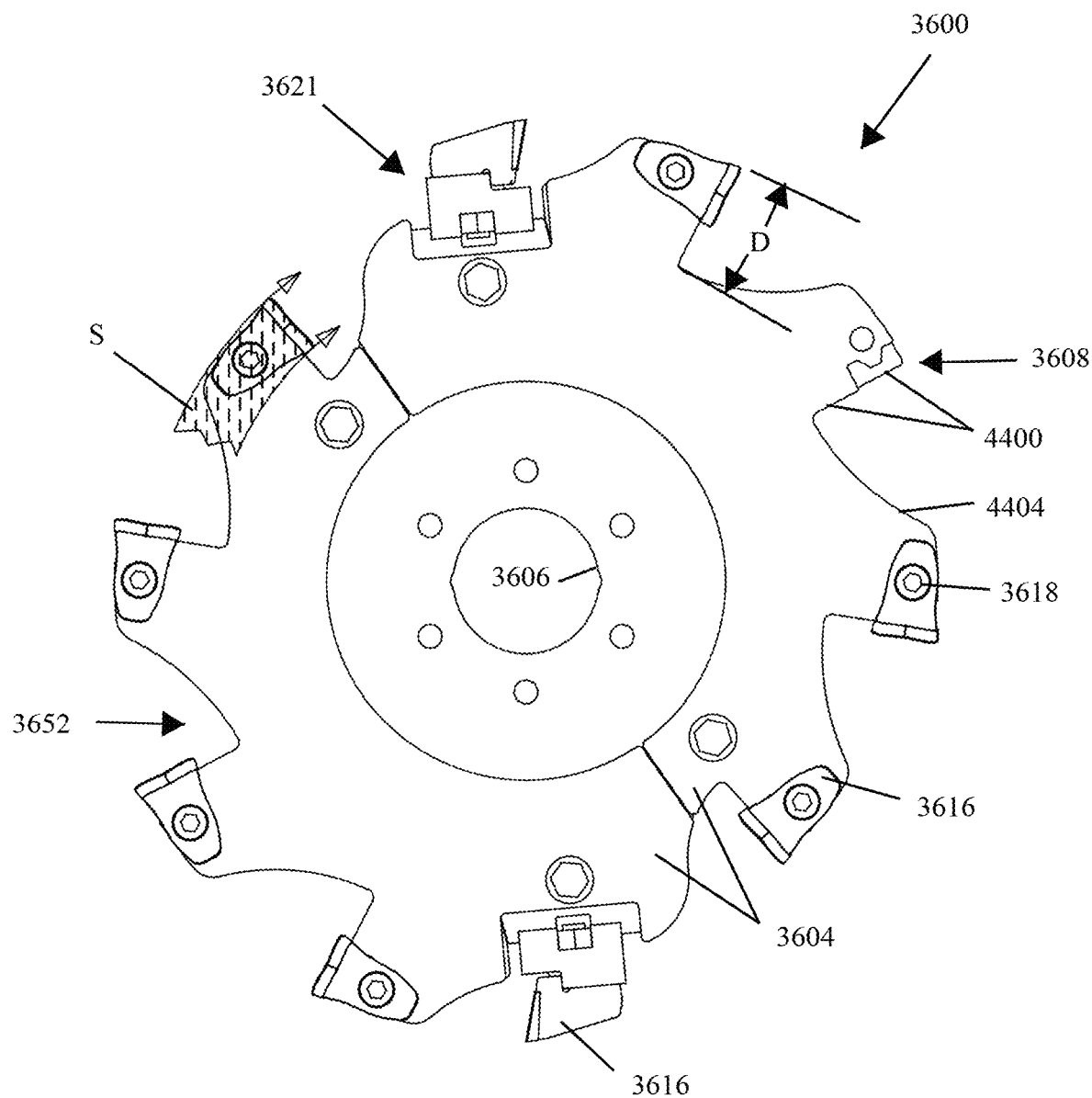
FIG. 37 is a side view of the cutter wheel of FIG. 36, shown with one cutter removed.
Figure 38:
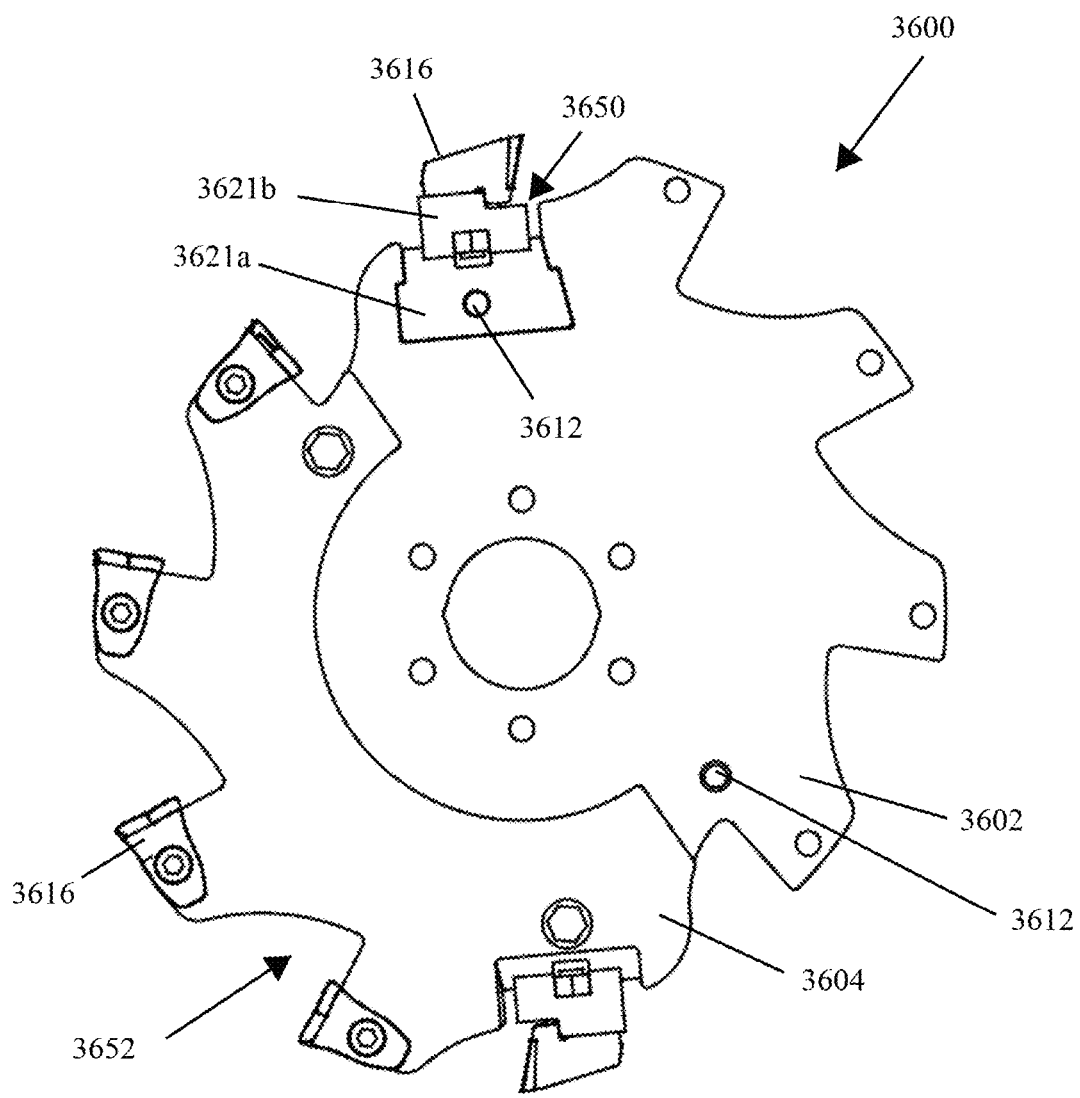
FIG. 38 is a side view of the cutter wheel of FIG. 36 shown with a wear plate section and several cutters removed.
Figure 39:
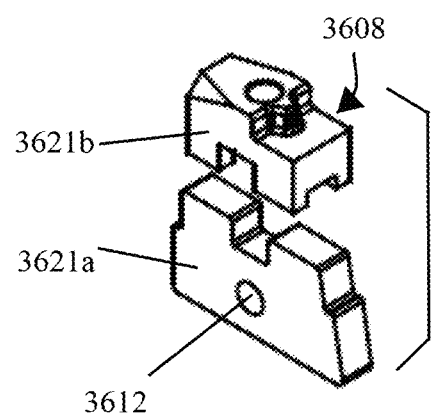
FIG. 39 is an exploded view of a cutter mount of the cutter wheel of FIG. 36
Figure 40:
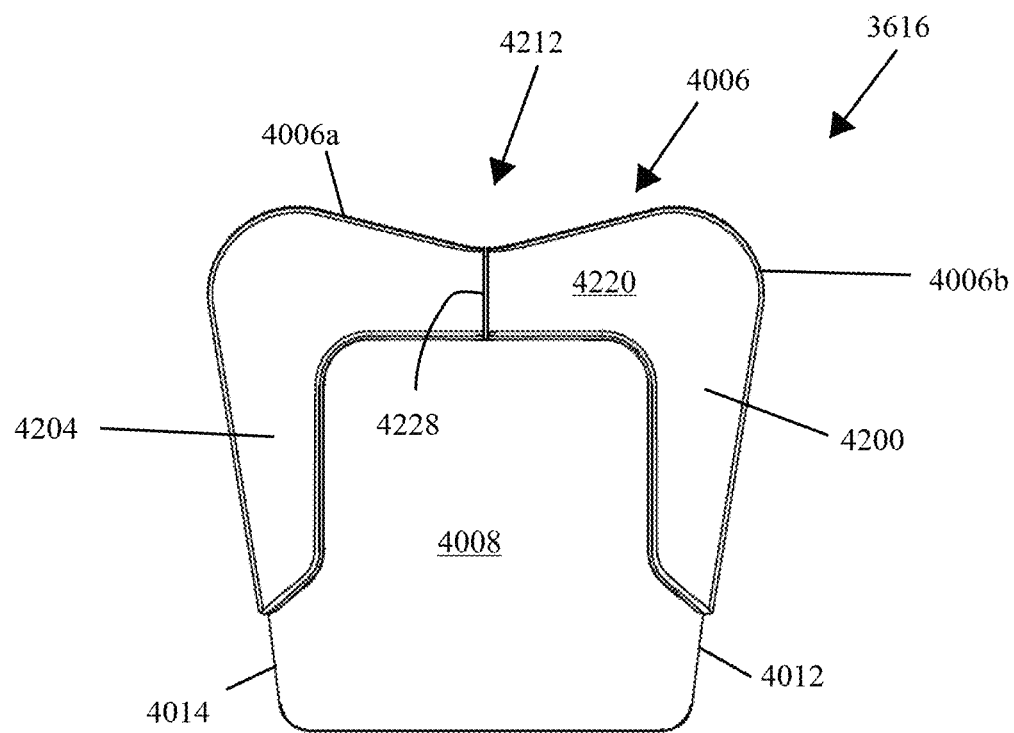
FIG. 40 is a front view of the cutter shown on the cutter wheel of FIG. 36.

As illustrated in FIG. 37, the wear plates 3604 include the boss-receiving features 3608 for positioning the respective side-mounted cutters 3616 thereon, while the plunge cutters 3616 are supported on a cutter mount 3621, which, in the illustrated embodiment best shown in FIGS. 38 and 39, includes a base member 3621*a* and a mount member 3621*b*. The drive plate 3602 includes a recess or cutout 3650 at each plunge cutter position that is configured to receive the base member 3621*a* therein, laterally from either face of the drive plate 3602. The base member 3621*a* need not be welded to the drive plate 3602, but instead can be secured in the recess 3650 via the alignment fasteners that extend through the alignment apertures 3612. The base member 3621*a* includes an alignment aperture 3612 of its own so that the alignment fastener used to secure the wear plates 3604 to the drive plate 3602 further secures the base member 3621*a* to the drive plate 3602. This eliminates the need to weld any portion of the mount 3621 directly to the drive plate 3602. However, in other embodiments, the mount 3621 could be welded directly to the drive plate 3602.

The mount member 3621*b* is secured (e.g., welded) to the base member 3621(*a*), and provides the boss-receiving feature 3608 for mating with the plunge cutter 3616, as will be described in further detail below. Once the wear plate 3604 is secured to the drive plate 3602, only a small upper portion of the base member 3621*a* is visible in the recess 3650.

FIGS. 40-46 illustrate the cutter 3616 in greater detail. The cutter 3616 is similar in many respects to the cutter 1900 described above, and unless otherwise discussed below, the same description applies equally for the cutter 3616, and like reference numbers of the 4000 series have been used. Further detail and distinctions are noted below.

As with the cutter 1900, the second surface 4022 is non-planar and therefore elongated along the width. Elongated along the width means that the non-planar portions or sections of the second surface 4022 result in an increased overall contact or engagement length as compared to a planar second surface that would extend directly across the entire width. The second surface 4022 has a plurality of reaction surface sections 4022a-e (see FIG. 45) that are configured to engage a sidewall or boss-receiving feature 3608 of the mounting structure (e.g., on a wear plate, or drive plate, or mount (see FIGS. 39 and 46)). The reaction surface sections 4022a-e are disposed between the mounting surface 4016 and the first end 4008, and therefore also between the fastener aperture 4002 and the first end 4008. As illustrated, the second surface 4022 is recessed toward the first end 4008 (i.e. the reaction surface sections cooperate to define a 'pocket') and nests onto a corresponding 'bump' defined by the sidewall 3608.

The reaction surface section 4022c can be referred to as an inner surface portion, while the reaction surface sections 4022b and 4022d can be referred to as transition surface portions. In the illustrated embodiment, each transition surface portion 4022b, 4022d intersects the inner surface portion 4022c at a respective end of the inner surface portion 4022c and at an angle of between 100 and 160 degrees (e.g., 120 degrees). In the illustrated embodiment, the intersection angles are the same at both ends of the inner surface portion 4022c such that the transition surface portions are symmetrical about a longitudinal axis of the cutter 3616.

The first and second sides 4012 and 4014 each include a projecting ridge 4100 extending from the first end 4008 to the second end 4010. The illustrated projecting ridges 4100 are arcuate and are formed during the forging process. The ridges 4100 result from the desired movement of material during forging to achieve the overall shape and contour of the first and second sides 4012, 4014 that operate to reduce drag on the cutter 3616 during cutting.

Each cutter 3616 has a cutter tip 4006 that forms a scalloped and M-shaped edge profile. The cutter tip 4006 includes a first leg portion 4200 extending along the first side 4012 of the cutter 3616, a second leg portion 4204 extending along the second side 4014, and an upper or crown portion 4208 extending between the first and second leg portions 4200, 4204. The crown portion 4208 defines, in part, the upper surface of the cutter 3616. The crown portion 4208 defines in its upper surface a concavity 4212 that conforms in shape to a concavity 4216 formed in the upper surface of the cutter body 4001 adjacent the cutter tip 4006. That is, there is a smooth transition between the concave surface 4212 of the cutter tip 4006 and the concave surface 4216 on the upper surface of the cutter body 4001. The concavities 4212, 4216 reduce drag and facilitate material evacuation during cutting.

The cutter tip 4006 defines a front face or cutting face 4220 that is cupped or concave such that the outermost edges of the leg portions 4200, 4204 and crown portion 4208 define respective cutting edges 4224 of the cutter tip 4006. These cutting edges 4224 extend along the respective sides of the cutter and lead the cutter 3616 into the surface being cut. The cutter 3616 (as well as the cutters 1700, 1800, and 1900) reduces drag on the cutter wheel 3600 because all of the mounting and support structure of the cutter 3616 is completely "behind" or "within" the profile or footprint defined by the cutting edges 4224, or the front face 4220, as the cutter wheel 3600 rotates. As illustrated in FIG. 37, the width of the cutting path or swath S defined by the cutting edges 4224 and the cutting face (as measured in the same direction as the width W of the cutter 3616) completely encompasses the width W of the cutter 3616. Stated differently, no portion of the cutter, and specifically no portion of the sides of the cutter, extend in the width direction outside of its cutting swath S. The width of cutting swath S is variable in a direction extending between the inner and outer sides of the cutter, and increases in a direction from the inner side or surface of the cutter toward the outer side or surface of the cutter (see FIG. 40). The sides of the cutter are configured accordingly so as to conform to and stay within the variable width of the swath S at any location between the inner and outer sides. As illustrated, this is true of a cutter 3616 having a fastener axis that is substantially perpendicular to the direction of rotation and the dominant force vector.

The cutting edges 4224 also experience the force providing the dominant force vector. With reference to FIG. 47, it can be seen that the boss 4004, and more specifically the engagement between the reaction surfaces 4022a-e and the boss-receiving feature 3608, opposes the dominant force vector to maintain the position of the cutter 3616 relative to the boss-receiving feature 3608 on the wear plates 3604 (or on the mount 3621). The force on the cutters 3616 is transferred from the boss 4004 to the wear plate 3604. And because the wear plates 3604 are frictionally secured to the drive plate 3602 via the compressive forces exerted by the aligned cutter pairs, the force is transferred from the wear plates 3604 to the drive plate 3602 through the large surface area frictional engagement between the wear plates 3604 and the drive plate 3602. In this regard, the reaction surfaces 4022a-e further operate to minimize shear force on the fastener 3618, because, similar to FIG. 7, the fastener 3618 does not directly contact the apertures in the drive plate 3602 or the wear plates 3604 through which it extends. It is the engagement between the boss 4004 and the boss-receiving feature 3608 that is the positional limiter for the cutter 3616, not the engagement between the fastener 3618 and any aperture in the drive plate 3602 or wear plate 3604 through which the fastener 3618 extends.

Furthermore, and as clearly shown in FIGS. 47 and 48, with the cutter wheel 3600 and many of the others described above, the boss 4004 engages the boss-receiving feature 3608 at an outer edge or periphery of the wear plates 3604. This outer edge or periphery can be located right at a chip evacuation notch or gullet location of the cutter wheel. This is different from many arrangements in which a mounting feature of a cutter or an intermediate member between the cutter and the drive plate must be inserted into an aperture or recess that is completely contained inside or within an outer periphery of the cutter wheel. This allows beneficial relative positioning of the cutting edges 4224 at or very near this outer edge or periphery of the wear plates 3604, and therefore at or very near the outer edge or periphery of the cutter wheel 3600. To state it another way, the boss 4004 and the reaction surfaces 4022a-e actually overhang a distal edge of the wear plate 3604 containing the boss-receiving feature 3608. This arrangement could likewise be used on a cutter wheel that did not incorporate wear plates. Notice again that a gap is provided between the drive plate 3602 and the lowest or bottom surface of the boss 4004. This reduces wear to the drive plate 3602 in that the cutter 3616 does not directly contact the drive plate 3602.

Figure 41:
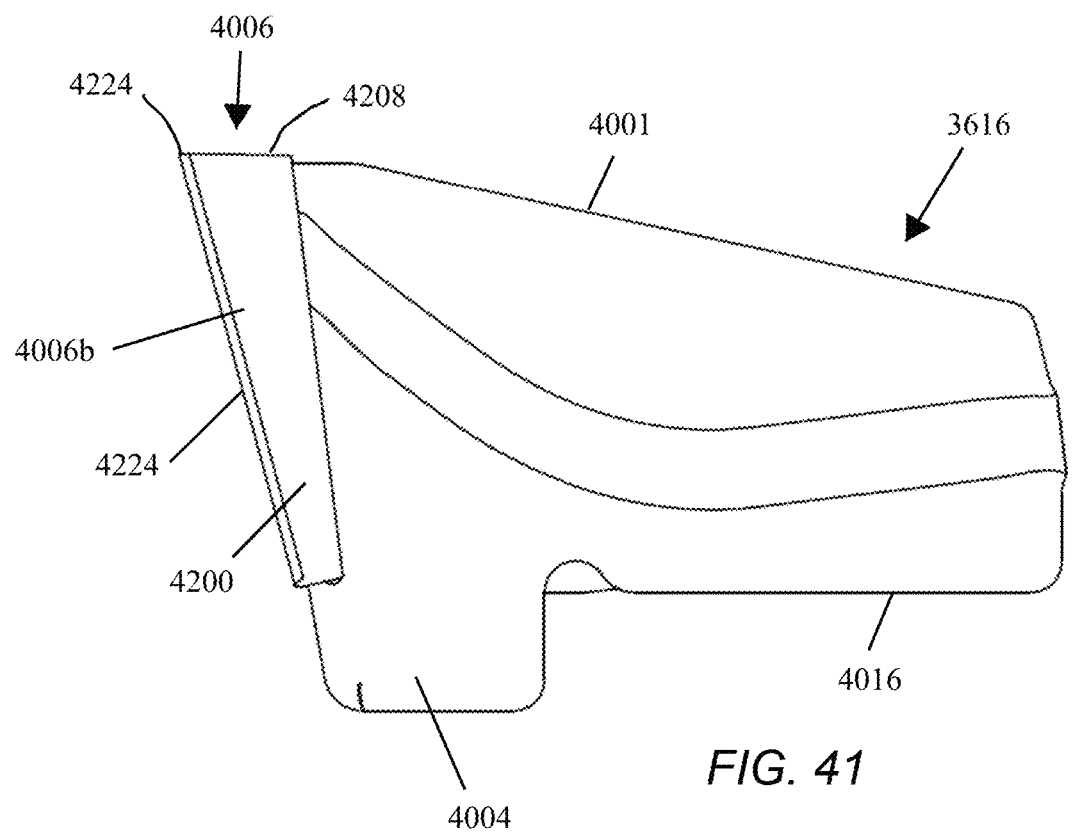
FIG. 41 is a side view of the cutter of FIG. 40.
Figure 42:
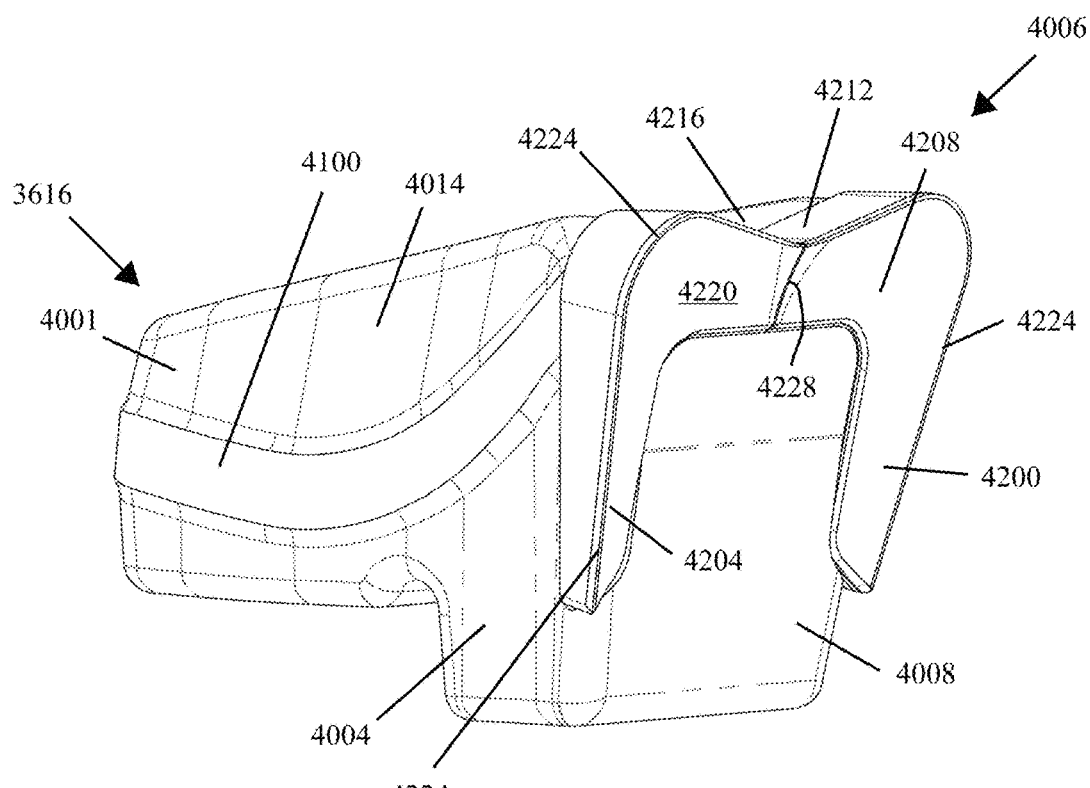
FIG. 42 is a perspective view of the cutter of FIG. 40.

In the illustrated embodiment, the cutter tip 4006 is formed from two separate pieces or segments 4006a, 4006b that are attached (e.g., welded, brazed, adhered, etc.) to the body 4001 adjacent each other. The segments 4406a, 4006b can be carbide or other suitable material. The segments 4006a, 4006b are mirror images of one another and abut one another at a parting line 4228 in the crown portion 4208. In alternative embodiments, the two cutter tip segments 4006a and 4006b could be one integrally formed cutter tip. Each segment 4006a, 4006b includes an arcuate transition between the cutting edge 4224 of the leg portion and the cutting edge 4224 of the crown portion. In some embodiments, the transitions between the cutting edges 4224 of the leg portion and the cutting edge 4224 of the crown portion are configured according to the geometries set forth in U.S. patent application Ser. No. 16/033,667, filed Jul. 12, 2018, the entire content of which is hereby incorporated by reference herein. As best shown in FIG. 41, the thickness of the segments 4006a, 4006b increases from a distal end (i.e., lower end in FIG. 41) of the leg portions 4200, 4204 toward the crown portion 4208, such that the crown portion 4208 has a greater thickness in the longitudinal direction of the cutter 3616 than the leg portions 4200, 4204.

Figure 43:
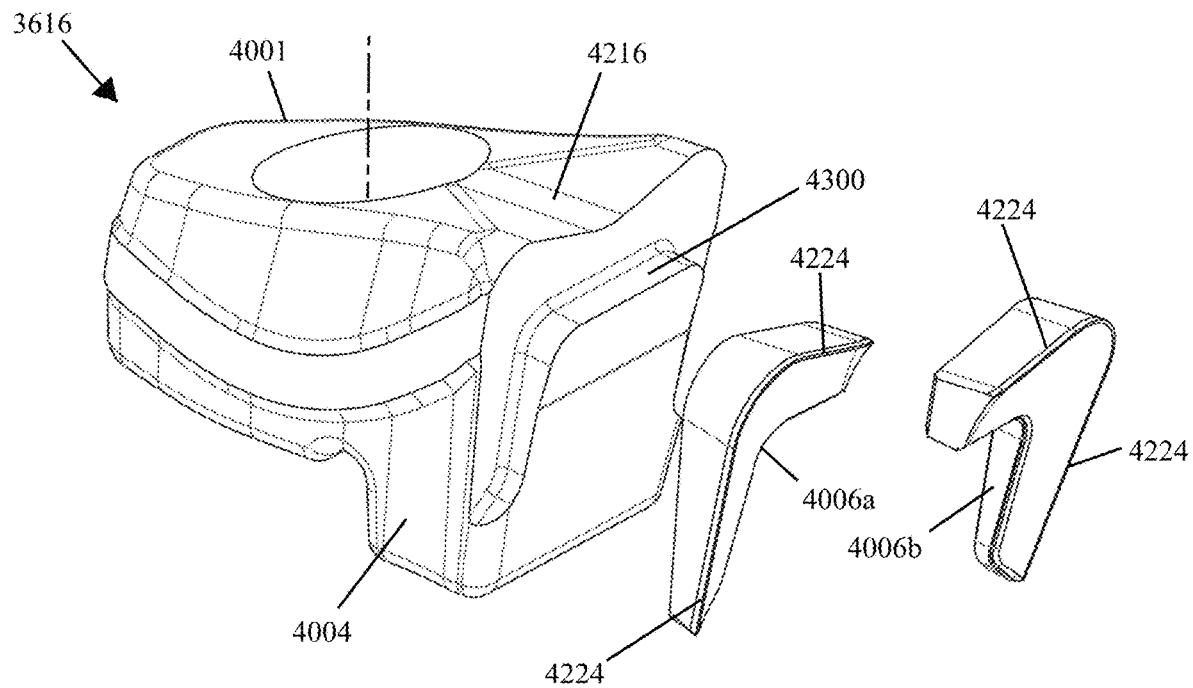
FIG. 43 is an exploded view of the cutter of FIG. 42.
Figure 44:
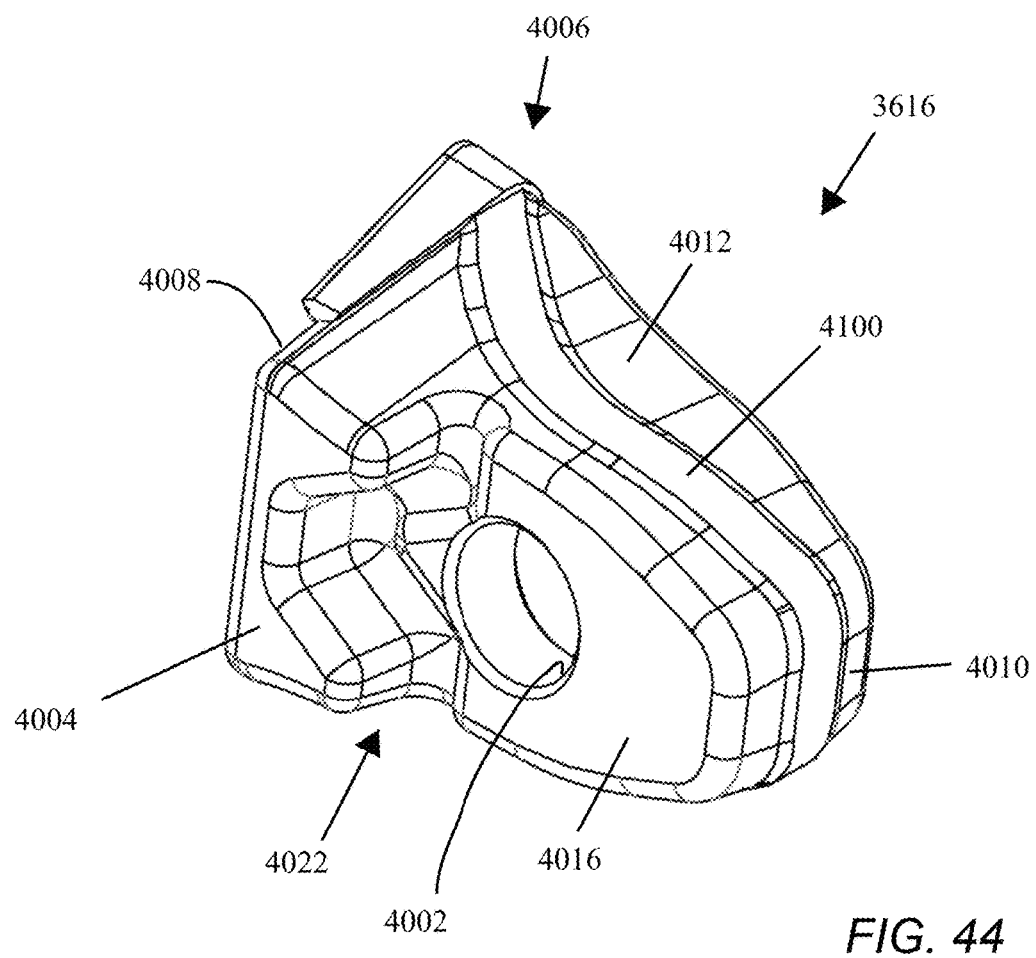
FIG. 44 is a bottom perspective view of the cutter of FIG. 40.
Figure 45:
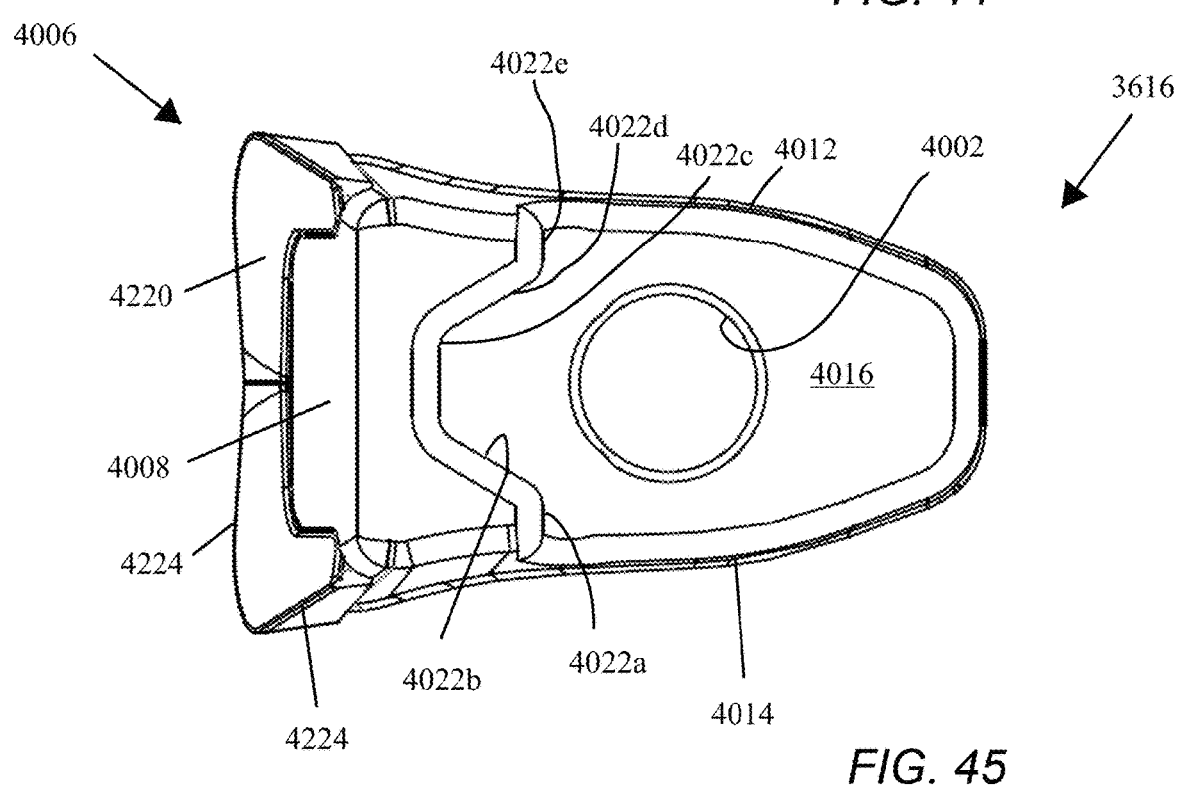
FIG. 45 is a bottom view of the cutter of FIG. 40.

As shown in FIG. 43, the cutter tip segments 4006a, 4006b are coupled to the body 4001 and nest onto the body 4001 via a ledge 4300 on the first end 4008 of the body 4001. The ledge 4300 supports inner surfaces of the leg portions 4200, 4204 and the crown portion 4208 that are inwardly spaced from the cutting edges 4224. In the illustrated embodiment, the cutting edges 4224 stand proud of the remainder of the first end 4008 of the cutter body 4001 to lead the cutter 3616 during cutting. The front face 4220 of the cutter tip 4006 inside of the cutting edges 4224 can transition to the inner surfaces to be generally aligned with the adjacent remainder of the first end 4008 of the cutter 3616, thereby facilitating chip removal.

Referring again to FIGS. 36-38 and 48, the cutter wheel 3600 includes a plurality of chip evacuation notches or gullets 3652 on the perimeter of the cutter wheel 3600 that extend through the drive plate 3602 and each wear plate 3604. The gullets 3652 allow material that is cut by the cutters 3616 to evacuate through the gullets 3652 and release on the other side of the wheel 3600 as the cutter wheel 3600 is traversing the material. The gullets 3652 also reduce the recirculation of material during operation of the cutter wheel 3600. The material can include material that has been cut by the cutters 3616.

With reference to FIG. 37, the illustrated gullets 3652 include a straight segment 4400 (defined by one or more of the drive plate 3602 and the wear plates 3604) defining a first leg of the gullet 3652, and an arcuate segment 4404 (defined by one or more of the drive plate 3602 and the wear plates 3604) defining a second leg of the gullet 3652. The illustrated straight segment 4400 extends substantially radially relative to the cutter wheel 3600 (e.g., within about 5 degrees of a radial line extending from the mounting aperture 3606). The gullet 3652 has a depth D measured from an outer periphery of the wheel adjacent the gullet 3652, and the straight segment 4400 extends to a deepest portion of the gullet 3652. In the illustrated embodiment, the depth D is at least 1-1.5 times a maximum width of the cutter 3616.

With reference to FIGS. 47 and 48, the precise positioning of the cutter 3616 relative to the gullet 3652, and more specifically to the straight segment 4400 of the gullet 3652 can vary. Where the cutting edges 4224 all lie in and define a cutter plane, that cutter plane will intersect the drive plate 3602 along a line 4408 that is substantially parallel (e.g., within 5 degrees) to the straight segment 4400. However, depending upon the position of the boss-receiving feature 3608 relative to the straight segment 4400, the location of the line 4408 where the cutter plane intersects with the drive plate 3602 can vary. In some embodiments, the intersection could occur right at the straight segment 4400, however in other embodiments, the intersection could be rearward or forward of the straight segment 4400 (relative to the direction of rotation of the cutter wheel 3600). In most embodiments, at least a portion of the cutter tip 4006 is positioned forwardly (in the direction of rotation) of the straight segment 4400.

FIGS. 49 and 50 illustrate the coverage provided by the cutter tips 4006 of the cutter wheel 3600. Represented is a grouping of cutters 3616 that includes one plunge cutter and the four cutter pairs trailing the plunge cutter. In the embodiment illustrated in FIG. 36, the cutter wheel 3600 includes two groupings of cutters 3616, however, this discussion of cutter coverage can also apply to cutter wheels having more than two groupings of cutters. FIGS. 49 and 50 illustrate that the cutter tips 4006 are configured in a manner such that only the cutter tips 4006 will initially engage and contact the material being cut, regardless of whether the operator is sweeping the cutter wheel 3600 from side to side, or plunging the cutter wheel 3660 straight into the material. Notice how the leg portions 4200, 4204 of the side-mounted cutter tips 4006 have a length in a direction extending away from their respective crown portions 4208 (i.e., toward the drive plate 3602) that is long enough to ensure that no gap in cutting coverage exists between the side-mounted cutter tips 4006 and the plunge cutter tip 4006 during rotation of the cutter wheel 3600. This helps to prevent wear on the cutter body 4001 and the wear plates 3604 that could occur if a gap in the cutter tip coverage existed. The overall design of the cutter tips 4006, along with the thicknesses of the drive plate 3602 and the wear plates 3604 is considered to ensure this complete cutter coverage provided by the cutter tips 4006 of each grouping of cutters 3616. Furthermore, this complete cutter coverage is provided with only a single cutter tip design. In other words, complete cutter coverage is provided using the same cutter 3616, having the same cutter tip 4006, for all of the cutter locations (i.e., plunge or side-mount) on the cutter wheel 3600.

Figure 51:
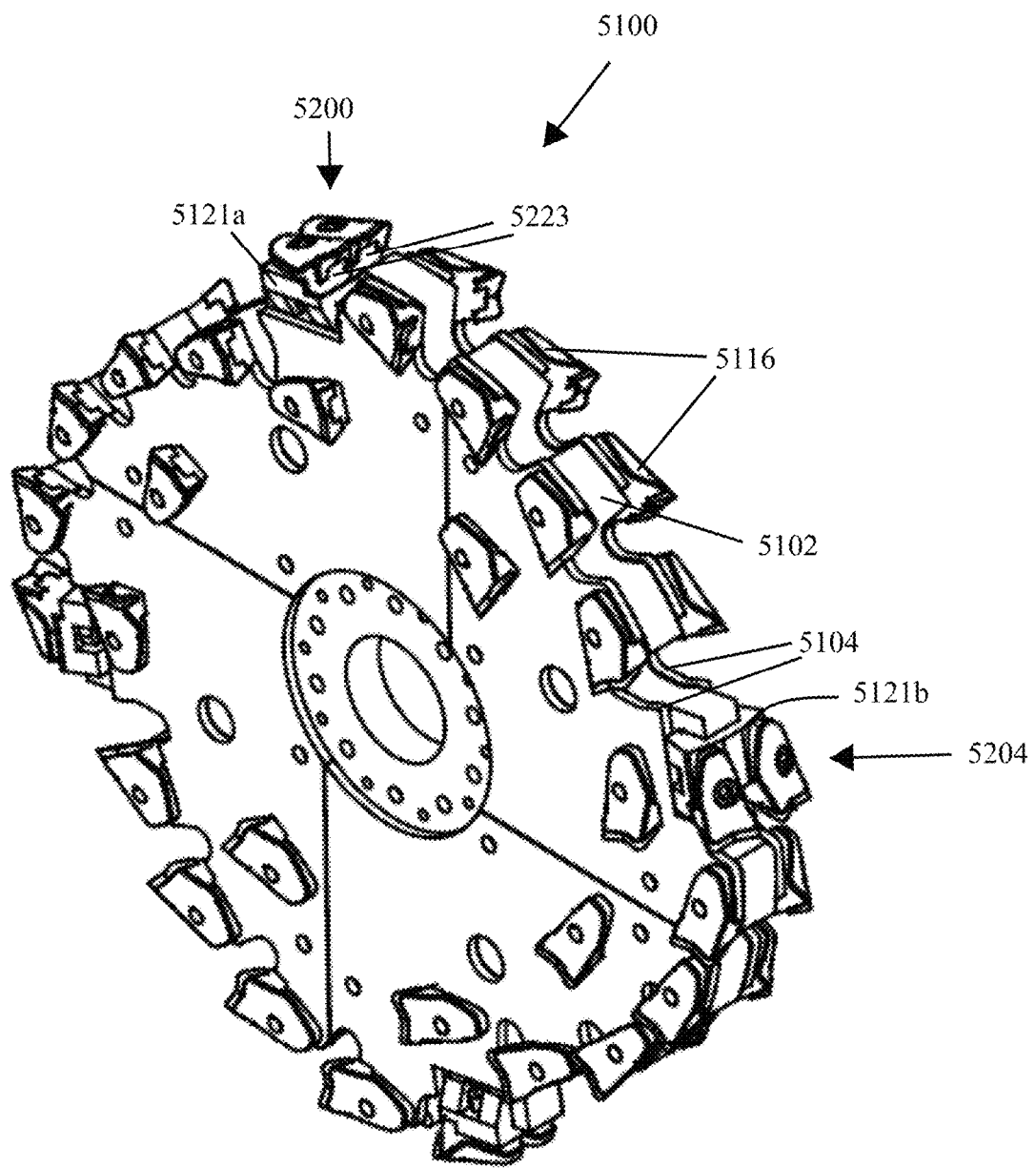
FIG. 51 is a perspective view of another exemplary cutter wheel
Figure 52:
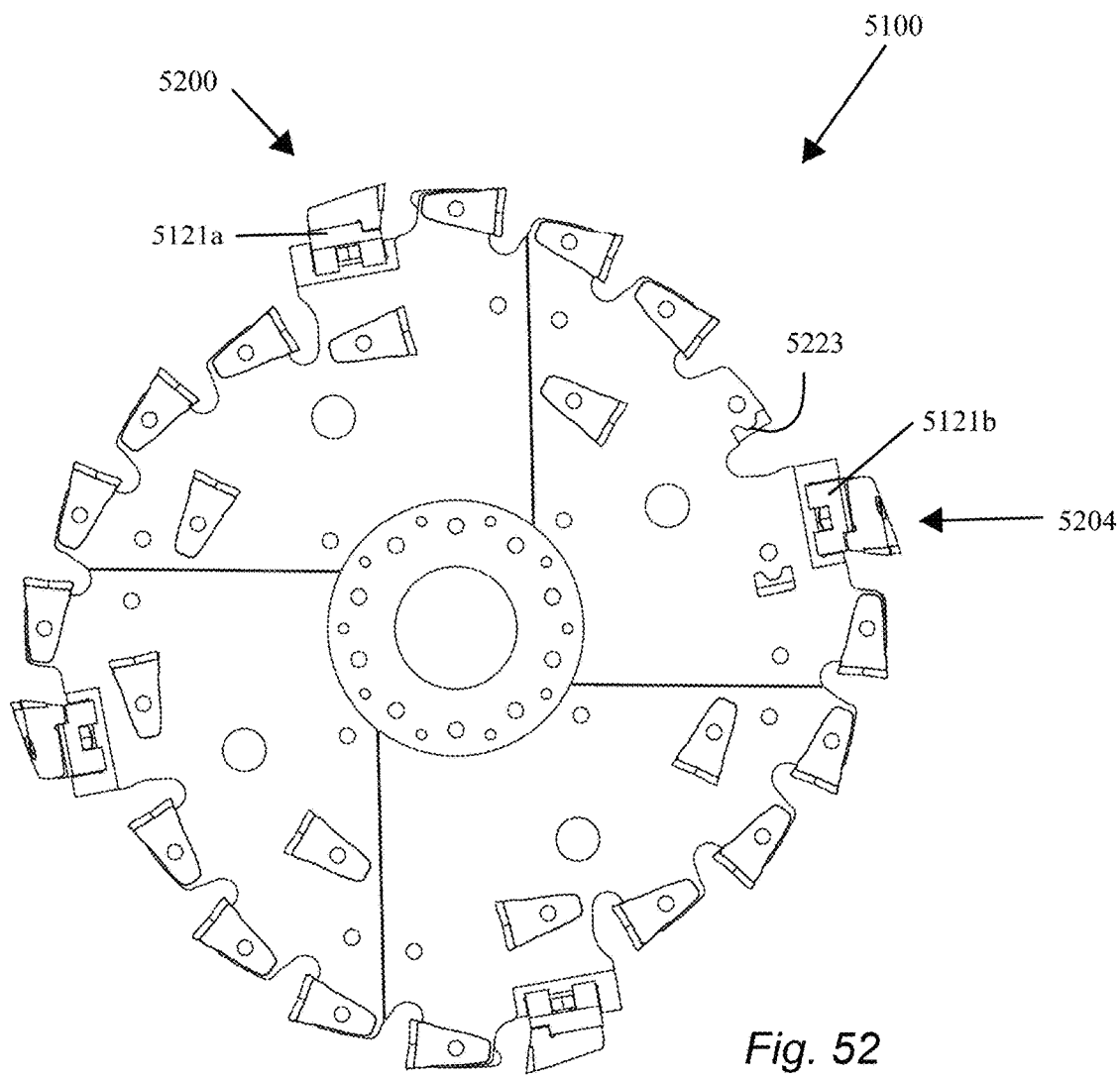
FIG. 52 is a side view of the cutter wheel of FIG. 50, shown with two cutters removed.
Figure 53:
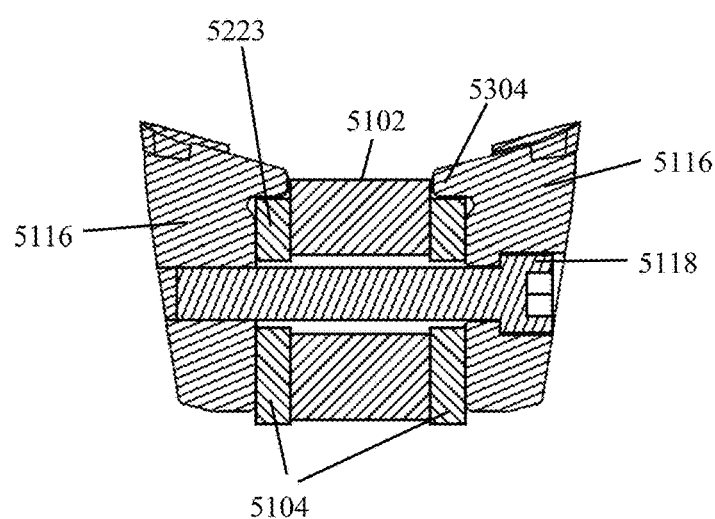
FIG. 53 is a section view through a mounted pair of cutters on the cutter wheel of FIG. 50.
Figure 54D:
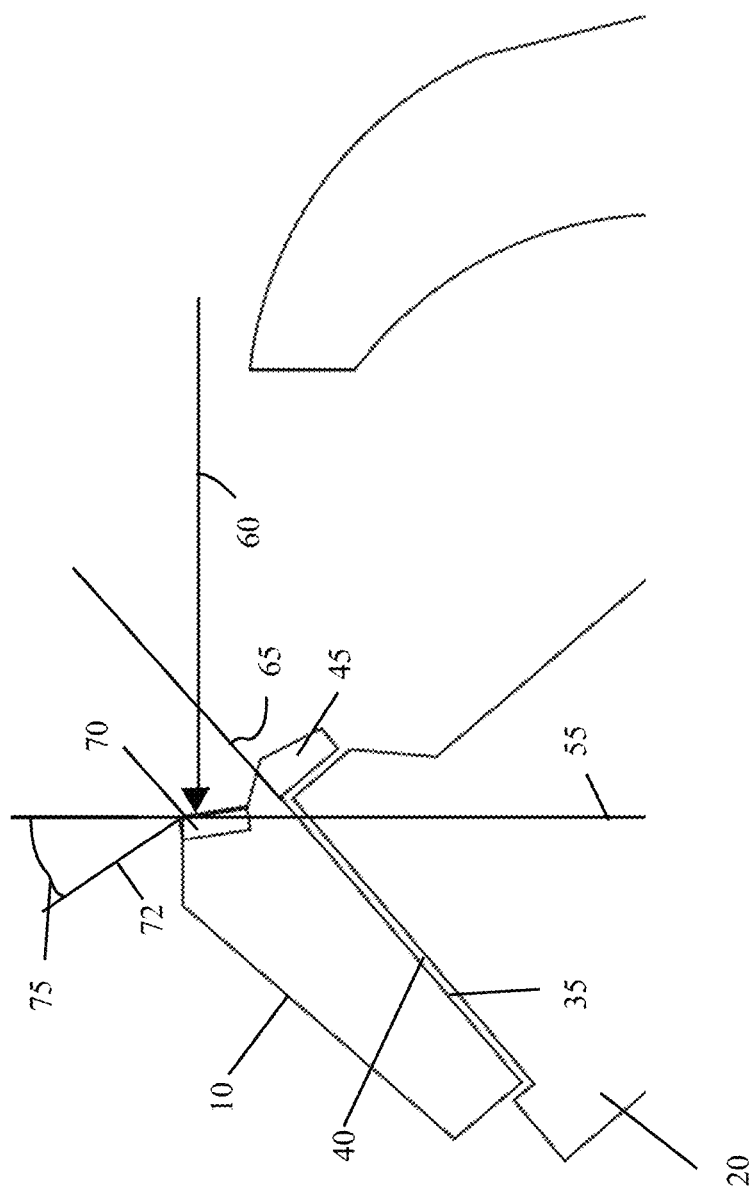
FIG. 54D is a further enlarged schematic view of the cutter of FIG. 54A illustrating the mounting arrangement relative to a plane and a dominant force vector.

FIGS. 51-53 illustrate yet another cutter wheel 5100 embodying the invention. The cutter wheel 5100 is illustrated as being a laminated cutter wheel and is similar in many respects to the cutter wheel 114, discussed above with respects to FIGS. 2-5, the cutter wheel 900, discussed relative to FIGS. 9-12, the cutter wheel 2000 discussed above relative to FIGS. 20-22, the cutter wheel 2300 discussed above relative to FIGS. 23-25, and the cutter wheel 3600, discussed relative to FIGS. 36-50, and may include any of the above discussed features of cutter wheel 114, 900, 2000, 2300, or 3600. Similar parts have been given similar part numbers of the 5100 series. The same description set forth above for the cutter wheels 114, 900, 2000, 2300, and 3600 can apply equally to the cutter wheel 5100 and will not be repeated herein.

The cutter wheel 5100 is designed for larger machines than the cutter wheel 3600, however, it utilizes the same style of cutting tooth (albeit perhaps larger in size). As such, the above description of the cutters 3616 applies equally for the cutter wheel 5100 and will not be repeated. The cutter wheel 5100 includes a thicker drive plate 5102, and as such, utilizes two cutters 5116, mounted side-by-side, at the plunge cutter locations. At a first plunge cutter location 5200, a mount 5121a is welded to the drive plate 5102. The mount 5121a includes two boss-receiving features 5223 spaced apart so as to receive two cutters 5116 in side-by-side relationship as shown. A second, adjacent plunge cutter location 5204 utilizes a different mount 5121b that has the boss-receiving features spaced further apart and located on surfaces of the mount 5121b that are angled relative to one another such that two mounted cutters 5116 will be spaced apart or offset axially from one another, and will also be angled or canted relative to one another and relative to the drive plate 5102. This arrangement of plunge cutters facilitates complete cutter coverage for the thicker cutter wheel 5100.

FIG. 53 illustrates a mounted pair of cutters 5116 (and is also representative of a mounted pair of the cutters 3616). It is again seen that the boss 5304, and more specifically the engagement between the reaction surfaces and the boss-receiving feature 5223, opposes the dominant force vector to maintain the position of the cutter 5116 relative to the boss-receiving feature 5223 on the wear plates 5104 (or on the mounts 3121*a*, 5121*b*). As described above with respect to the cutter 3616, the reaction surfaces further operate to minimize shear force on the fastener 5118 because the fastener 5118 does not directly contact the apertures in the drive plate 5102 or the wear plates 5104 through which it extends (see FIG. 53). As illustrated, the apertures in the wear plates 5104 are smaller than the corresponding aperture in the drive plate 5102. This is intentional so that even if the fasteners 5118 would engage the wear plates 5104 at the wear plate apertures, the larger holes in the drive plate 5102 would still prevent the fasteners 5118 from engaging the drive plate 5102. This minimizes or eliminates the likelihood of the fastener holes in the drive plate 5102 becoming misshapen or "egged out," thereby preserving the integrity of the drive plate 5102 even though the wear plates 5104 might need to be replaced.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A cutter configured to be mounted on a rotationally driven apparatus for material reduction of an object, the cutter comprising:
    a first end configured to first engage the object along a dominant force vector;
    a second end opposite the first end;
    a first side; and
    a second side opposite the first side;
    the cutter having a length between the first end and the second end, and a width between the first side and the second side;
    the cutter further including
    an outer side;
    an inner side configured to engage the rotationally driven apparatus;
    an aperture extending from the outer side to the inner side along a fastener axis that is substantially perpendicular to the dominant force vector, the aperture configured to receive a fastener to secure the cutter to the apparatus; and
    a cutter tip on the first end and having a first cutting edge extending along the first side, a second cutting edge extending along the second side, and a third cutting edge extending along the outer side, the cutting edges defining therebetween a cutting face of the cutter tip, the cutting face configured to define a cutting swath having a width between the first cutting edge and the second cutting edge as the cutter rotates with the apparatus;
    wherein the first and second sides of the cutter body extend in a direction of the dominant force vector and taper from the first end toward the second end such that the first end has a greater width than the second end.

2. The cutter of claim 1, wherein the width of the cutting swath is variable and increases in a direction from the inner side toward the outer side.

3. The cutter of claim 1, wherein the cutter tip includes a first leg portion extending along the first side and including the first cutting edge, a second leg portion extending along the second side and including the second cutting edge, and a crown portion extending between the first and second leg portions and including the third cutting edge.

4. The cutter of claim 3, wherein the cutter tip includes a first cutter tip segment defining the first leg portion and part of the crown portion, and a second cutter tip segment defining the second leg portion and part of the crown portion.

5. The cutter of claim 3, wherein the crown portion defines a concavity in the outer side.

6. The cutter of claim 5, wherein the outer side of the cutter between the aperture and the cutter tip includes a concavity conforming in shape to the concavity defined by the crown portion of the cutter tip.

7. The cutter of claim 1, wherein the first and second sides each include a projecting ridge extending between the first end and the second end.

8. The cutter of claim 1, wherein the aperture is configured such that the fastener axis is parallel to an axis of rotation of the rotationally driven apparatus when the cutter is mounted on the rotationally driven apparatus.

9. The cutter of claim 1, wherein the inner side includes
    a mounting surface portion configured to engage a first surface of the apparatus; and
    a plurality of reaction surface portions configured to engage mating surfaces of the apparatus and disposed between the mounting surface portion and the first end, at least two of the plurality of reaction surface portions being angled relative to one another such that the plurality of reaction surface portions extend along the width from the first side to the second side in a non-planar manner.

10. The cutter of claim 1, wherein the cutter includes a body defining a ledge adjacent the first end, and wherein the cutter tip is supported on the ledge.

11. A cutter configured to be mounted on a rotationally driven apparatus for material reduction of an object, the cutter comprising:
    a first end including a cutting tip configured to first engage the object along a dominant force vector;
    a second end opposite the first end;
    a first side; and
    a second side opposite the first side;
    the cutter having a length between the first end and the second end, and a width between the first side and the second side;
    the cutter further including
    an outer surface; and
    an inner surface having portions configured to engage the rotationally driven apparatus, the inner surface including
    a mounting surface portion configured to engage a first surface of the apparatus; and a plurality of reaction surface portions configured to engage mating surfaces of the apparatus and disposed between the mounting surface portion and the first end, at least two of the plurality of reaction surface portions being angled relative to one another such that the plurality of reaction surface portions extend along the width from the first side to the second side in a non-planar manner; and an aperture extending from the outer surface to the mounting surface portion along a fastener axis that is substantially perpendicular to the mounting surface portion and to the dominant force vector, the aperture configured to receive a fastener to secure the cutter to the apparatus.

12. The cutter of claim 11, wherein the plurality of reaction surface portions include an inner surface portion and a transition surface portion that intersects the inner surface portion at an angle of between 100 and 160 degrees.

13. The cutter of claim 12, wherein the transition surface portion is a first transition surface portion that intersects the inner surface portion at a first end of the inner surface portion, and wherein the plurality of reaction surface portions further includes a second transition surface portion that intersects the inner surface portion at a second end of the inner surface portion and at an angle of between 100 and 160 degrees.

14. The cutter of claim 13, wherein the first and second transition surface portions are symmetrical about a longitudinal axis of the cutter.

15. The cutter of claim 11, wherein the cutter includes a relief notch at an intersection of the reaction surface portions and the mounting surface portion.

16. The cutter of claim 11, wherein the inner surface of the cutter includes a boss at the first end, the boss having a first surface at the first end and a second surface facing the second end, the second surface defining the plurality of reaction surface portions.

17. The cutter of claim 16, wherein the fastener axis is offset from the boss such that the fastener axis is in a non-intersecting relationship with the boss.

18. The cutter of claim 16, wherein the boss has a first dimension measured along the length and a second dimension measured along the width, and wherein the second dimension is larger than the first dimension.

19. The cutter of claim 11, wherein the mounting surface portion defines a plane.

20. The cutter of claim 11, wherein the dominant force vector is generally perpendicular to at least one of the plurality of reaction surface portions and is generally parallel to the mounting surface portion.

21. A rotating cutting assembly comprising:
a wheel configured to be mounted on a rotationally driven apparatus for material reduction of an object;
a cutter removably coupled to a side surface of the wheel, the cutter including
a first end configured to first engage the object along a dominant force vector;
a second end opposite the first end;
a first side; and
a second side opposite the first side;
the cutter having a length between the first end and the second end, and a width between the first side and the second side;
the cutter further including
an outer side;
an inner side configured to engage the wheel;

an aperture extending from the outer side to the inner side along a fastener axis that is substantially perpendicular to the dominant force vector, the aperture configured to receive a fastener to secure the cutter to the wheel; and a cutter tip on the first end and having a first cutting edge extending along the first side, a second cutting edge extending along the second side, and a third cutting edge extending along the outer side, the cutting edges defining therebetween a cutting face of the cutter tip, the cutting face configured to define a cutting swath having a width between the first cutting edge and the second cutting edge as the cutter rotates with the apparatus;

wherein no portion of the first side or the second side extends outside the width of the cutting swath; and wherein the wheel further includes a gullet formed therein and adjacent the cutter, and wherein the gullet includes a straight segment defining a first leg of the gullet positioned adjacent the cutter tip, and an arcuate segment defining a second leg of the gullet.

22. The rotating cutting assembly of claim 21, wherein the straight segment of the gullet extends substantially radially relative to the wheel.

23. The rotating cutting assembly of claim 21, wherein the cutting edges of the cutter tip define a cutter plane, and wherein the cutter plane intersects the wheel along a line that is substantially parallel to the straight segment of the gullet.

24. The rotating cutting assembly of claim 21, wherein the gullet has a depth measured from an outer periphery of the wheel adjacent the gullet, and wherein the straight segment extends to a deepest portion of the gullet.

25. The rotating cutting assembly of claim 21, wherein the gullet has a depth measured from an outer periphery of the wheel adjacent the gullet, and wherein the gullet has a depth of at least 1-1.5 times a maximum width of the cutter.

26. The rotating cutting assembly of claim 21, wherein the inner surface of the cutter includes a boss at the first end, the boss having a first surface at the first end and a second surface facing the second end, the second surface being engaged with the wheel.

27. The rotating cutting assembly of claim 26, wherein the wheel includes a drive plate and a wear plate coupled to a side of the drive plate, and wherein the second surface of the boss engages the wear plate.

28. A cutter configured to be mounted on a rotationally driven apparatus for material reduction of an object, the cutter comprising:
a first end configured to first engage the object along a dominant force vector;
a second end opposite the first end;
a first side; and
a second side opposite the first side;
the cutter having a length between the first end and the second end, and a width between the first side and the second side;
the cutter further including
an outer side;
an inner side configured to engage the rotationally driven apparatus;
an aperture extending from the outer side to the inner side along a fastener axis that is substantially perpendicular to the dominant force vector, the aperture configured to receive a fastener to secure the cutter to the apparatus; and
a cutter tip on the first end and having a first cutting edge extending along the first side, a second cutting edge extending along the second side, and a third cutting edge extending along the outer side, the cutting edges defining therebetween a cutting face of the cutter tip, the cutting face configured to define a cutting swath having a width between the first cutting edge and the second cutting edge as the cutter rotates with the apparatus;

wherein the width of the cutting swath is variable and increases in a direction from the inner side toward the outer side.

* * * * *